United States Patent
Madenci et al.

(10) Patent No.: US 10,572,441 B2
(45) Date of Patent: Feb. 25, 2020

(54) APPLICATIONS OF PERIDYNAMIC DIFFERENTIAL OPERATOR

(71) Applicant: Global Engineering Research and Technologies, LLC, Tucson, AZ (US)

(72) Inventors: Erdogan Madenci, Tucson, AZ (US); Atila Barut, Tucson, AZ (US); Michael Futch, Tucson, AZ (US)

(73) Assignee: GLOBAL ENGINEERING RESEARCH AND TECHNOLOGIES, LLC, Tuscon, AZ (US)

( * ) Notice: Subject to any disclaimer, the term of this patent is extended or adjusted under 35 U.S.C. 154(b) by 272 days.

(21) Appl. No.: 15/242,466

(22) Filed: Aug. 19, 2016

(65) Prior Publication Data

US 2017/0052975 A1 Feb. 23, 2017

Related U.S. Application Data

(60) Provisional application No. 62/207,300, filed on Aug. 19, 2015.

(51) Int. Cl.
*G06F 7/02* (2006.01)
*G06F 16/00* (2019.01)
(Continued)

(52) U.S. Cl.
CPC .......... *G06F 16/11* (2019.01); *G06F 11/1469* (2013.01); *G06F 16/538* (2019.01); *G06F 17/17* (2013.01)

(58) Field of Classification Search
CPC ........ G06F 17/30153; G06F 17/30247; G06F 17/3025; G06F 17/30259; G06F 11/1469;
(Continued)

(56) References Cited

U.S. PATENT DOCUMENTS 10,002,286 B1 * 6/2018 Prabhu ............... G06K 9/00288
2012/0047110 A1 * 2/2012 Brunet .................. G06F 3/0608
707/640
(Continued)

OTHER PUBLICATIONS

Littlewood, "Roadmap for Peridynamic Software Implementation," Sandia National Laboratories, Oct. 2015. (Year: 2015).*
(Continued)

*Primary Examiner* — Bruce M Moser
(74) *Attorney, Agent, or Firm* — Lewis Roca Rothgerber Christie LLP

(57) ABSTRACT

A method of data recovery of a remaining set of original data from a partial set of the original data. The original data is organized by a geometry having a locality function. Each original datum occupies a point of the geometry and has a corresponding distance to each other point of the geometry as defined by the locality function. The original datum further has corresponding values. The method includes, for each remaining datum of the remaining set: identifying a family of points of the geometry corresponding to members of the partial set local to the remaining datum by using the locality function; estimating the corresponding values of the remaining datum by using a peridynamic differential operator on the corresponding values of each of the members of the partial set in the family of points; and storing the estimated values of the remaining datum on a nonvolatile storage device.

20 Claims, 33 Drawing Sheets
(24 of 33 Drawing Sheet(s) Filed in Color)

(51) Int. Cl.
  G06F 16/11    (2019.01)
  G06F 11/14    (2006.01)
  G06F 16/538   (2019.01)
  G06F 17/17    (2006.01)
(58) Field of Classification Search
  CPC ...... G06F 17/17; G06F 16/744; G06F 16/583; G06F 16/5838; G06F 16/5854
  See application file for complete search history.

(56) References Cited

U.S. PATENT DOCUMENTS

2013/0343510 A1* 12/2013 Jang ............... G06T 7/0012 378/5
2016/0371821 A1* 12/2016 Hayashi ............ H04N 5/3572
2017/0046594 A1*  2/2017 Nerurkar .......... G05D 1/0268

OTHER PUBLICATIONS

Silling, "Reformulation of elasticity theory for discontinuities and long-range forces," J. Mech. Phys. Solids 48 (2000); pp. 175-209.
Silling et al., "Peridynamics states and constitutive modeling," J. Elast., (2007); 88; pp. 151-184.
Madenci et al., "Peridynamic Theory and Its Applications," Springer, 2014; ISBN 978-14614-84653 (uploaded in 3 parts).
Silling, et al., "Convergence of Peridynamics to Classical Elasticity Theory," J. Elast., (2008) 93; pp. 13-37.
Du, et al., "A nonlocal vector calculus, nonlocal volume-constrained problems, and nonlocal balance laws," Math. Models Methods Appl., Sci. (2013) 23; pp. 493-540.
Bessa, et al., "A meshfree unification: Reproducing kernel peridynamics," Comp. Mech., (2014) 53; pp. 1251-1264.
Chen, et al., "An implicit gradient model by a reproducing kernel strain regularization in strain localization problems," Comput. Meth. Appl. Mech. Eng., 193 (2004) pp. 2827-2844.
Oterkus, et al., "Peridynamics for anti-plane shear and torsional deformations," J. Mech. of Mat. and Struc., vol. 10, No. 2, 2015; pp. 167-193.
Cook, et al., "Concepts and Applications of Finite Element Analysis," John Wiley & Sons, New York, 3rd edition, 1989 (uploaded in 2 parts).
Larrosa, et al., "On the Practical use of Variable Elimination in Constraint Optimization Problems: 'Still-life' as a Case Study," J. of Artif. Intel. Res., 23 (2005) pp. 421-440.
Liu, et al., "A Fictitious Time Integration Method for the Numerical Solution of the Fredholm Integral Equation and for Numerical Differentiation of Noisy Data, and Its Relation to the Filter Theory," CMES, vol. 41, No. 3 (2009) pp. 243-261.
Nakamura, et al., "Numerical differentiation for the second order derivative of functions with several variables," J. of Comp. and App. Math., 212 (2008) pp. 341-358.
Walker, "The boundary layer due to a rectilinear vortex," Proc. Roy. Soc. Lond. A, (1978) 359; pp. 167-188.
Ascher, et al., "Numerical Solution of Boundary Value Problems for Ordinary Differential Equations," SIAM, 1995 (uploaded in 3 parts).
Mackowski, "Conduction Heat Transfer Notes for MECH 7210", Mechanical Engineering Department Auburn University (undated) http://www.eng.auburn.edu/~dmckwski/mech7210/condbook.pdf (uploaded in 3 parts).
Zohdi, "Numerical simulation of impact and deposition of charged particulate droplets," J. Computational Physics, 233 (2013) pp. 509-526.
Pauly, et al., "Meshless Animation of Fracturing Solids," ACM Transactions on Graphics (TOG), 24 (2005) pp. 957-964.
Anderson, "Fracture Mechanics: Fundamentals and Applications," CRC Press, 2005 (uploaded in 8 parts).

* cited by examiner

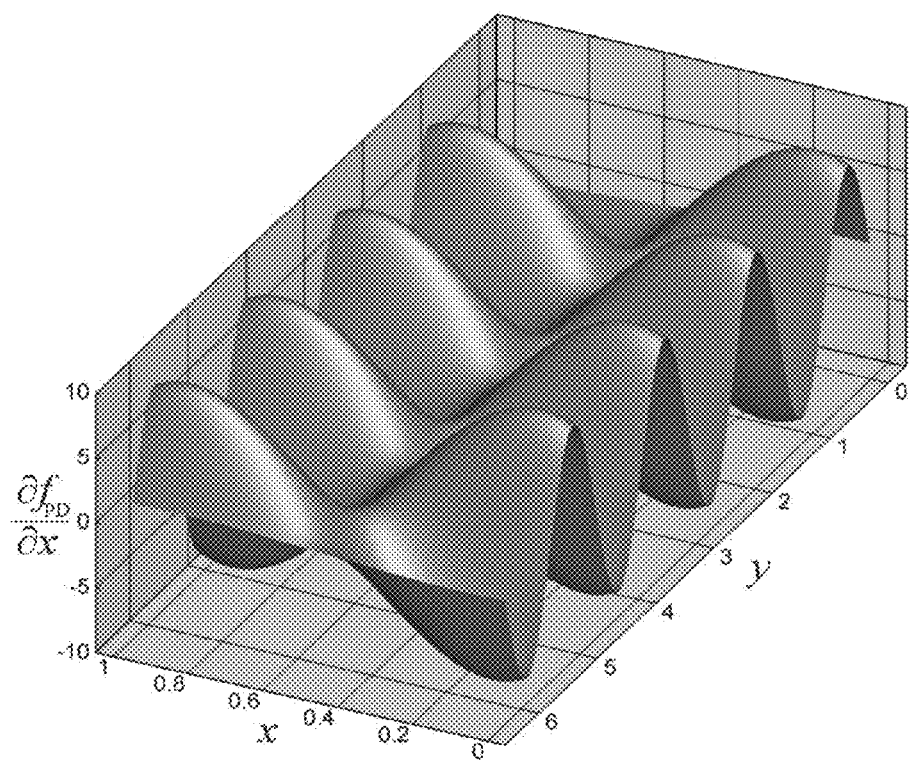
FIG. 5B
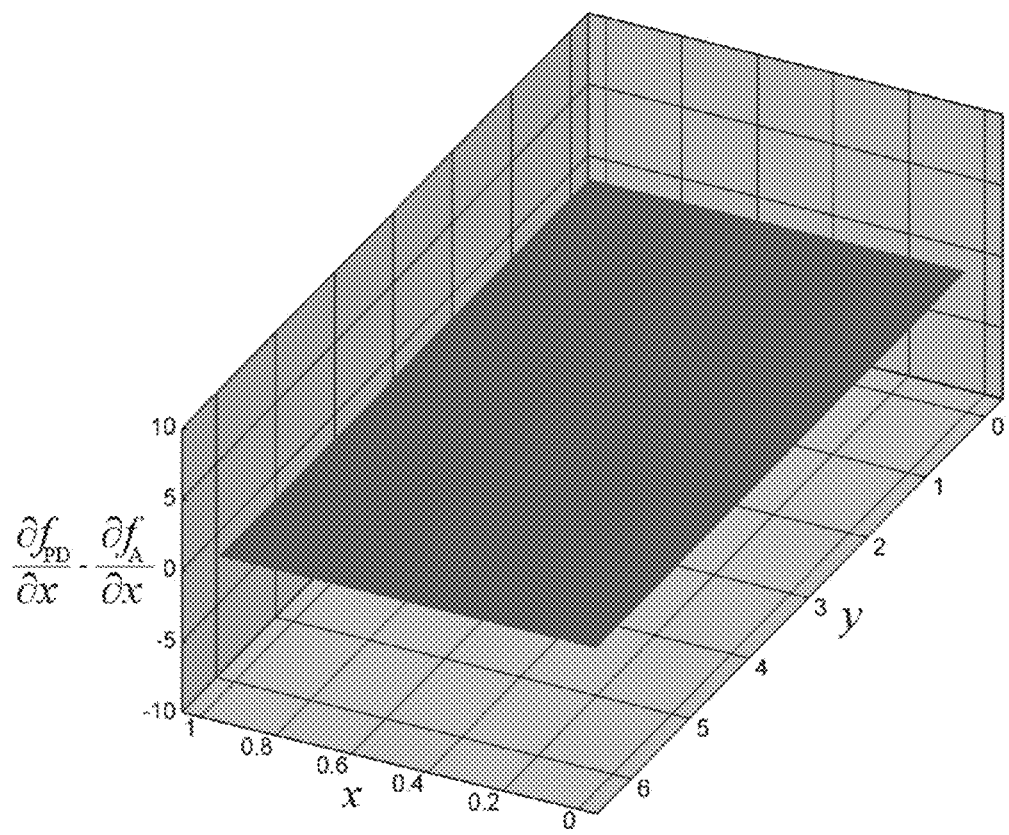

Noisy image

Filtering level one

Filtering level two

Retained pixels

Recovered image

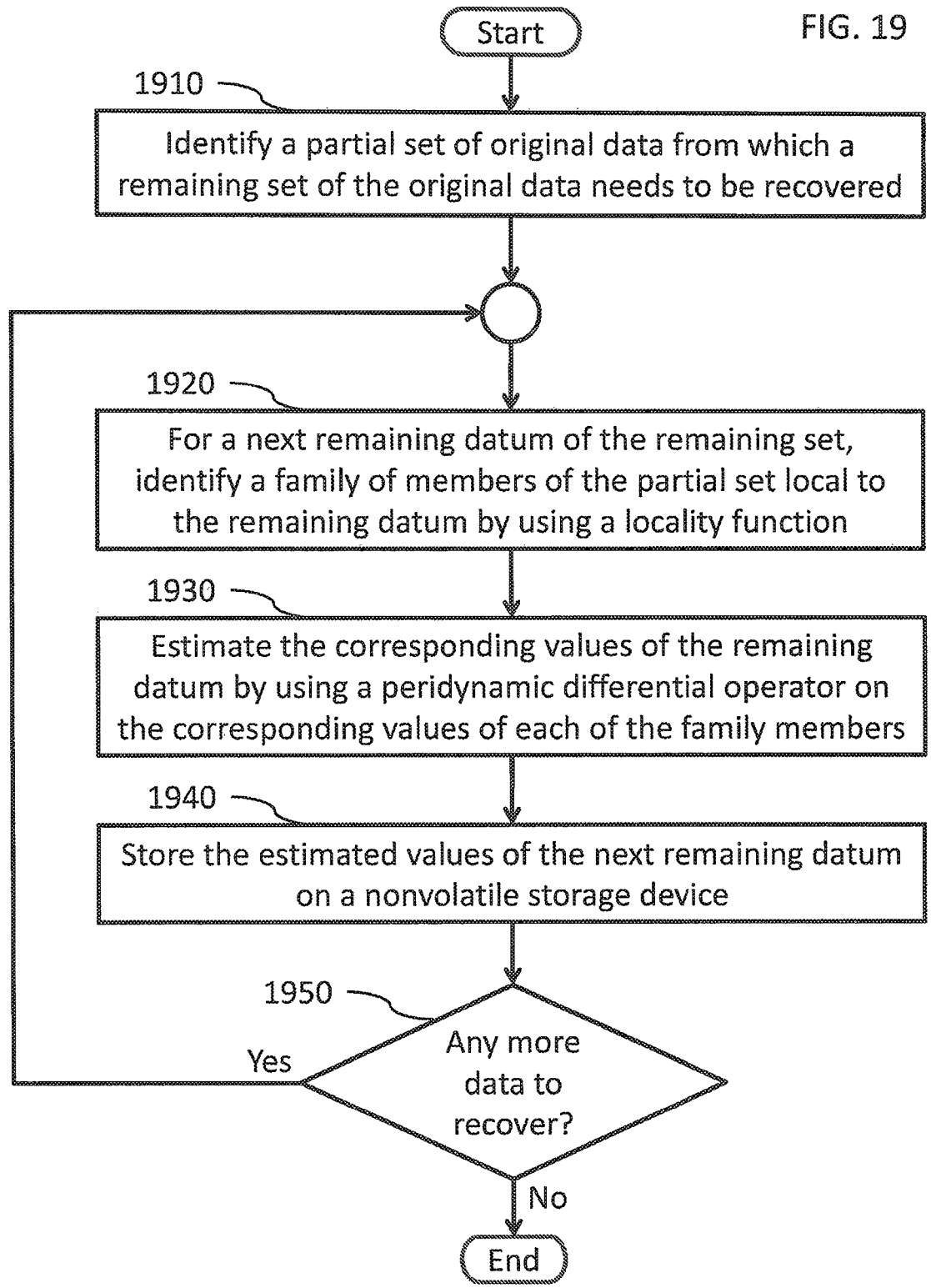

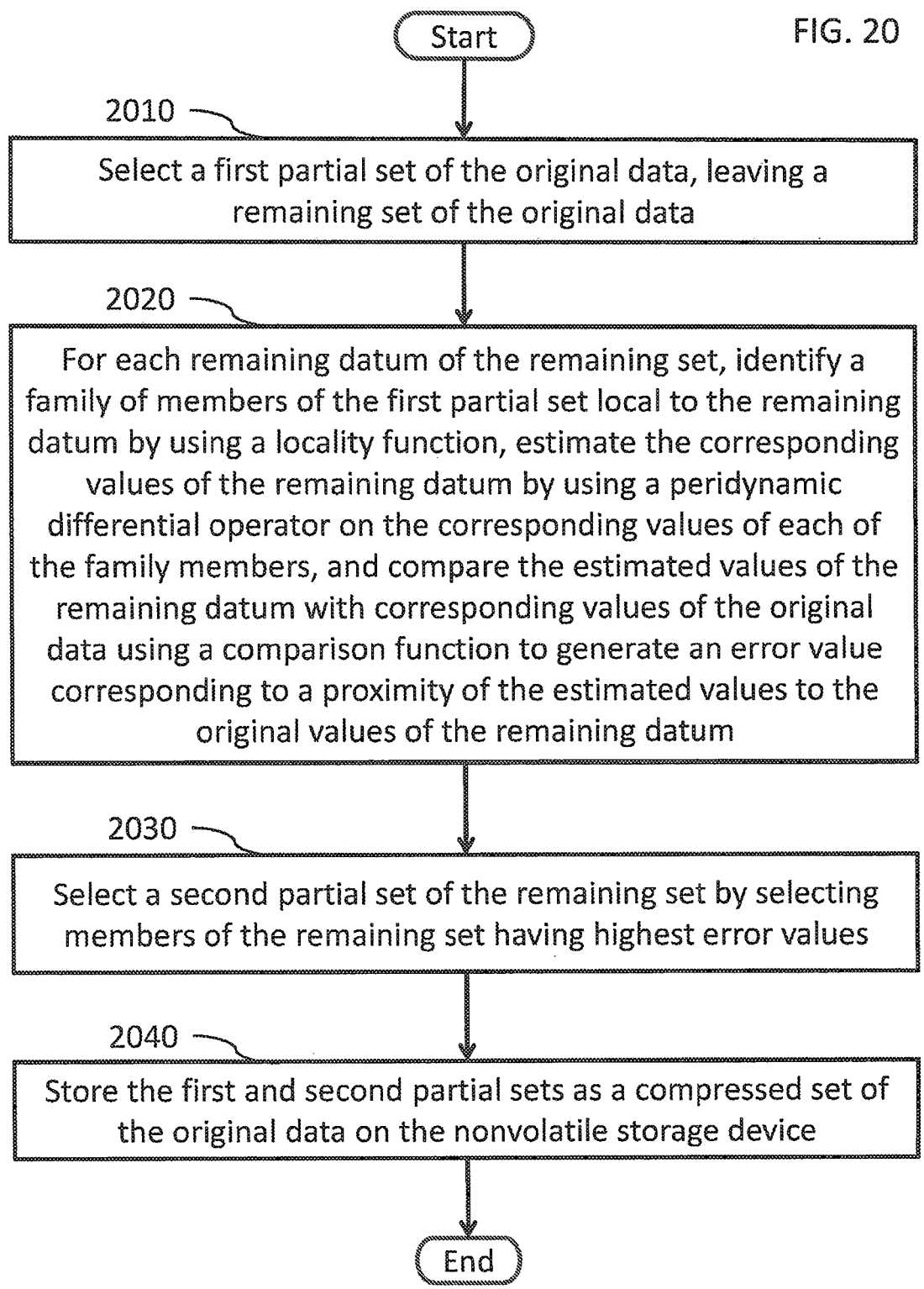

APPLICATIONS OF PERIDYNAMIC DIFFERENTIAL OPERATOR

CROSS-REFERENCE TO RELATED APPLICATION

This applications claims priority to and the benefit of U.S. Provisional Application No. 62/207,300, filed on Aug. 19, 2015, the entire content of which is herein incorporated by reference.

BACKGROUND

1. Field

Aspects of embodiments of the present invention are directed toward applications of a peridynamic differential operator.

2. Description of Related Art

Derivatives are of fundamental importance in many branches of science. They describe the way a data point, entity, object, etc., interacts (e.g., rate of change) with its surrounding media. The relationships between derivatives of involved quantities provide the knowledge and understanding of physical phenomena and enable the construction of governing field equations.

Although differentiation is a powerful tool, it lacks certain properties. For instance, differentiation is a local quantity, and it does not change when the size of the surrounding media shrinks to zero. This is not consistent with reality. Today's experiments frequently pose the length scale requirement, especially at the micro- and nano-scales. In addition, the use of a derivative is pertinent to certain requirements on the regularity of a data set. On the other hand, critical conditions are mostly connected with a surge of irregularities, breakages, and discontinuities. Capturing the physics of these evolutions may require detailed treatment of derivatives specific to each problem.

Although the differentiation process is usually more direct than integration in analytical mathematics, the reverse is often true in computational mathematics, especially in the presence of a jump discontinuity or a singularity. Integration is a non-local process because it depends on the entire range of integration. However, differentiation is a local process and sensitive to abrupt changes. In real life, a physical phenomenon may be only described by a discrete set of data measured from experiments, and it is necessary to calculate the derivatives, to distinguish the noise, and to determine the discontinuities. Any small noise in the measurements may be magnified in the derivatives. Furthermore, many inverse problems arising from mathematical and physical equations may require accurate numerical differentiations.

Approximate solutions of the governing differential equations of many physical fields may require the evaluation of derivatives at discrete points in the domain. Their solutions may become challenging due to the presence of higher order derivatives, abrupt changes in behavior, nonlinearity, and multi-scale resolution arising from characteristic parameters. Currently available techniques for numerical differentiation may be classified as difference methods, interpolation methods, and regularization methods. These techniques may yield satisfactory predictions for smooth and precise variations without scatter. The regularization methods, for example, may express the derivative as the solution to the Volterra integral equation, and reduce the integral equation to a family of well-posed problems that depend on a regularization parameter. However, the determination of the optimal value for this parameter may not be a trivial task.

Image and data recovery may involve highly resource-intensive calculations to maintain accuracy, which may cause strain on a computer system and slow performance, particularly in situations where large sizes of images or data files, or large quantities of image or data files, must be recovered. This may cause inconvenience to users and may potentially damage computer processors by causing issues such as overheating during large batch operations. As such, accurate approximation methods and systems for use with computationally intensive tasks such as image and data recovery may be desired.

SUMMARY

Aspects of embodiments of the present invention are directed toward applications of a nonlocal peridynamic differential operator in computer systems. Further aspects are directed toward use of a nonlocal peridynamic differential operator for applications such as image compression, image recovery, image enhancement, three-dimensional modeling, heat conduction modeling, stress testing, and modeling of cracks and fractures.

According to an embodiment of the present invention, a method of data recovery on a computer system of a remaining set of original data from a partial set of the original data is provided. The partial set is stored on a nonvolatile storage device of the computer system. The original data is organized by a geometry having a locality function. Each original datum of the original data occupies a point of the geometry and has a corresponding distance to each other point of the geometry as defined by the locality function. The original datum further has a corresponding one or more values. The method includes, for each remaining datum of the remaining set: identifying, by a processor of the computer system, a family of points of the geometry corresponding to members of the partial set local to the remaining datum by using the locality function; estimating, by the processor, the corresponding one or more values of the remaining datum by using a peridynamic differential operator on the corresponding one or more values of each of the members of the partial set in the family of points; and storing, by the processor, the estimated values of the remaining datum on the nonvolatile storage device.

The original data may be an image, the geometry may be a set of pixels, and the locality function may be Euclidean distance.

The image may be a two-dimensional image and the corresponding one or more values may include one or more shade values.

The one or more shade values may include three shade values corresponding to three primary colors.

The computer system may further include a display device and the method may further include displaying, by the processor on the display device, the image using the partial set of the original data and the estimated values of the remaining set of the original data.

According to another embodiment of the present invention, a method of data compression on a computer system of a set of original data stored on a nonvolatile storage device of the computer system is provided. The original data is organized by a geometry having a locality function. Each original datum of the original data occupies a point of the geometry and has a corresponding distance to each other point of the geometry as defined by the locality function. The original datum further has a corresponding one or more values. The method includes: selecting, by a processor of the computer system, a first partial set of the original data, leaving a first remaining set of the original data; for each first remaining datum of the first remaining set: identifying, by the processor, a first family of points of the geometry corresponding to members of the first partial set local to the first remaining datum by using the locality function; estimating, by the processor, the corresponding one or more values of the first remaining datum by using a peridynamic differential operator on the corresponding one or more values of each of the members of the first partial set in the first family of points; and comparing, by the processor, the estimated values of the first remaining datum with corresponding ones of the one or more values of the original data using a comparison function to generate a first error value corresponding to a proximity of the estimated values to the original values of the first remaining datum; selecting, by the processor, a second partial set of the first remaining set by selecting members of the first remaining set having corresponding highest said first error values; and storing, by the processor on the nonvolatile storage device, the first and second partial sets of the original data as a first compressed set of the original data.

The method may further include: adding, by the processor, the first partial set to the second partial set, leaving a second remaining set of the original data; for each second remaining datum of the second remaining set: identifying, by the processor, a second family of points of the geometry corresponding to members of the second partial local to the second remaining datum set by using the locality function; estimating, by the processor, the corresponding one or more values of the second remaining datum by using the peridynamic differential operator on the corresponding one or more values of each of the members of the second partial set in the second family of points; and comparing, by the processor, the estimated values of the first remaining datum with corresponding ones of the one or more values of the original data using the comparison function to generate a second error value corresponding to a proximity of the estimated values to the original values of the second remaining datum; selecting, by the processor, a third partial set of the second remaining set by selecting members of the second remaining set having corresponding highest said second error values; and storing, by the processor on the nonvolatile storage device, the second and third partial sets of the original data as a second compressed set of the original data.

The original data may be an image, the geometry may be a set of pixels, and the locality function may be Euclidean distance.

The image may be a two-dimensional image and the corresponding one or more values may include one or more shade values.

The one or more shade values may include three shade values corresponding to three primary colors.

According to yet another embodiment of the present invention, a system for data recovery of a remaining set of original data from a partial set of the original data is provided. The original data is organized by a geometry having a locality function. Each original datum of the original data occupies a point of the geometry and has a corresponding distance to each other point of the geometry as defined by the locality function. The original datum further has a corresponding one or more values. The system includes: a processor; and a non-transitory physical medium. The medium has instructions stored thereon that, when executed by the processor, causes the processor to: identify a family of points of the geometry corresponding to members of the partial set local to the remaining datum by using the locality function; estimate the corresponding one or more values of the remaining datum by using a peridynamic differential operator on the corresponding one or more values of each of the members of the partial set in the family of points; and store the estimated values of the remaining datum on the non-transitory physical medium.

The original data may be an image, the geometry may be a set of pixels, and the locality function may be Euclidean distance.

The image may be a two-dimensional image and the corresponding one or more values may include one or more shade values.

The one or more shade values may include three shade values corresponding to three primary colors.

The system may further include a display device and the instructions, when executed by the processor, may further cause the processor to display the image on the display device using the partial set of the original data and the estimated values of the remaining set of the original data.

According to still yet another embodiment of the present invention, a system for data compression of a set of original data is provided. The original data is organized by a geometry having a locality function. Each original datum of the original data occupies a point of the geometry and has a corresponding distance to each other point of the geometry as defined by the locality function. The original datum further has a corresponding one or more values. The system includes: a processor; and a non-transitory physical medium. The medium has instructions stored thereon that, when executed by the processor, causes the processor to: select a first partial set of the original data, leaving a first remaining set of the original data; for each first remaining datum of the first remaining set: identify a first family of points of the geometry corresponding to members of the first partial set local to the first remaining datum by using the locality function; estimate the corresponding one or more values of the first remaining datum by using a peridynamic differential operator on the corresponding one or more values of each of the members of the first partial set in the first family of points; and compare the estimated values of the first remaining datum with corresponding ones of the one or more values of the original data using a comparison function to generate a first error value corresponding to a proximity of the estimated values to the original values of the first remaining datum; select a second partial set of the first remaining set by selecting members of the first remaining set having corresponding highest said first error values; and store the first and second partial sets of the original data on the non-transitory physical medium as a first compressed set of the original data.

The instructions, when executed by the processor, may further cause the processor to: add the first partial set to the second partial set, leaving a second remaining set of the original data; for each second remaining datum of the second remaining set: identify a second family of points of the geometry corresponding to members of the second partial local to the second remaining datum set by using the locality function; estimate the corresponding one or more values of the second remaining datum by using the peridynamic differential operator on the corresponding one or more values of each of the members of the second partial set in the second family of points; and compare the estimated values of the first remaining datum with corresponding ones of the one or more values of the original data using the comparison function to generate a second error value corresponding to a proximity of the estimated values to the original values of the second remaining datum; select a third partial set of the second remaining set by selecting members of the second remaining set having corresponding highest said second error values; and store the second and third partial sets of the original data on the non-transitory physical medium as a second compressed set of the original data.

The original data may be an image, the geometry may be a set of pixels, and the locality function may be Euclidean distance.

The image may be a two-dimensional image and the corresponding one or more values may include one or more shade values.

The one or more shade values may include three shade values corresponding to three primary colors.

According to the above and other aspects, accurate approximation methods and systems that employ a nonlocal peridynamic derivative operator are provided for applications such as image and data recovery, image compression and enhancement, three-dimensional modeling, heat conduction modeling, stress testing, and modeling of cracks and fractures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate example embodiments of the present invention. These drawings, together with the description, serve to better explain aspects and principles of the present invention.

FIGS. 5A-5F illustrate an example peridynamic construction of a two-variable function and its partial derivatives of up to the second order according to an embodiment of the present invention and the corresponding deviations from corresponding comparable analytical evaluations of the function and its partial derivatives.

FIG. 19 is a flow diagram illustrating an example method of data recovery on a computer system according to an embodiment of the present invention.

FIG. 20 is a flow diagram illustrating an example method of data compression on a computer system according to an embodiment of the present invention.

DETAILED DESCRIPTION

Figure 1:
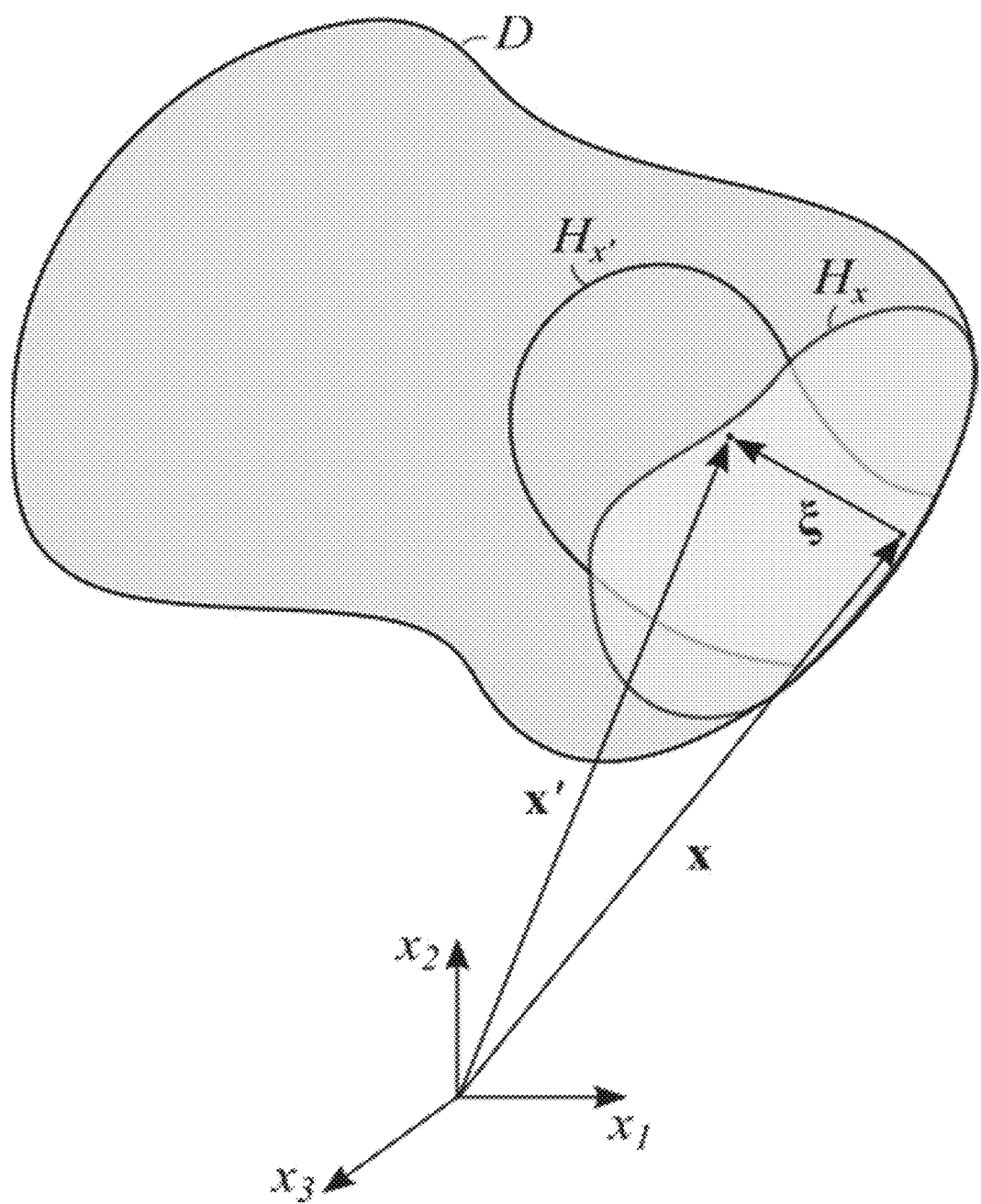
FIG. 1 illustrates an example interaction of peridynamic points with arbitrary family size and shape according to an embodiment of the present invention.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein.

Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

The electronic or electric devices and/or any other relevant devices or components according to embodiments of the present invention described herein may be implemented utilizing any suitable hardware, firmware (e.g., an application-specific integrated circuit (ASIC)), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

In addition, the various components of these devices may be a process or thread, running on one or more computer processors (such as microprocessors), in one or more computing devices, executing computer program instructions and interacting with other system components for performing the various functionalities described herein. The computer program instructions may be stored in a memory that may be implemented in a computing device using a standard memory device such as random access memory (RAM). The computer program instructions may also be stored in other, non-transitory, computer readable media such as, for example, a CD-ROM, flash drive, or the like.

Further, a person of skill in the art should recognize that the functionality of various computing devices may be combined or integrated into a single computing device, or the functionality of a particular computing device may be distributed across one or more other computing devices without departing from the spirit and scope of the present invention.

The nonlocal peridynamic (PD) theory has proven extremely robust for predicting damage nucleation and propagation in materials under complex loading conditions. Its equations of motion, originally derived based on the principle of virtual work, do not contain any spatial derivatives of the displacement components. Thus, their solution does not require special treatment in the presence of geometric and material discontinuities. A more complete description of the nonlocal PD theory may be found in Appendix A of the present application.

Embodiments of the present invention present an alternative approach to derive the peridynamic equations of motion by recasting displacement equilibrium equations into their nonlocal form by introducing the peridynamic differential operator. In addition, this operator permits the nonlocal form of expressions for the determination of the stress and strain components. The capability of this differential operator is demonstrated in example embodiments by constructing solutions to ordinary, partial differential equations and derivatives of scattered data, as well as image compression and recovery without employing any special filtering and regularization techniques.

The peridynamic theory is nonlocal and was introduced to remove the concern of discontinuities in a domain of interest. The peridynamic theory may be considered a reformulation of the equations of motion in solid mechanics, and provides mathematical tools that are well-suited for analyzing data with discontinuities (e.g., singularities) or modeling bodies with discontinuities (e.g., cracks). The concept of peridynamics restores the interactive nature of a phenomenon as part of the solution method, which may be useful as most physical phenomena are interactive (nonlocal) in nature, and the interactive nature is lost during local differentiation.

The original peridynamic concept, also known as the "bond-based peridynamic theory," is based on the assumption of pairwise interactions of the same magnitude. However, the bond-based peridynamic theory suffers from a constraint on material properties, such as requiring the Poisson's ratio to be one-fourth for isotropic materials. In addition, it does not distinguish between volumetric and distortional deformations; thus, it may be unsuitable to invoke a plastic incompressibility condition, or to utilize with existing material models.

A more general formulation, also known as the "state-based" PD theory, eliminates the limitations of the "bond-based" peridynamics. The PD equations of motion were derived by using the principle of virtual work in terms of force density vectors, which are dependent on the stretch between the material points. The balance of linear momentum is automatically satisfied because the principle of virtual work represents its weak form. However, the requirement to satisfy the balance of angular momentum permits the determination of the directions of the force density vectors. If the force density vectors are aligned with the relative position vector between the material points in the deformed state, the balance of angular momentum is automatically satisfied. This special case is distinguished from the more general case by referring to it as the "ordinary state-based" peridynamics.

This requirement on balance of angular momentum may also be satisfied by expressing the force density vectors in terms of the deformation gradient and stress tensors of classical continuum mechanics. Thus, approximating the deformation gradient tensor in terms of PD states permits the use of any existing material model in the PD theory. It is referred to as the "nonordinary state-based" peridynamics. However, it suffers from the presence of oscillations in the regions of steep gradients, such as the crack tip. The source of such oscillations is due to the inadequate approximation in the force density vector. Various non-mathematical techniques may reduce these oscillations. However, the oscillations emerge because the second-order derivatives are approximated by applying the first-order derivative approximation twice, as in the case of a finite difference table. The force density vectors for the bond-based and ordinary state-based peridynamics may be derived.

In its original form, the PD theory does not concern the concept of stress and strain; however, it is possible to define a stress tensor within the PD framework (e.g., derived from nonlocal PD interactions). The stress tensor may be obtained from the PD forces that pass through a material point volume. For a sufficiently smooth motion, a constitutive model, and any existing nonhomogeneities, may show that the PD stress tensor converges to a Piola-Kirchhoff stress tensor in the limiting case where the horizon size converges to zero.

Based on these concepts, in example embodiments of the present invention, a nonlocal peridynamic differential operator may be used to recast the local form of various differential equations to their nonlocal forms. This nonlocal peridynamic differential operator may be applied to perform differentiation, compression and recovery of discrete data (e.g., images), and to solve differential equations. In particular, it establishes the explicit form of the PD force density vectors as they are obtained from Navier's equilibrium equations. Furthermore, it presents explicit nonlocal expressions for the stress and strain components. Thus, it enables the use of many existing strain- and stress-based failure criteria for fatigue and fracture. Lastly, it removes the need to correct the peridynamic material parameters near the boundaries arising from the assumption of a material point having a symmetric (spherical) family.

According to peridynamic theory, variation of a scalar field $f=f(x)$ at point x may be influenced by its interaction with other points x' (such as nearby points x') in the domain D, as shown in FIG. 1. With respect to a Cartesian coordinate system, the relative position vector between these points may be defined as $\xi=x'-x$. Each point in the domain may occupy an infinitesimally small incremental volume. In addition, each point x may have its own family members, and it only interacts with its family of points, Hx. Similarly, another point x' is influenced by the variation of points in its own family, Hx'. Family, for example, may be thought of as those points close to x, but the definition of close is allowed to vary between points and between embodiments.

FIG. 1 illustrates an example interaction of peridynamic points with arbitrary family size and shape according to an embodiment of the present invention.

In the original form of PD theory, the structure of a family is symmetric (spherical) and uniform. Thus, the characteristic length parameter (radius of sphere), δ referred to as the "horizon," is constant. The size of the family or the internal length parameter, δ, is the measure of nonlocal behavior. Furthermore, the degree of interaction between the points remains the same in each family, and it is specified by a nondimensional weight function, $w(|\xi|)$.

The weight function $w(|\xi|)$ may reflect the degree of nonlocality among the points, and may be chosen such that it captures the physical and numerical characteristics of the problem. However, in real-life problems, the degree of interaction usually decreases with increasing distances, and examples of such forces may be atomic interactions, gravity, and Lorentz force. Hence, the weight function may specify a distribution that allows the interaction to decrease with increasing distance between the points. Although different distributions, such as Cauchy, Gamma, etc., may be used to describe the degree of interaction, a normal (Gaussian) distribution may be appropriate because a Maxwell-Boltzmann distribution leads to a normal distribution in the continuum limit, and most physical systems obey a Maxwell-Boltzmann distribution in statistical mechanics.

The locality of interactions depends on the internal length; the interactions become more local with decreasing internal length. Thus, the family shape may be an important parameter. In the original PD theory, the shape of the family is specified as a sphere, cylinder, or line in accordance with the dimension of the analysis. In addition, the position of point x in its family is symmetric. However, in most real-life applications, the family size of a material point changes near the boundaries and corners due to factors such as truncation; thus, it may no longer be symmetric. As such, the peridynamic material parameters that appear in the PD equation of motion may need correction near the boundaries rather than being based on the assumption of a symmetric family shape.

Accordingly, embodiments of the present invention may remove all of the aforementioned assumptions. For example, in embodiments of the present invention, the size and extent (shape) of each family may be different. Therefore, the PD equations of motion may be expressed in terms of the engineering constants rather than the PD material parameters; embodiments of the present invention may remove the requirement of parameters' correction. In addition, according to one or more embodiments, each point in the domain may occupy a different infinitesimally small incremental volume, permitting non-uniform discretization. In further embodiments, the degree of interaction between the material points, specified by a nondimensional weight function, $w(|\xi|)$, may be different in each family. This ability permits each material point to have its own unique family with an arbitrary position. In addition, each family may have members with varying material properties and non-uniform discretization according to one or more embodiments.

For example, according to embodiments of the present invention, for spatial derivatives, the interior points may be assigned a symmetric family while the points near the boundary possess an asymmetric family. In addition, for temporal derivatives as part of an implicit analysis, the points from the previous time steps may have influence on the points for the current time step. Therefore, according to one or more embodiments, the family may be asymmetric for both interior and exterior points along the time axis. In other words, differentiation along the time axis may have a memory. As such, in embodiments of the present invention, the family of a point may be asymmetric due to time dependency and due to non-uniform spatial discretization.

A PD partial differential operator may be constructed by considering the Taylor series expansion of a multi-variable scalar field $f(x')=f(x+\xi)$ in an M-dimensional space as $$f(x+\xi) = \sum_{n_1=0}^{N} \sum_{n_2=0}^{N} \cdots \sum_{n_M=0}^{N} \frac{1}{n_1!n_2!\ldots n_M!} \quad (1)$$

$$\xi_1^{n_1} \xi_2^{n_2} \ldots \xi_M^{n_M} \frac{\partial^{n_1+n_2+\ldots+n_M} f(x)}{\partial x_1^{n_1} \partial x_2^{n_2} \ldots \partial x_M^{n_M}} + R(N,x),$$

where $\xi=x'-x$ and $R(N,x)$ represents the remainder. Assuming the contribution of the remainder is negligibly small and invoking the property of the orthogonal function, $g_N^{p_1 p_2 \cdots p_M}(\xi)$, result in the PD nonlocal expression for the partial derivatives of any order as $$\frac{\partial^{p_1+p_2+\ldots+p_M} f(x)}{\partial x_1^{p_1} \partial x_2^{p_2} \ldots \partial x_M^{p_M}} = \int_{H_x} f(x+\xi) g_N^{p_1 p_2 \cdots p_M}(\xi) dV, \quad (2)$$

in which $p_i$ denotes the order of differentiation with respect to variable $x_i$ with $i=1,\ldots,M$.

The peridynamic functions $g_N^{p_1 p_2 \cdots p_M}(\xi)$ possess the orthogonality property of $$\int_{H_x} \xi_1^{n_1} \xi_2^{n_2} \ldots \xi_M^{n_M} g_N^{p_1 p_2 \cdots p_M}(\xi) dV = \quad (3)$$

$$n_1!n_2!\ldots n_M! \delta_{n_1 p_1} \delta_{n_2 p_2} \ldots \delta_{n_{M-1} p_{M-1}} \delta_{n_M p_M},$$

in which $n_i = 0, \ldots, N$. They may be constructed as $$g_N^{p_1 p_2 \cdots p_M}(\xi) = \sum_{q_1+q_2+\ldots+q_M=0}^{N} a_{q_1 q_2 \cdots q_M}^{p_1 p_2 \cdots p_M} w_{q_1 q_2 \cdots q_M}(|\xi|) \xi_1^{q_1} \xi_2^{q_2} \ldots \xi_M^{q_M}, \quad (4)$$

where $w_{q_1 q_2 \cdots q_M}(|\xi|)$ are the weight functions associated with each term $\xi_1^{q_1} \xi_2^{q_2} \ldots \xi_M^{q_M}$ in the polynomial expansion. Depending on the nature of the nonlocality, the weight function representing the degree of interaction may be the same or different for each term in the Taylor series expansion.

The unknown coefficients, $a_{q_1 q_2 \cdots q_M}^{p_1 p_2 \cdots p_M}$ may be determined from the solution of $$\sum_{q_1+q_2+\ldots+q_M=0}^{N} A_{(n_1 n_2 \cdots n_M)(q_1 q_2 \cdots q_M)} a_{q_1 q_2 \cdots q_M}^{p_1 p_2 \cdots p_M} = b_{n_1 n_2 \cdots n_M}^{p_1 p_2 \cdots p_M} \quad (5)$$

in which $q_i=0, \ldots, N$. The coefficient matrix may be constructed as $$A_{(n_1 n_2 \cdots n_M)(q_1 q_2 \cdots q_M)} = \int_{H_x} w_{q_1 q_2 \cdots q_M}(|\xi|) \xi_1^{n_1+q_1} \xi_2^{n_2+q_2} \ldots \xi_M^{n_M+q_M} dV \text{ and} \quad (6a)$$

$$b_{n_1 n_2 \cdots n_M}^{p_1 p_2 \cdots p_M} = n_1! n_2! \ldots n_M! \, \delta_{n_1 p_1} \delta_{n_2 p_2} \ldots \delta_{n_M p_M}. \quad (6b)$$

This PD differential operator according to embodiments of the present invention recovers the local differentiation as the size of the family $H_x$ decreases or the number of terms in the functions $g_N^{p_1 p_2 \cdots p_M}(\xi)$ increases. Thus, the degree of nonlocality reduces with decreasing family size and with increasing number of terms in the Taylor series expansion.

According to one or more embodiments, the PD differential operator may be obtained by the computation of the coefficients $a_{q_1 q_2 \cdots q_M}^{p_1 p_2 \cdots p_M}$. The condition number of the coefficient matrix $A_{n_1 n_2 \cdots n_M q_1 q_2 \cdots q_M}$ may become poor, and round-off error may become significant for higher order derivatives. In general, the round-off error may be avoided by increasing the family size for higher order derivatives.

Therefore, in one or more embodiments, when computing higher order derivatives, the family size may be adjusted accordingly, as would be apparent to one of ordinary skill in the art. For example, if the family size is too small, then round-off errors may dominate, and if it is too large, then the results may deviate from local values. In general, the family size should reflect the characteristics of the phenomenon, as would be apparent to one of ordinary skill in the art. In addition, in one or more embodiments, an optimum or near optimum family size may be used to achieve convergence and sufficient accuracy within a practical amount of computational time, as would be apparent to one of ordinary skill in the art.

If the value of f(x) is known in Eq. (1), the peridynamic functions $g_N^{p_1 p_2 \cdots p_M}(\xi)$ may be constructed for $f(x+\xi)-f(x)$. In other words, the range of $n_i$, $p_i$, and $q_i$ does not include zero. In one or more embodiments, the derivation and explicit form of the PD differential operator for derivatives of up to second order may readily be derived, as would be apparent to one of ordinary skill in the art.

Although the differentiation process is usually more direct than integration in analytical mathematics, the reverse is often true in computational mathematics, especially in the presence of a jump discontinuity or a singularity. Integration is a nonlocal process because it depends on the entire range of integration. However, differentiation is a local process. Its generalization to fractional derivatives with noninteger powers of the differentiation order unifies the local differentiation and nonlocal integration. The nonlocal fractional differentiation reduces to the local differentiation when its order is an integer. However, it lacks a proper physical meaning (e.g., a representation of the physical phenomenon) when its order is noninteger.

In real life, the phenomenon may be only described by a measured noisy data set, for which the derivatives of a discrete data set may need to be calculated to distinguish the noise, and to determine the discontinuous points. Numerical differentiation of noisy data may pose additional challenges because any small changes in the measurement may cause large changes in the derivatives.

In addition, computational methods commonly use iterative methods to solve systems of equations. For example, the process may start with an initial guess towards finding the true solution, and the initial guess may be improved based on its approximate derivative until an acceptable approximation for the solution is reached. In one or more embodiments, accurate approximation of the derivative may accelerate the rate of convergence for the acceptable solution.

Mathematical models of geometric probability and statistics to construct the three-dimensional structure from two-dimensional or one-dimensional observational data (stereology) emerge in the form of integral equations, whose solution may require numerical differentiation. In fact, the success of stereology may hinge upon the solution of the Abel-type integral equations and numerical differentiation methods. Furthermore, many inverse problems arising from mathematical and physical equations may require accurate numerical differentiations. For instance, finding the heat capacity of a gas as a function of temperature may require the numerical differentiation of the measured heat content.

In addition, approximate solution of the governing (ordinary or partial) differential equations of many physical fields may require the evaluation of derivatives at discrete points in the domain. Their solution may become challenging if the field variable exhibits discontinuities or sharp gradients.

Currently available techniques for numerical differentiation may be classified as difference methods, interpolation methods, and regularization methods. These techniques may yield satisfactory predictions for smooth and precise variations without scatter. Regularization methods may express the derivative as the solution to the Volterra integral equation, and may reduce the integral equation to a family of well-posed problems that depend on a regularization parameter. However, the determination of the optimal value for this parameter may not be a trivial task.

It is also worth noting that the standard numerical techniques for differentiation, especially for a higher order of derivatives, may not be satisfactory in many applications. Even if a mathematical function describes a physical field, we might know its values only at discrete points, without knowing the explicit form of the function. Although we have the ability to perform exact differentiations, they may be very complicated to the extent that an exact computation of the derivative requires extensive function evaluations. Therefore, it might be significantly simpler to approximate the derivative instead of computing its exact value.

Accordingly, mathematical modeling and understanding most of physical phenomena may require the determination of derivatives of the field variable or the discrete data with or without scatter. In one or more embodiments, the nonlocal PD differential operator may enable the computational solution of complex differential equations and evaluation of derivatives of smooth or scattered data in the presence of jump discontinuities or singularities. As such, according to embodiments of the present invention, the nonlocal PD differential operator may provide the bridge between differentiation and integration.

The peridynamic equations of motion may be derived in the form $$\rho(x)\frac{\partial^2 u(x,t)}{\partial t^2} = \int_{H_x} (t(x,t) - t'(x',t))\, dV + b(x,t) \text{ or} \tag{7a}$$

$$\rho(x_{(p)})\frac{\partial^2 u(x_{(p)},t)}{\partial t^2} = \sum_{q=1} (t(x_{(p)},t) - t'(x_{(q)},t))\, V_{(q)} + b(x_{(p)},t), \tag{7b}$$

in which $u(x,t)$, $t(x,t)$, and $b(x,t)$ represent the displacement, force density, and body force density vectors, respectively. In discrete form, the volume of each material point $V_{(q)}$ is infinitesimally small, and material points $x_{(p)}$ and $x_{(q)}$ correspond to $x$ and $x'$, respectively.

The components of the force density vector $t_i(x)$, with ($i=1, 2, 3$), may be expressed in terms of the strain energy density function $W(x)$ in the form $$t_i(x_{(p)})V_{(p)} = \frac{\partial W(x_{(p)})}{\partial(u_i(x_{(q)}) - u_i(x_{(p)}))} \text{ and} \tag{8a}$$

$$t_i(x_{(q)})V_{(q)} = \frac{\partial W(x_{(q)})}{\partial(u_i(x_{(p)}) - u_i(x_{(q)}))}. \tag{8b}$$

For a linear and isotropic material response, the strain energy density may be expressed as $$W(x) = \frac{1}{2}C_{jk\ell m}\varepsilon_{\ell m}\varepsilon_{jk} \text{ for } (j, k, \ell, m = 1, 2, 3), \text{ with} \tag{9a}$$

$$\sigma_{jk} = \frac{1}{2}C_{jk\ell m}\varepsilon_{\ell m}, \tag{9b}$$

in which $$C_{jk\ell m} = \mu(\delta_{j\ell}\delta_{km} + \delta_{jm}\delta_{k\ell}) + \lambda\delta_{jk}\delta_{\ell m}, \tag{9c}$$

with $\lambda$ and $\mu$ representing the Lame's material constants, and $$\varepsilon_{jk} = \frac{1}{2}(u_{j,k} + u_{k,j}). \tag{9d}$$

Noting that $C_{ijkl} = C_{jikl} = C_{ijlk} = C_{klij}$ and using Eq. (8), the components of the force density vectors at material points $x$ and $x'$ may be rewritten as $$t_i(x_{(p)}) = \frac{1}{V_{(p)}}C_{\ell mjk}\varepsilon_{\ell m}(x_{(p)})\frac{\partial\varepsilon_{jk}(x_{(p)})}{\partial(u_i(x_{(q)}) - u_i(x_{(p)}))}, \tag{9e}$$

-continued $$t_i(x_{(q)}) = \frac{1}{V_{(q)}}C_{\ell mjk}\varepsilon_{\ell m}(x_{(q)})\frac{\partial\varepsilon_{jk}(x_{(q)})}{\partial(u_i(x_{(p)}) - u_i(x_{(q)}))},$$

By using the PD differential operator for a symmetric and spherical family, the strain components may be expressed as $$\varepsilon_{jk}(x_{(p)}) = \tag{10a}$$
$$\frac{1}{2}\frac{3}{4\pi V_1}\sum_{q=1} w_1(|\xi|)[\delta_{k\ell}(u_{j(q)} - u_{j(p)}) + \delta_{j\ell}(u_{k(q)} - u_{k(p)})]\xi_\ell V_{(q)}$$

and $$\varepsilon_{jk}(x_{(q)}) = \tag{10b}$$
$$\frac{1}{2}\frac{3}{4\pi V_1}\sum_{p=1} w_1(|\xi|)[\delta_{k\ell}(u_{j(p)} - u_{j(q)}) + \delta_{j\ell}(u_{k(p)} - u_{k(q)})]\xi_\ell V_{(p)},$$

in which $\xi_l = (x_{l(q)} - x_{l(p)})$.

Thus, the derivatives of the strain components may be evaluated as $$\frac{\partial\varepsilon_{jk}(x_{(p)})}{\partial(u_i(x_{(q)}) - u_i(x_{(p)}))} = \tag{11a}$$
$$\frac{\partial\varepsilon_{jk}(x_{(p)})}{\partial(u_{i(q)} - u_{i(p)})} = \frac{1}{2}\frac{3}{4\pi V_1}w_1(|\xi|)[\delta_{ji}\xi_k + \delta_{ki}\xi_j]V_{(q)} \text{ and}$$

$$\frac{\partial\varepsilon_{jk}(x_{(q)})}{\partial(u_i(x_{(p)}) - u_i(x_{(q)}))} = \tag{11b}$$
$$\frac{\partial\varepsilon_{jk}(x_{(q)})}{\partial(u_{i(p)} - u_{i(q)})} = \frac{1}{2}\frac{3}{4\pi V_1}w_1(|\xi|)[\delta_{ji}\xi_k + \delta_{ki}\xi_j]V_{(p)},$$

leading to $$\frac{\partial\varepsilon_{jk}(x_{(p)})}{\partial(u_i(x_{(q)}) - u_i(x_{(p)}))} = -\frac{\partial\varepsilon_{jk}(x_{(q)})}{\partial(u_i(x_{(p)}) - u_i(x_{(q)}))}. \tag{11c}$$

With this representation, the force density vectors may be rewritten as $$t_i(x_{(p)}) = \frac{1}{2}\frac{3}{4\pi V_1}\frac{1}{V_{(p)}}C_{\ell mjk}\varepsilon_{\ell m}(x_{(p)})w_1(|\xi|)[\delta_{ji}\xi_k + \delta_{ki}\xi_j]V_{(q)}, \text{ and} \tag{12a}$$

$$t_i(x_{(q)}) = -\frac{1}{2}\frac{3}{4\pi V_1}\frac{1}{V_{(q)}}C_{\ell mjk}\varepsilon_{\ell m}(x_{(q)})w_1(|\xi|)[\delta_{ji}\xi_k + \delta_{ki}\xi_j]V_{(p)}. \tag{12b}$$

Considering the symmetric properties of $C_{lmjk}$ and assuming that $V_{(q)} = V_{(p)}$, these expressions may be further evaluated as $$t_i(x_{(p)}) = \frac{3}{4\pi V_1}C_{\ell mjk}\varepsilon_{\ell m}(x_{(p)})w_1(|\xi|)\xi_k, \text{ and} \tag{13a}$$

$$t_i(x_{(q)}) = -\frac{3}{4\pi V_1}C_{\ell mjk}\varepsilon_{\ell m}(x_{(q)})w_1(|\xi|)\xi_k. \tag{13b}$$

Substituting for the force density vectors in Eq. (7) leads to $$\rho(x_{(p)})\frac{\partial^2 u_i(x_{(p)}, t)}{\partial t^2} = \frac{3}{4\pi V_1}C_{\ell mjk}\sum_{q=1}w_1(|\xi|)\varepsilon_{\ell m}(x_{(p)})\xi_k V_{(q)} + \qquad (14)$$

$$\frac{3}{4\pi V_1}C_{\ell mjk}\sum_{q=1}w_1(|\xi|)\varepsilon_{\ell m}(x_{(q)})\xi_k V_{(q)} + b(x_{(p)}, t).$$

Note that for a symmetric horizon, $$\frac{3}{4\pi V_1}C_{\ell mik}\varepsilon_{\ell m}(x_{(p)})\sum_{q=1}w_1(|\xi|)\xi_k V_{(q)} = 0. \qquad (15)$$

This result permits Eq. (14) to be recast as $$\rho(x_{(p)})\frac{\partial^2 u_i(x_{(p)}, t)}{\partial t^2} = \qquad (16a)$$

$$C_{\ell mik}\left(\frac{3}{4\pi V_1}\sum_{q=1}w_1(|\xi|)(\varepsilon_{\ell m}(x_{(q)}) - \varepsilon_{\ell m}(x_{(p)}))\xi_k V_{(q)}\right) + b(x_{(p)}, t) \text{ or}$$

$$\rho(x)\frac{\partial^2 u_i(x, t)}{\partial t^2} = \qquad (16b)$$

$$C_{\ell mik}\left(\frac{3}{4\pi V_1}\int_H w_1(|\xi|)(\varepsilon_{\ell m}(x') - \varepsilon_{\ell m}(x))\xi_k dV\right) + b(x, t).$$

In accordance with the PD differential operator, this equation may be expressed as $$\rho(x)\frac{\partial^2 u_i(x, t)}{\partial t^2} = C_{\ell mik}\frac{\partial \varepsilon_{\ell m}(x)}{\partial x_k} + b(x, t) \text{ and} \qquad (17a)$$

$$\rho(x)\frac{\partial^2 u_i(x, t)}{\partial t^2} = \frac{\partial}{\partial x_k}(C_{ik\ell m}\varepsilon_{\ell m}(x)) + b(x, t) \text{ and} \qquad (17b)$$

$$\rho(x)\frac{\partial^2 u_i(x, t)}{\partial t^2} = \frac{\partial}{\partial x_k}(\sigma_{ik}(x)) + b(x, t). \qquad (17c)$$

This proves that the peridynamic equations of motion recover those of classical continuum mechanics.

The counterpart of the PD equation of motion (e.g., as described by Eq. (7) in classical continuum mechanics), known as Navier's displacement equilibrium equation for "small deformations," may be written as $$\rho(x)\frac{\partial^2 u_i(x, t)}{\partial t^2} = \qquad (18)$$

$$\left(\kappa - \frac{5\mu}{3}\right)\frac{\partial \theta}{\partial x_i} + \mu\left(\frac{\partial^2 u_i}{\partial x_k \partial x_k} + 2\frac{\partial^2 u_k}{\partial x_i \partial x_k}\right) + b_i(x, t) \text{ for } (i, k = 1, 2, 3),$$

with κ and μ representing the bulk and shear modulus of the material, respectively.

The dilatation, θ, is defined as $$\theta = \frac{\partial u_k}{\partial x_k}. \qquad (19)$$

Comparison of these equations reveals that $$\int_{H_x}(t_i(x, t) - t_i(x', t))dV = \left(\kappa - \frac{5\mu}{3}\right)\frac{\partial \theta}{\partial x_i} + \mu\left(\frac{\partial^2 u_i}{\partial x_k \partial x_k} + 2\frac{\partial^2 u_k}{\partial x_i \partial x_k}\right). \qquad (20)$$

For a special case of a spherical and symmetric family, the partial derivatives of displacement components up to second order may be expressed as $$\frac{\partial u_i}{\partial x_k} = \frac{3}{4\pi V_1}\int_H w_1(|\xi|)[u_i(x + \xi) - u_i(x)]\xi_k dV, \qquad (21a)$$

$$\frac{\partial^2 u_i}{\partial x_j^2} = \frac{3}{4\pi V_2}\int_{H_x}w_2(|\xi|)(u_i(x + \xi) - u_i(x))(5\xi_j^2 - \xi_k\xi_k)dV, \qquad (21b)$$

and $$\frac{\partial^2 u_i}{\partial x_j \partial x_k} = \frac{15}{4\pi V_2}\int_{H_x}w_2(|\xi|)(u_i(x + \xi) - u_i(x))\xi_j\xi_k dV \qquad (21c)$$

with $j \neq k$.

In addition, the Laplacian operator may be expressed as $$\nabla^2 u_i = \frac{\partial^2 u_i}{\partial x_k \partial x_k} = \frac{6}{4\pi V_2}\int_{H_x}w_2(|\xi|)(u_i(x + \xi) - u_i(x))\xi_k\xi_k dV. \qquad (22)$$

The dilatation and its derivative become $$\theta = \frac{3}{4\pi V_1}\int_{H_x}w_1(|\xi|)(u_k(x + \xi) - u_k(x))\xi_k dV \text{ and} \qquad (23a)$$

$$\frac{\partial \theta}{\partial x_k} = \frac{3}{4\pi V_1}\int_{H_x}w_1(|\xi|)(\theta(x + \xi) - \theta(x))\xi_k dV. \qquad (23b)$$

Substituting for the derivatives of the displacement components in Eq. (20) and performing algebraic manipulations lead to $$\int_{H_x}(t(x) - t(x'))dV = \qquad (24)$$

$$\left(\kappa - \frac{5\mu}{3}\right)\frac{3}{4\pi V_1}\int_{H_x}w_1(|\xi|)(\theta(x + \xi) - \theta(x))\xi dV +$$

$$\frac{30\mu}{4\pi V_2}\int_{H_x}w_2(|\xi|)([u(x + \xi) - u(x)] \cdot \xi)\xi dV.$$

This expression leads to the final form of the PD force density vectors as $$t(x) = \qquad (25)$$

$$\left(\left(\frac{5\mu}{3} - \kappa\right)\frac{3}{4\pi V_1}w_1(|\xi|)\theta(x) + \frac{1}{2}\frac{30\mu}{4\pi V_2}w_2(|\xi|)[u(x + \xi) - u(x)] \cdot \xi\right)\xi.$$

The direction of the force density vector is aligned with the relative position vector, ξ, and it recovers the ordinary-state based PD force density vector. It is worth noting that the force density vector also recovers the bond-based PD, which does not distinguish dilation and the distortional part of the deformation; a Poisson's ratio of 1/4 renders $5\mu/3 - \kappa = 0$.

This equation may be further simplified after substituting for the weights, weight functions, and relative displacement vector in terms of the position vectors of point x and $x'=x+\xi$ in the undeformed and deformed states, respectively, as $$u(x+\xi) - u(x) = u' - u = (y' - y) - (x' - x), \qquad (26)$$

in which $y = x + u$ and $y' = x' + u'$. The assumption of "small deformation" permits $$\frac{(y'-y)}{|y'-y|} \cdot \frac{(x'-x)}{|x'-x|} \approx 1 \text{ and} \qquad (27a)$$

$$[u(x+\xi) - u(x)] \cdot \xi \approx |y'-y||\xi| - |\xi|^2. \qquad (27b)$$

The force density vector and dilatation become $$t(x) = \left(\left(\frac{5\mu}{3} - \kappa\right)\frac{9}{4\pi\delta^3}\frac{1}{|\xi|}\theta(x) + \frac{15\mu}{\pi\delta^4}\frac{|y'-y|-|\xi|}{|\xi|}\right)\frac{\xi}{|\xi|} \text{ and} \qquad (28a)$$

$$\theta(x) = \frac{9}{4\pi\delta^3}\int_H \frac{1}{|x'-x|}(|y'-y|-|x'-x|)dV. \qquad (28b)$$

They may be rewritten in their final form as $$t(x) = 2\left(ad\frac{1}{|\xi|}\theta(x) + bs\right)\frac{\xi}{|\xi|}. \text{ and} \qquad (29)$$

$$\theta(x) = d\int_H \delta s \, dV, \qquad (30)$$

in which s is the stretch as defined by $$s = \frac{|y'-y|-|x'-x|}{|x'-x|}, \qquad (31)$$

and a, b, and d are the peridynamic parameters as defined in the form $$a = \frac{1}{2}\left(\frac{5\mu}{3} - \kappa\right), \quad b = \frac{15\mu}{2\pi\delta^4}, \quad d = \frac{9}{4\pi\delta^4}. \qquad (32)$$

These expressions and the parameters are based on the principle of virtual work. These results warrant the connection of the nonlocal differential operator to the peridynamic concept. Thus, in embodiments of the present invention, the differential operator is referred to as the peridynamic differential operator.

In other embodiments, the peridynamic differential operator may be directly applied to the Navier's displacement equilibrium equation expressed in terms of only the second-order derivatives as $$\rho(x)\frac{\partial^2 u_i(x,t)}{\partial t^2} = \mu\frac{\partial^2 u_i}{\partial x_k \partial x_k} + (\lambda + \mu)\frac{\partial^2 u_k}{\partial x_i \partial x_k} + b_i(x,t), \qquad (33)$$

with $\lambda$ and $\mu$ representing the Lame's material constants. Comparison of this equation to that of the PD equation of motion reveals that $$\int_{H_x} (t_i(x,t) - t_i(x',t)) dV = \mu\frac{\partial^2 u_i}{\partial x_k \partial x_k} + (\lambda + \mu)\frac{\partial^2 u_k}{\partial x_i \partial x_k}. \qquad (34)$$

Substituting for the derivatives of the displacement components in Eq. (34) and performing algebraic manipulations lead to $$\int_{H_x} (t(x) - t(x'))dV = \frac{3(\mu-\lambda)}{4\pi V_2}\int_{H_x} w_2(|\xi|)(\xi \cdot \xi)[u(x+\xi) - u(x)]dV + \qquad (35)$$
$$\frac{15(\lambda+\mu)}{4\pi V_2}\int_{H_x} w_2(|\xi|)([u(x+\xi) - u(x)] \cdot \xi)\xi \, dV.$$

For a Poisson's ratio of 1/4, which renders $\lambda - \mu = 0$, this equation reduces to $$\int_{H_x} (t(x) - t_i(x'))dV = \frac{15(\lambda+\mu)}{4\pi V_2}\int_{H_x} w_2(|\xi|)([u(x+\xi) - u(x)] \cdot \xi)\xi \, dV. \qquad (36)$$

The direction of the force density vector is aligned with the relative position vector $\xi$ and it recovers the bond-based PD force density vector. Substituting for the weights and weight functions leads to the specific form of the force density vector as $$t(x) = \frac{15(\lambda+\mu)}{2\pi\delta^2}\frac{|y'-y|-|\xi|}{|\xi|}\frac{\xi}{|\xi|} \text{ or} \qquad (37a)$$

$$t(x) = \frac{15(\lambda+\mu)}{2\pi\delta^2}s\frac{\xi}{|\xi|}, \qquad (37b)$$

which is the same as that of the bond-based PD force density vector.

In the case of an anti-plane shear deformation of $u_1 = u_2 = 0$, $u_3 = u_3(x_1, x_2)$, the Navier's displacement equilibrium equations reduce to $$\rho(x)\frac{\partial^2 u_3(x,t)}{\partial t^2} = \mu\frac{\partial^2 u_3}{\partial x_k \partial x_k} + b_3(x,t) \text{ for } (k=1,2). \qquad (38)$$

Comparison of this equation to that of the PD equation of motion reveals that $$\int_{H_x} (t_3(x,t) - t_3(x',t))dV = \mu\left(\frac{\partial^2 u_3}{\partial x_1^2} + \frac{\partial^2 u_3}{\partial x_2^2}\right). \qquad (39)$$

Substituting for the derivatives of the displacement component in Eq. (39) and performing algebraic manipulations lead to $$\int_{H_x} (t_3(x,t) - t_3(x',t))dV = \frac{6\mu}{\pi\ell\delta^3}\int_{H_x}\frac{1}{|\xi|}(u_3(x+\xi) - u_3(x))dV, \qquad (40)$$

in which the coefficient of the integral referred to as the PD material parameter (bond constant) $c = 6\mu/\pi l \delta^3$ may be derived for anti-plane and torsional deformations of a component with length l.

Recasting the local differentiation in terms of the nonlocal PD differential operator may require spatial integration, which is not amenable to analytical methods. Therefore, in embodiments of the present invention, the integration may be performed by using the collocation method of a meshless scheme due to its simplicity. The domain may be divided into a finite number of cells, each with a specific length, area, or volume (geometric entity). They may have a uniform or non-uniform distribution. Associated with a particular point, the integration may involve the summation of the geometric entity of the points within each family.

According to one or more embodiments of the present invention, prior to discretizing the field equation and boundary conditions/initial conditions, the family of each collocation point may be formed, and its degree of interaction with the family members (weight function) may be specified.

Figure 2:
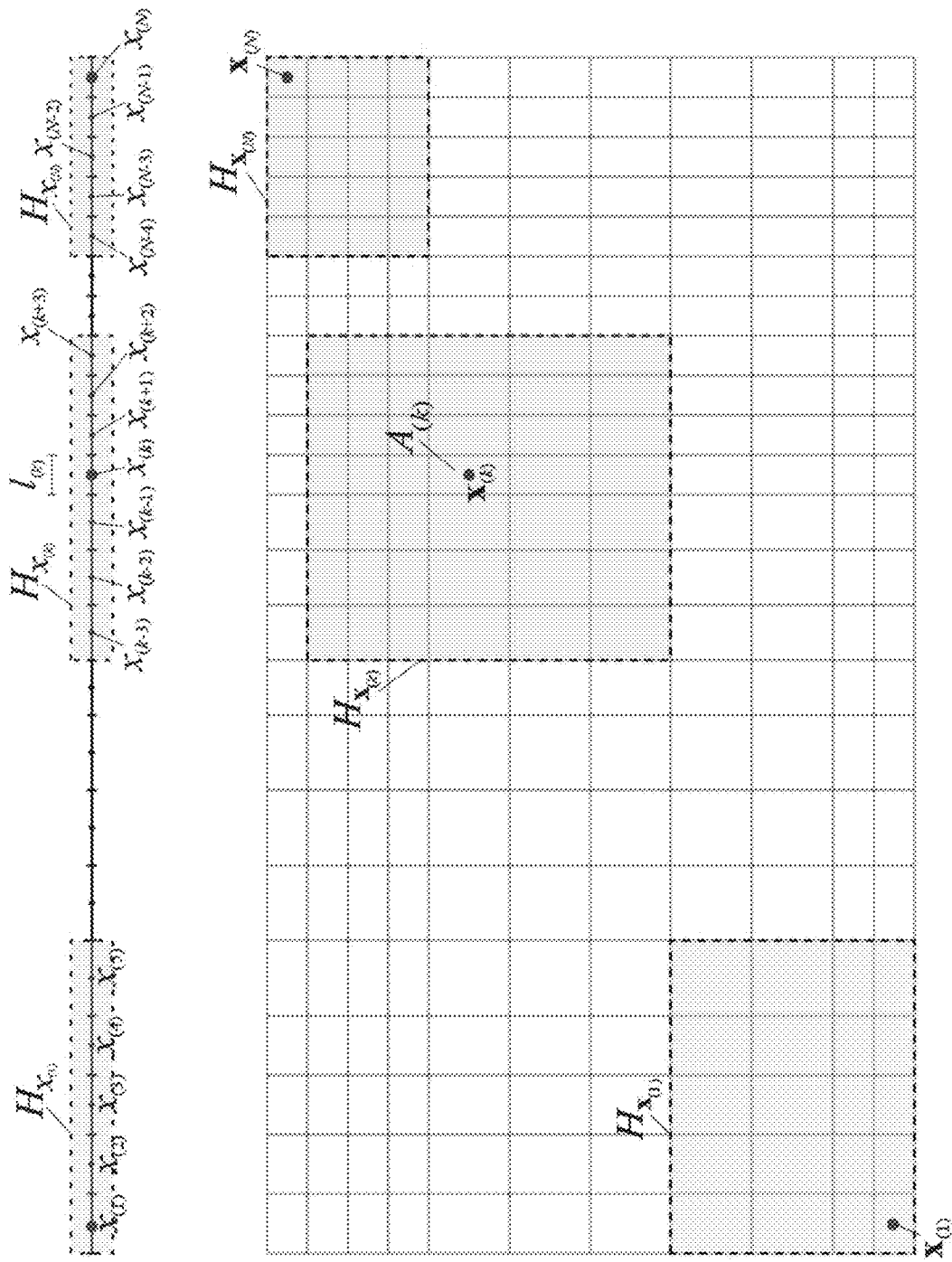
FIG. 2 illustrates an example peridynamic discretization of domain and description of family for 1-dimensional and 2-dimensional analyses according to an embodiment of the present invention.

FIG. 2 illustrates an example peridynamic discretization of domain and description of family for 1-dimensional and 2-dimensional analyses according to an embodiment of the present invention.

FIG. 2 provides example locations of collocation points and family shapes for one- and two-dimensional analyses. The shape and weight may be different for each point. The size of the family may be established based on computational efficiency; however, it should capture the nonlocal characteristics of the field equation, as would be apparent to one of ordinary skill in the art. In addition, each point may require the construction of the PD functions $g_n^{p1p2\cdots pM}(x'-x)$. These functions may be unique to each point, with a specific distribution of family points, family size, and weight function.

In one or more embodiments, with the PD functions, the differential field equation may be converted to a system of algebraic equations as $$F(u,b)=Lu+b=0, \quad (41)$$

in which the vector u contains the unknown field variable at each integration point, and L represents the constant coefficients of the matrix of differential operators. The vector b represents the known source term in the field equation.

The PD field equations do not contain any spatial derivatives; therefore, constraint conditions are, in general, not necessary for the solution of integral-differential equations. However, in some embodiments, such conditions may be imposed by prescribing constraints on the field variable or its derivatives, which are expressed also in nonlocal form through the PD differential operator. The boundary conditions may be imposed on the integration points closest to the boundary.

Arising from the boundary and/or initial conditions, Eq. (41) may be subjected to a set of constraint equations as $$Gu+u^*=0, \quad (42)$$

where the known matrix G contains the constant coefficients of the constraint equations associated with the unknown vector u, and the vector u* contains the applied known terms of constraint equations.

With the introduction of Lagrange multipliers, these field and constraint equations may be combined in a variational form as $$\delta u^T(Lu+b)+\delta[\lambda^T(Gu+u^*)]=0, \quad (43)$$

where δu represents arbitrary variations of the unknown vector u. An important aspect of Eq. (43) is that it is not derived from a potential function (or functional). Hence, it may be applicable to any system of partial differential equations with constraint conditions represented by Eqs. (41) and (42). Taking the first variation of the second term on the left hand side of Eq. (43) leads to $$\delta u^T(Lu+b)+\delta\lambda^T(Gu+u^*)+\delta u^T G^T \lambda=0. \quad (44)$$

The resulting equation may then be recast as $$\left\{\begin{matrix}\delta u\\ \delta\lambda\end{matrix}\right\}^T\left(\begin{bmatrix}L & G^T\\ G & 0\end{bmatrix}\left\{\begin{matrix}u\\ \lambda\end{matrix}\right\}+\left\{\begin{matrix}b\\ u^*\end{matrix}\right\}\right)=0. \quad (45)$$

For arbitrary variations of δu and δλ, the system of algebraic equations for the solution of u and λ may be obtained as $$\begin{bmatrix}L & G^T\\ G & 0\end{bmatrix}\left\{\begin{matrix}u\\ \lambda\end{matrix}\right\}=-\left\{\begin{matrix}b\\ u^*\end{matrix}\right\}. \quad (46)$$

Although this derivation concerns linear field equations and boundary conditions, in other embodiments, it may be readily extended to consider nonlinear equations and boundary conditions. In addition, this system of equations has a sparsely populated matrix whose size may be rather large depending on the degree of refinement for the integration. Its dimension and bandwidth are equal to the degree of freedom multiplied by the total number of integration points and family members, respectively. The solution to this system of algebraic equations may be achieved by using standard solvers, as would be apparent to one of ordinary skill in the art.

The numerical results concern first the validity of the peridynamic differentiation, and second its applications involving discrete data and differential equations of single and multiple field variables. As in any computational analysis, spacing between the computational points (uniform or non-uniform grid), family shape and size, and the weight function may be important factors for achieving accurate results. Therefore, care should be taken in their specification in order to achieve convergence, as would be apparent to one of ordinary skill in the art. Although the present invention are not limited, for ease of description, in the solution of the applications herein, unless otherwise stated, the degree of interaction (weight function) is specified as a Gaussian distribution in the form of $$w(|\xi|)=e^{-(2|\xi|/\delta)^2}. \quad (47)$$

As a further description convenience, though the present invention is not limited, the integration points are always located at the center of their geometric entities in order to achieve unity for the weights of Gaussian quadrature technique. Therefore, integration is achieved by summation of all the points that are within the family of $x_{(k)}$. The PD functions $g_N^{p1p2\cdots pM}(x'-x)$ of up to second-order derivatives may readily be derived, as would be apparent to one of ordinary skill.

Figure 3:
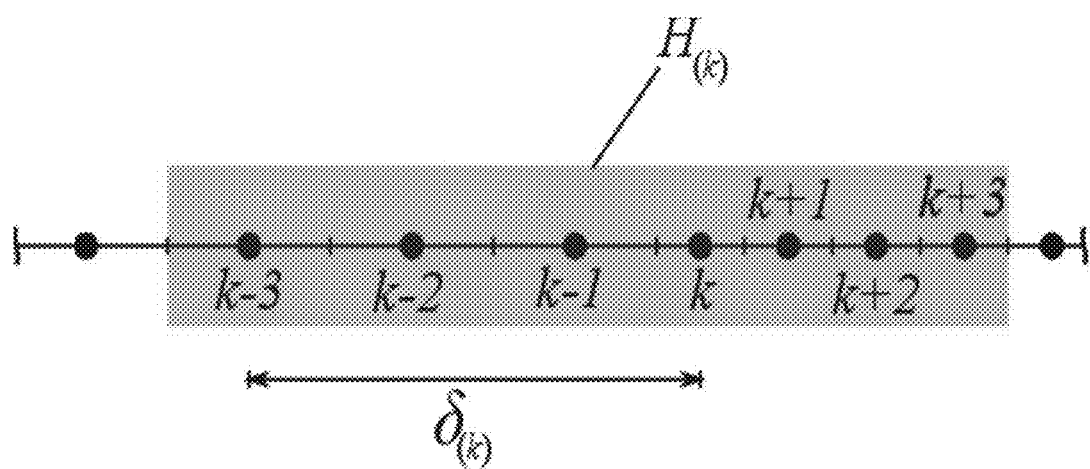
FIG. 3 illustrates an example of a family and a horizon in the presence of non-uniform spacing according to an embodiment of the present invention.

FIG. 3 illustrates an example of a family and a horizon in the presence of non-uniform spacing according to an embodiment of the present invention.

One application of the nonlocal peridynamic operator concerns the differentiation of a smooth data set that exhibits a singular behavior. The data may be generated, for example, by using $f(x_{(k)}=\text{sign}(x_{(k)})\sqrt{|x_{(k)}|}$ for uniform and non-uniform spacing between integration points. Employing the Gaussian quadrature technique for spatial integration, the PD differentiation of the data may be constructed as $$\frac{d}{dx}f(x_{(k)}) = \sum_{j=1}^{} f(x_{(j)})g_2^{100}(x_{(j)} - x_{(k)})\ell_{(j)}. \qquad (48)$$

Uniform spacing between integration points is defined by $x_{(k)} - x_{(k-1)} = \Delta x = 1/600$ for $-0.05 \leq x_k \leq 0.05$, with $k=1, \ldots, 60$. In the case of non-uniform spacing, the spacing between integration points may be defined by $$x_{(k)} - x_{(k-1)} = \qquad (49)$$
$$\Delta x = \begin{cases} 0.003 & -0.05 \leq x_k \leq -0.02, \text{ with } k=1, \ldots, 10, \\ 0.001 & \text{for } -0.02 \leq x_k \leq 0.02, \text{ with } k=1, \ldots, 40, \\ 0.003 & 0.02 \leq x_k \leq 0.05, \text{ with } k=1, \ldots, 10. \end{cases}$$

For uniform spacings, the family size may be dictated by the horizon $\delta = 3\Delta x$. In the presence of non-uniform spacings, the horizon may be constructed such that 3 material points from left and right of each point are included in the family; the longest distance from each of these points to its family member defining the horizon size, as illustrated in FIG. 3.

Figure 4:
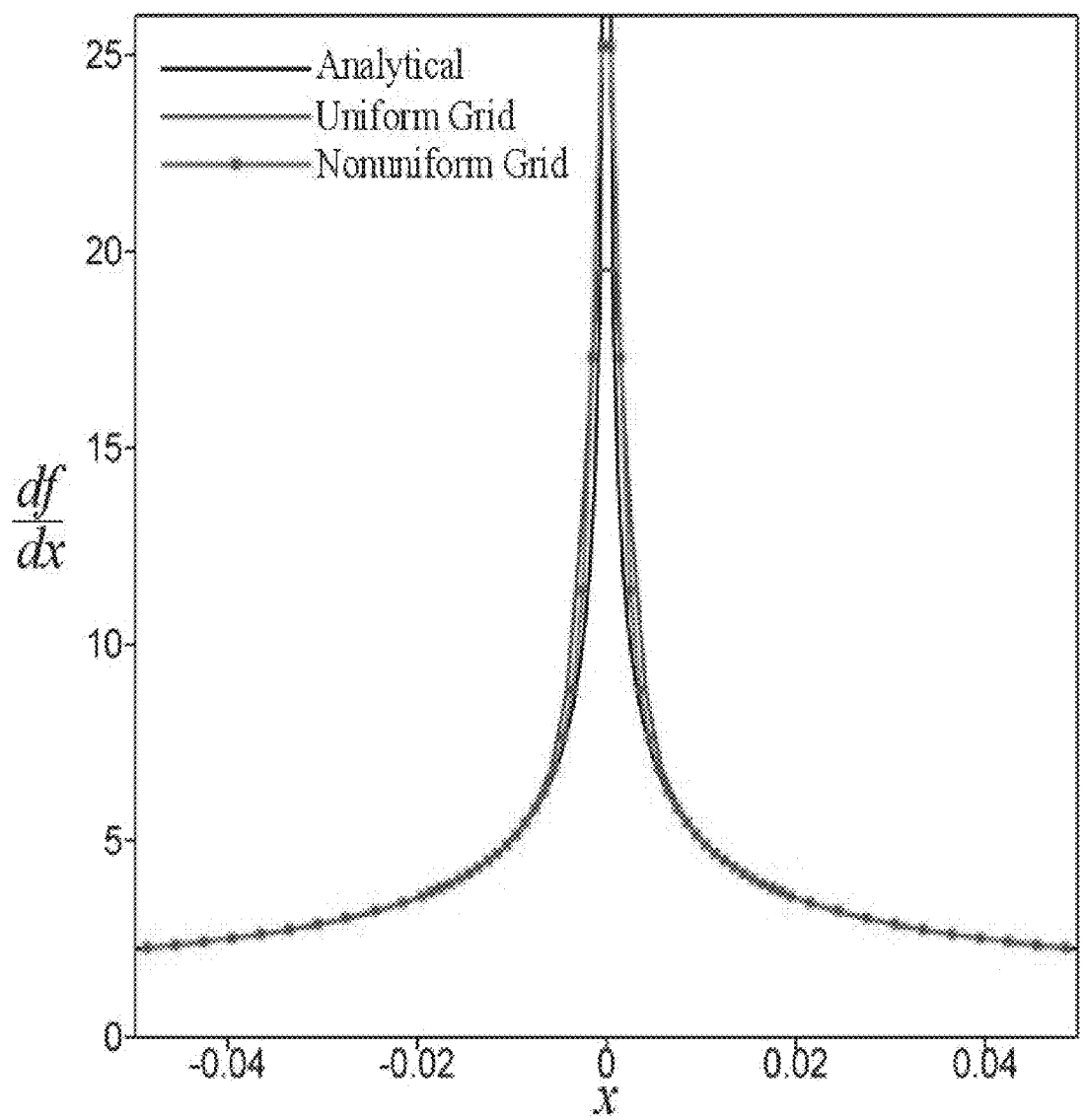
FIG. 4 illustrates a comparison of an example peridynamic numerical differentiation according to an embodiment of the present invention with a comparable analytical differentiation for uniform and non-uniform spacing of integration points.
Figure 5A:
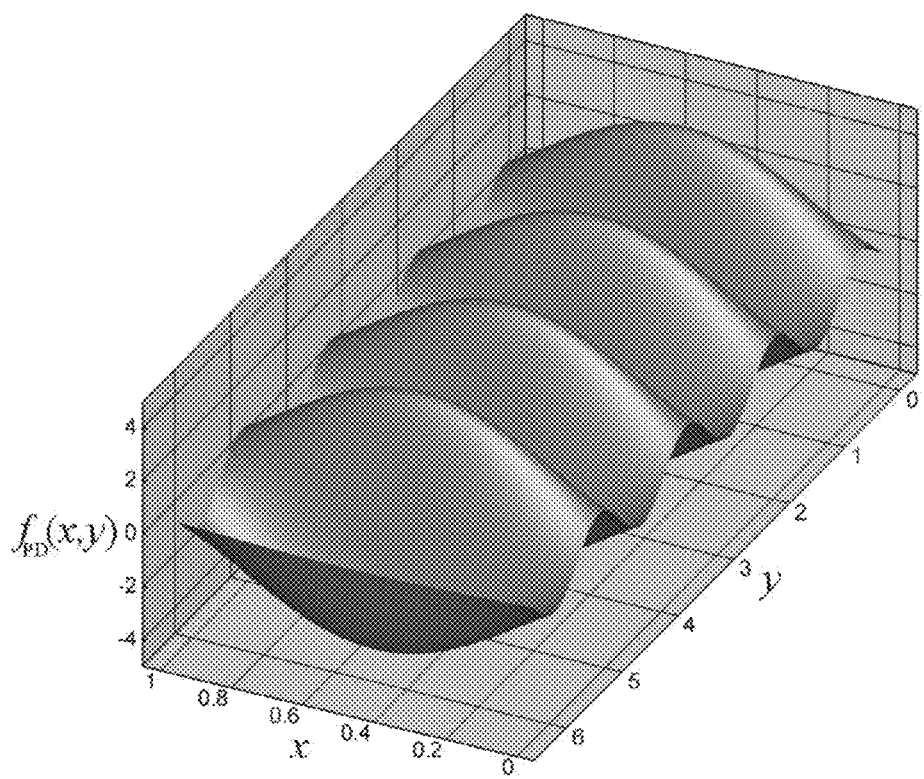
Figure 5A:
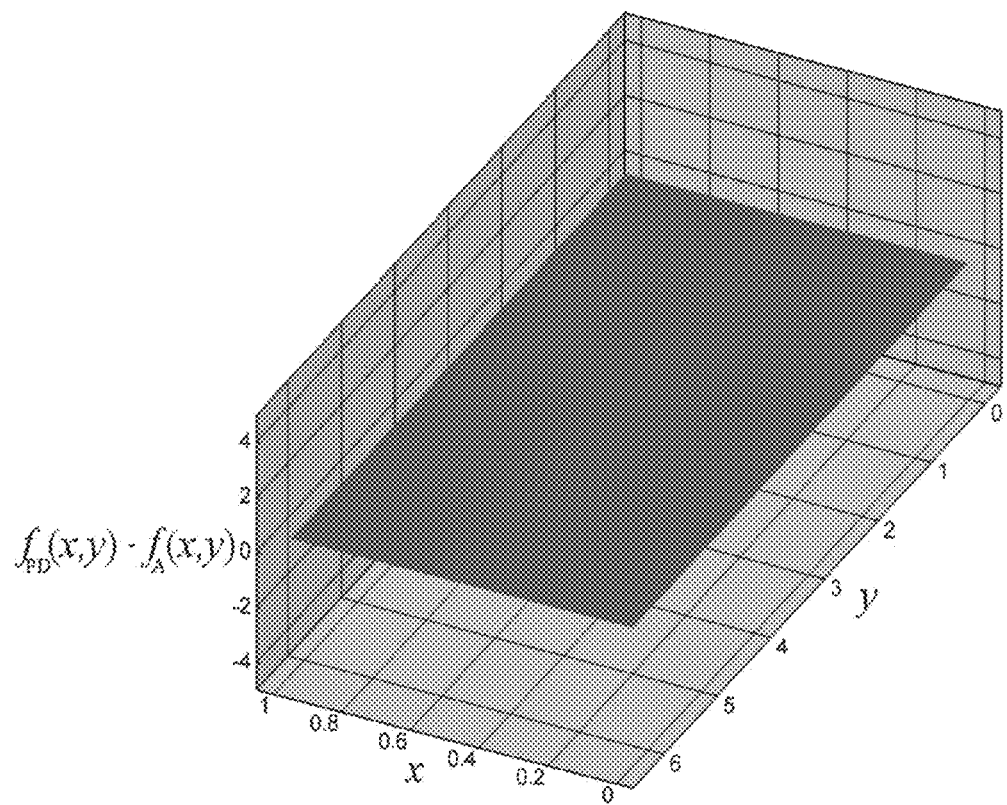
Figure 5C:
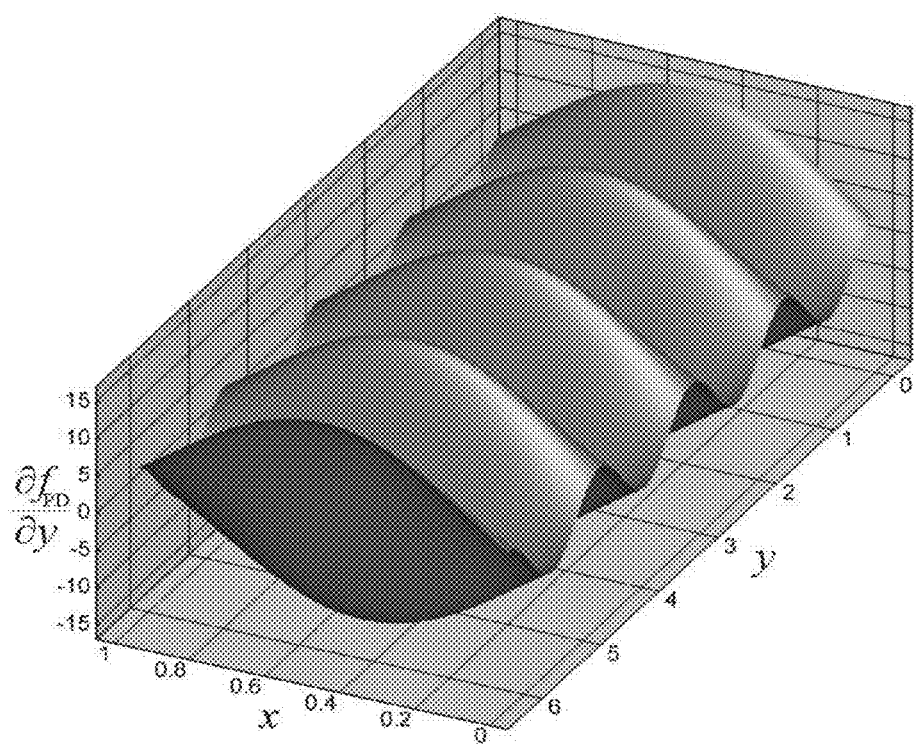
Figure 5C:
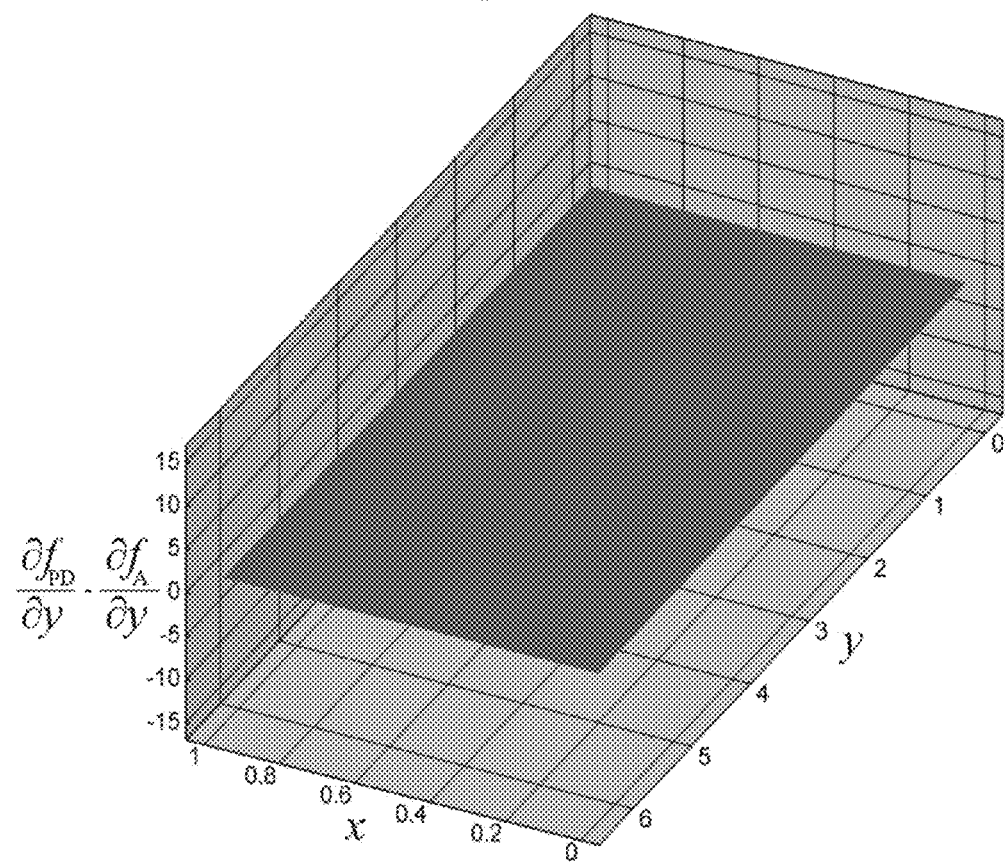
Figure 5D:
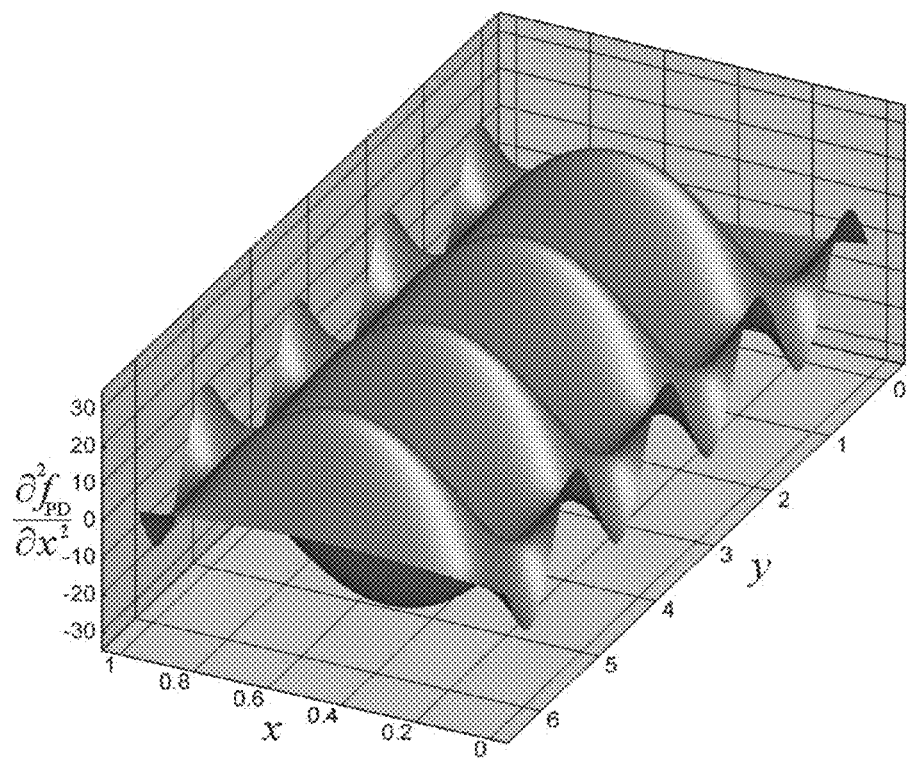
Figure 5D:
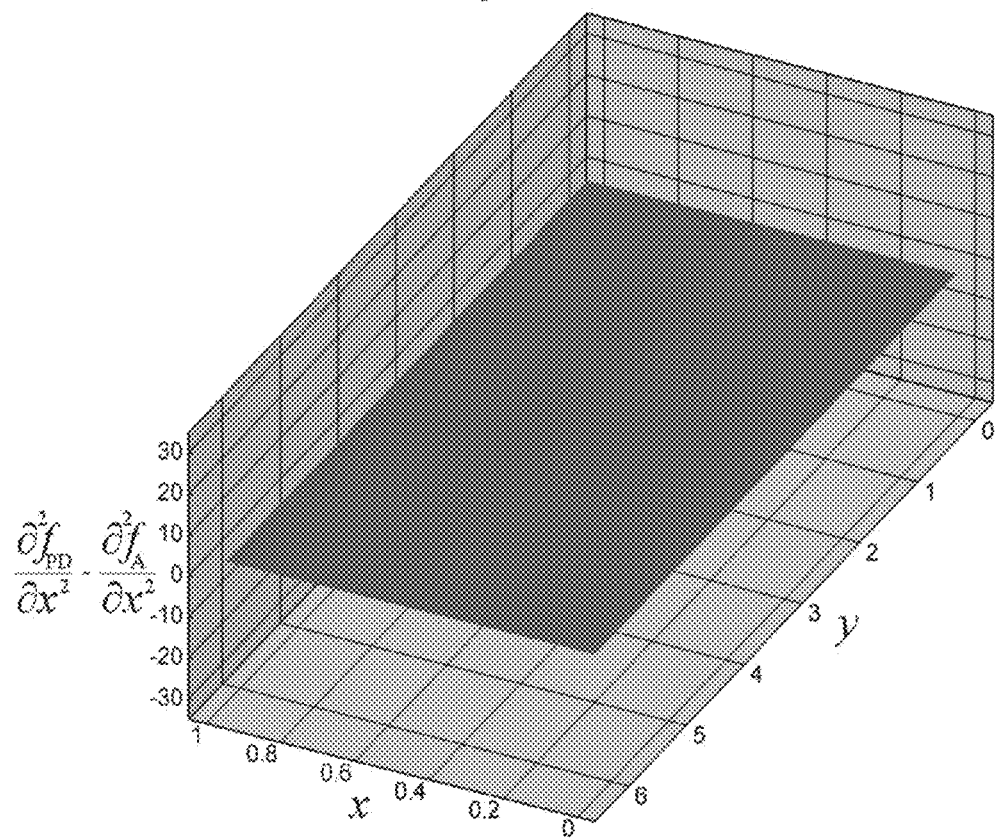
Figure 5E:
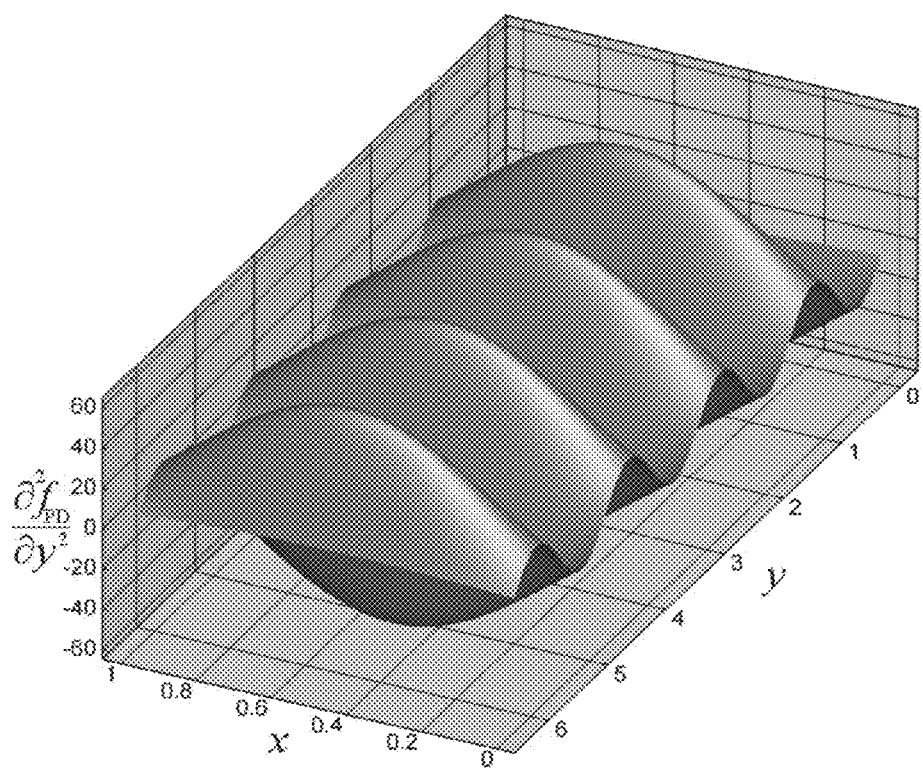
Figure 5E:
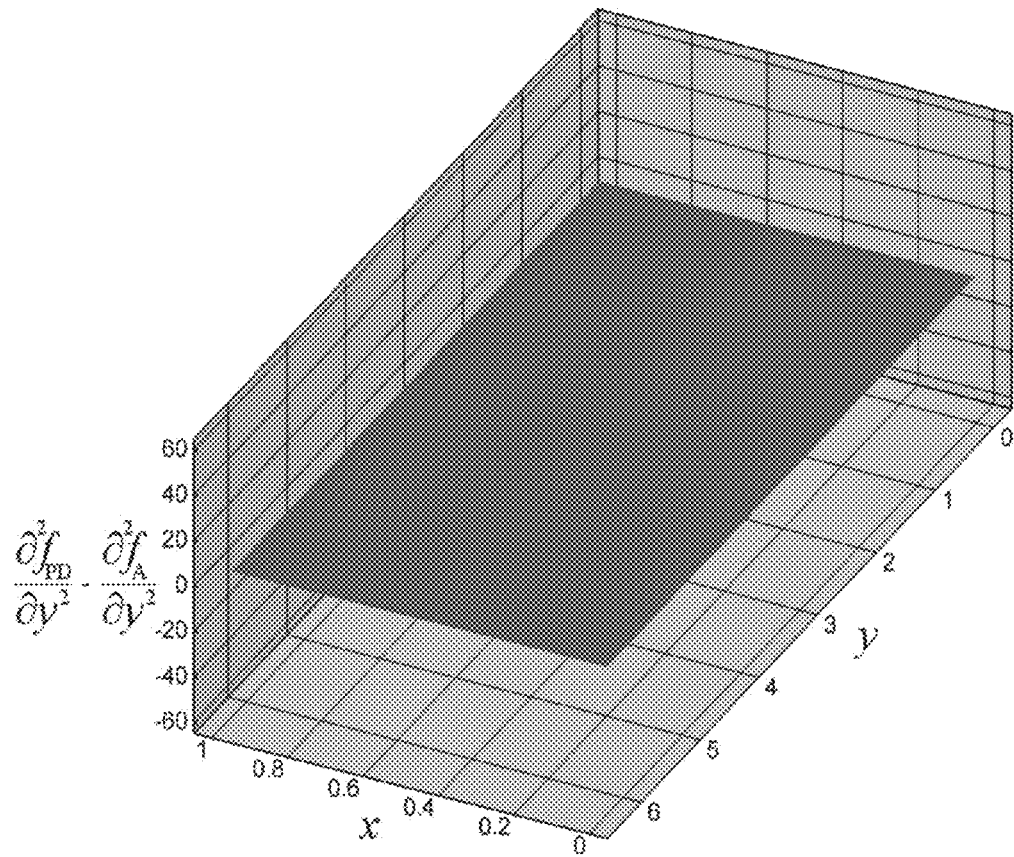
Figure 5F:
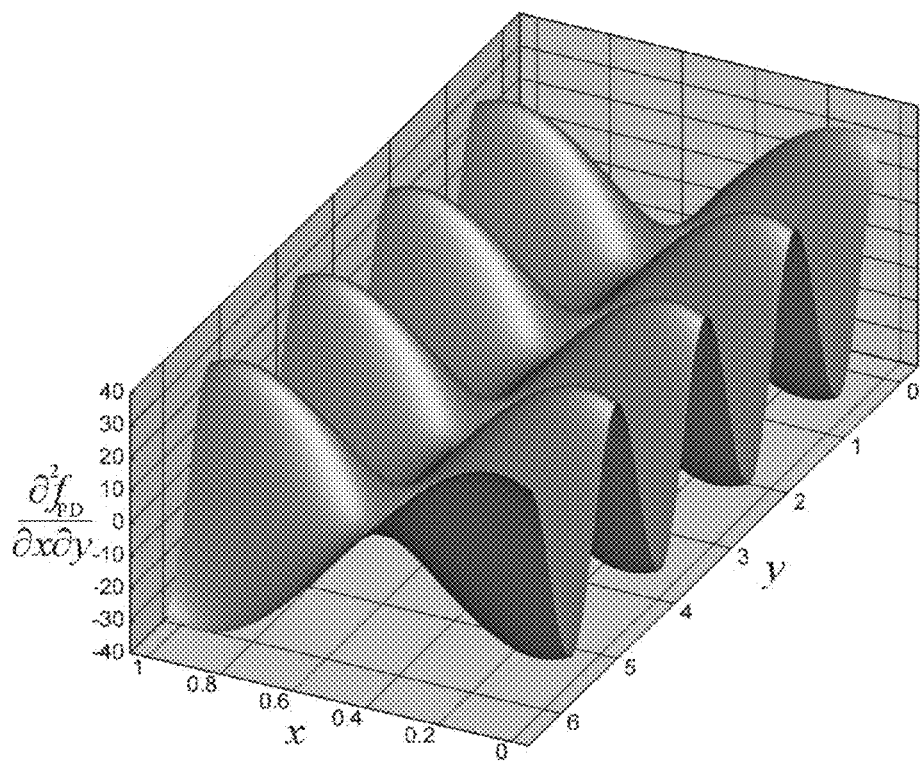
Figure 5F:
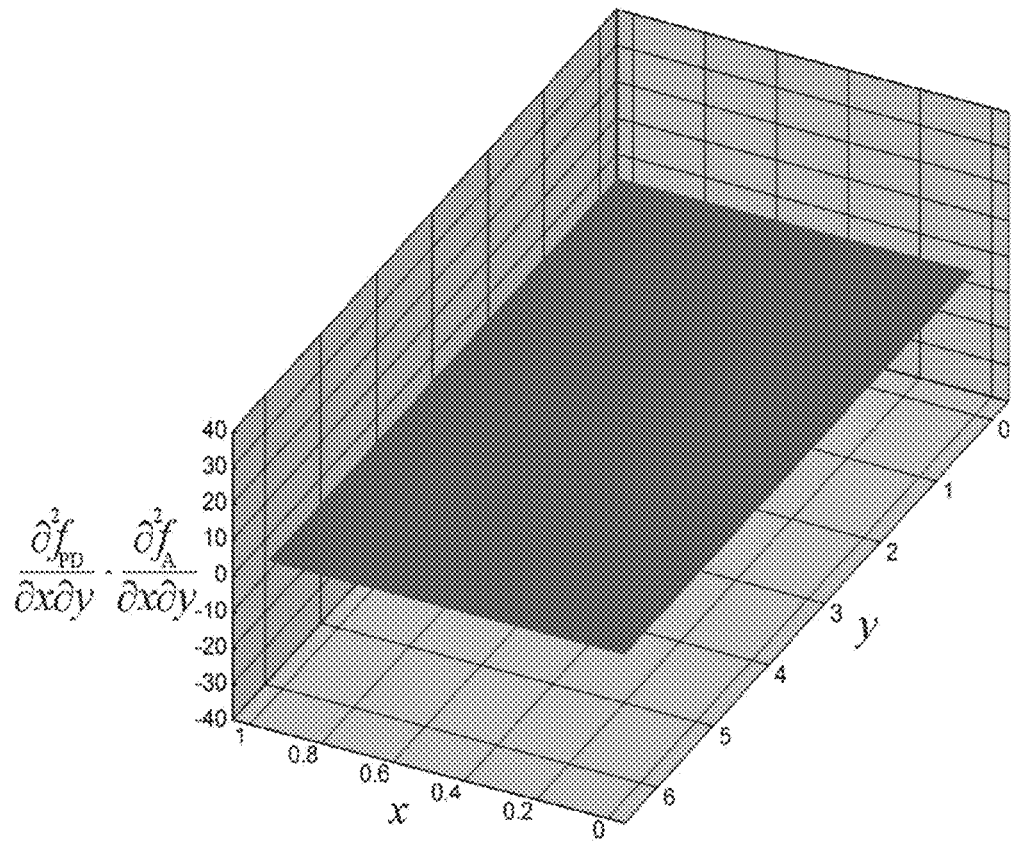

FIG. 4 illustrates a comparison of an example peridynamic numerical differentiation according to an embodiment of the present invention with a comparable analytical differentiation for uniform and non-uniform spacing of integration points.

A comparison of the PD differentiation according to an embodiment of the present invention with that of an analytical expression is shown in FIG. 4. As shown in this figure, the nonlocal PD differentiation approaches the singular behavior of local differentiation as the horizon size (internal length) decreases. The effect of locality increases for increasing horizon when the spacing is uniform.

Figure 18:
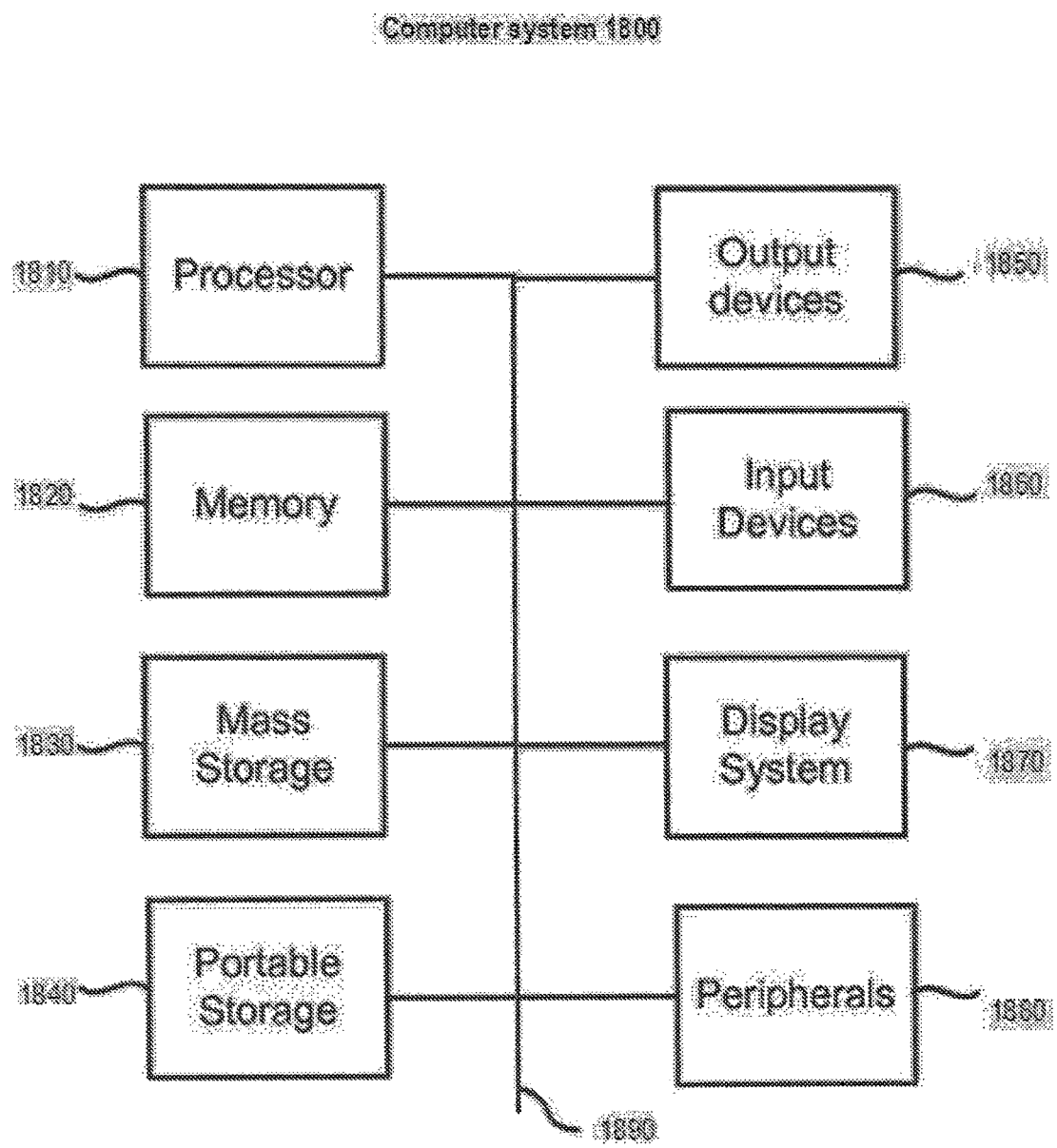
FIG. 18 is a block diagram of an example computing device that may be used to implement embodiments of the present invention.

In an embodiment of the present invention, a computer, such as the computer 1800 in FIG. 18, may be used to execute the PD differentiation in order to smooth out data sets that might otherwise include singularities and discontinuities. The computer 1800 may perform such operations automatically or in response to an input received, for example, via a physical user interface, a command line user interface, or a graphical user interface (GUI). One aspect of using such a technique with computer processing of data is that the smoothed-out data may then be used with other computer systems or software applications for performing any of a variety of analyses or operations using the data without fear of inadvertently producing an error in those computer systems or software applications due to singularities or discontinuities.

FIGS. 5A-5F illustrate an example peridynamic construction of a two-variable function and its partial derivatives of up to the second order according to an embodiment of the present invention and the corresponding deviations from corresponding comparable analytical evaluations of the function and its partial derivatives.

In the embodiment of FIGS. 5A-5F, an application of the nonlocal peridynamic operator concerns the differentiation of a two-dimensional smooth data given in the form $$f(x_{1(k)}, x_{2(k)}) = (2 - (2x_{1(k)} - 1)^2)^2 \sin(4x_{2(k)}),$$

$$0 \leq x_{1(k)} \leq 1 \text{ and } 0 \leq x_{2(k)} \leq 2\pi, \text{ with } k=1, \ldots, 200. \qquad (50)$$

Employing the Gaussian quadrature technique for spatial integration, the PD derivatives of the data may be constructed as $$\frac{\partial^{p_1+p_2}}{\partial x^{p_1} \partial y^{p_2}} f(x_{1(k)}, x_{2(k)}) = \qquad (51)$$
$$\sum_{j=1}^{} f(x_{1(j)}, x_{2(j)}) g_4^{p_1 p_2 0}((x_{1(j)}, x_{1(k)}), (x_{2(j)}, x_{2(k)})) A_{(j)},$$

in which $p_1, p_2 = 0, 1, 2$ denote the order of differentiation with respect to $x_1$ and $x_2$, respectively. Uniform spacing between computational points may be specified as $\Delta x_1 = 1/200$ and $\Delta x_2 = 2\pi/200$. Therefore, the area of each point is $A_{(k)} = \Delta x_1 \Delta x_2$, and the family size of a rectangular horizon may be specified with $\delta_{x_1} = 6\Delta x_1$ and $\delta_{x_2} = 6\Delta x_2$. In one embodiment, the PD differentiations of the data and the error between the PD and analytical differentiations are shown in FIGS. 5A-5F for the function and all partial derivatives of order two or less. The variation of error in each case is less than 1%, indicating the accuracy of the PD differentiations.

In further detail, FIGS. 5A-5F illustrate a peridynamic construction of the function and its derivatives of up to second order and the corresponding deviation from the analytical evaluation of f(x, y). The top image illustrates the peridynamic construction of the function or derivative, namely function f(x, y), first derivatives f(x, y) and f(x, y), and second derivatives $f_{x,x}(x, y)$, $f_{y,y}(x, y)$, and $f_{x,y}(x, y)$, in FIGS. FIG. 5A-5F, respectively. The bottom image illustrates the deviation from the analytical evaluation. The deviation from the analytical evaluation appears to be flat at approximately 0, indicating a very low to nonexistent variation of error between the peridynamic construction and the analytical evaluation.

Another application of the nonlocal peridynamic operator concerns image compression and recovery, with reference to FIGS. 6A-8C. For ease of description, an image may be constructed by $N_1 \times N_2$ number of pixels specifying its resolution. Each pixel may be described by several data or quantities, such as color codes, intensity, transparency, etc. For ease of description, a color image may have pixels described by four quantities: red, green, blue, and alpha (for transparency).

During image compression, if a pixel is "picked" (e.g., at least some data regarding the pixel is retained), it may bring at least some of its 4 color codes (red, green, blue, and alpha for transparency) between 0 and 255 from the original image. If the image is grayscale or black and white, it may instead bring a value corresponding to a shade of gray and, optionally, an alpha value corresponding to transparency.

To recover the image, the color codes for the "unpicked" pixels (e.g., whose data was not retained during compression) may be predicted by a computer according to an embodiment of the present invention by using the PD differential operator as described below. The number of picked and unpicked pixels may be denoted by $N_p$ and $N_u$, respectively, with $N = N_p + N_u$, where $N = N_1 \times N_2$.

Image recovery in this manner need not be limited to compressed images. An image may be recovered using the PD differential operator if the data representing the image has been damaged (e.g., during an interrupted file transfer, due to data corruption of a computer memory or storage where the image data was stored, or due to physical or electronic damage to a computer memory or storage where the image data was stored). In such a case, the remaining damaged image data may retain at least partial data about certain pixels, which may then act as the "picked" pixels, whereas the remaining pixels about which data is missing may act as "unpicked" pixels.

A computer such as the computer 1800 in FIG. 18 may be used to perform various operations to recover the image as detailed below. The computer 1800 may perform such operations automatically or in response to an input received, for example, via a physical user interface, a command line user interface, or a graphical user interface (GUI).

Each color code of an unpicked point at $(x_{1(k)}, x_{2(k)})$ may be approximated by using the zeroth order PD differential operator in the form $$f_c(x_{1(k)}, x_{2(k)}) \cong \qquad (52)$$
$$\sum_{j=1}^{N_k} f_c(x_{1(k)}|\xi_{1(j)(k)}, x_{2(k)}|\xi_{2(j)(k)}) g_2^{000}(\xi_{1(j)(k)}, \xi_{2(j)(k)}; \Delta \tilde{V}_j) \Delta \tilde{V}_j,$$

with c=r, g, b and α representing red, green, blue, and alpha, respectively. In other embodiments, c may represent a grayscale value for images that are grayscale or black and white (e.g., as in the image of FIG. 6A). The family members of each unpicked pixel may be determined by the closest $N_k$ picked pixels. In one embodiment, $N_k$=24 is utilized to calculate the PD functions, but lower or higher family sizes may be used in other embodiments. In addition, $\Delta \tilde{V}_j$ represents the volume of each picked pixel, which is calculated such that the overall volume of the image is preserved, e.g., $$\sum_{k=1}^{N} \Delta V_k = \sum_{j=1}^{N_p} \Delta \tilde{V}_j \qquad (53)$$

in which $\Delta V_k$=1 for each pixel of the original image. While in some embodiments, the computer 1800 may determine the exact values of $\Delta \tilde{V}_j$ for each pixel by solving a large set of algebraic equations (e.g., as many as the number of picked pixels in the image), this approach may be computationally intensive. Therefore, in other embodiments, close approximations may be used, such as setting the value of $\Delta \tilde{V}_j$ to $$\Delta \tilde{V}_j = \Delta V_j + \sum_{k=1}^{N_u} \left( \frac{\rho_{(j)(k)}}{\sum_{l=1}^{l} \rho_{(l)(k)}} \right) \Delta V_k \text{ for } j = 1, N_p, \qquad (54)$$

where $\rho_{(j)(k)}$=0 if the picked pixel is not within the family of unpicked pixels. Otherwise, it is calculated as $\rho_{(j)(k)}$=$1/|\xi_{(j)(k)}|$. Note that this approximation satisfies image volume conservation as defined by Eq. (53), and thus allows the computer 1800 to accurately recover the image more quickly and with comparable accuracy.

In one or more embodiments, absolute error percentage of the recovered color codes at the unpicked pixels may be defined as $$e_{c(j)} = [|f_c(x_{1(j)}, x_{2(j)}) - f_c^*(x_{1(j)}, x_{2(j)})|/(255 \times N)] \times 100, \qquad (55)$$

with $f_c^*(x_{1(j)}, x_{2(j)})$ representing the (exact) color code of the image. In addition, the combined absolute error percentage of the recovered color codes at the unpicked pixels may be defined as $$e_{(j)} = e_{r(j)} + e_{g(j)} + e_{b(j)} + e_{\alpha(j)}. \qquad (56)$$

Based on their combined error percentages from largest to smallest, the index IDs of unpicked pixels may be ordered in a vector U. The total error percentage for each color code may be calculated as $$e_c = \sum_{j=1}^{N_u} e_{c(j)}. \qquad (57)$$

Further, the error percentage between the recovered and the actual image may be defined as $$e = \max\{e_r, e_g, e_b, e_\alpha\}. \qquad (58)$$

In order to enhance image recovery, in some embodiments, an additional 20%, 15%, 10%, or 5% of the total number of pixels is picked if e>15%, 10%<e<15%, 3%<e<10%, or e<3%, respectively. These additional points may be identified based on their order in vector U. This procedure may then be repeated until a desired image recovery is achieved.

Figure 6A:
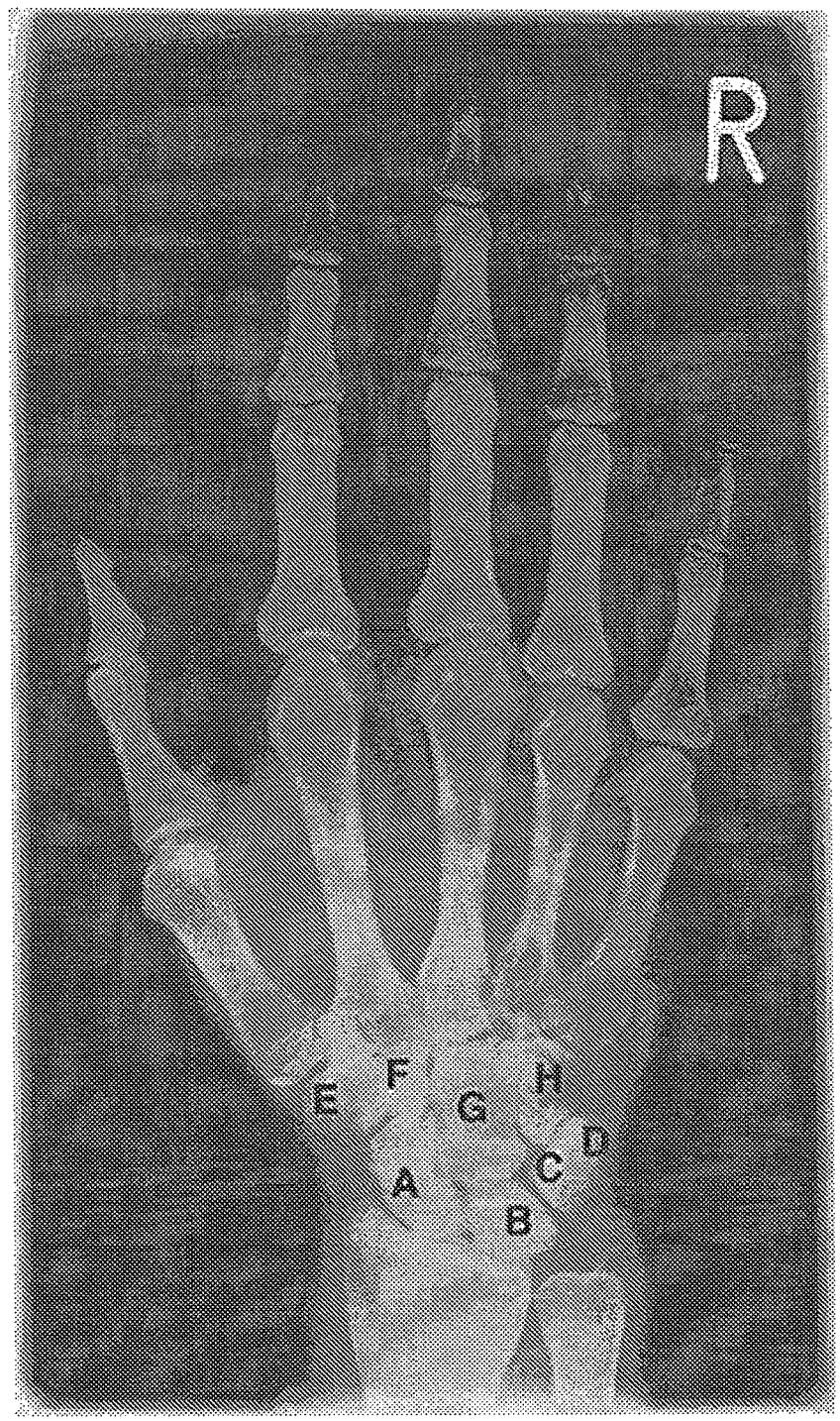
FIG. 6A illustrates an example gray-scaled source image of a hand captured using x-ray radiography.

FIG. 6A illustrates an example gray-scaled source image of a hand captured using x-ray radiography. The grayscaled image has a resolution of 302×512 pixels.

Figure 6B:
FIG. 6B illustrates an example color source image of a man's face.

FIG. 6B illustrates an example color source image of a man's face. The colored image has a resolution of 325×365 pixels.

Figure 7A:
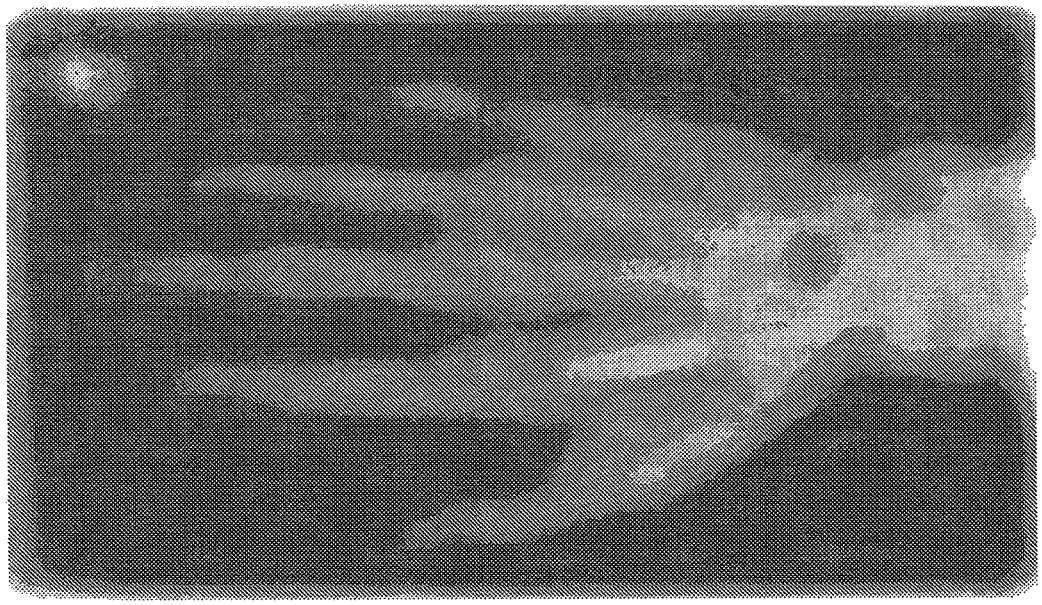
FIG. 7A illustrates an example image recovery from a randomly damaged or compressed version of the image of FIG. 6A according to an embodiment of the present invention, with a percentage of error equal to 5.3 percent and a number of picked pixels equal to 1.6 percent of the original image.
Figure 7A:
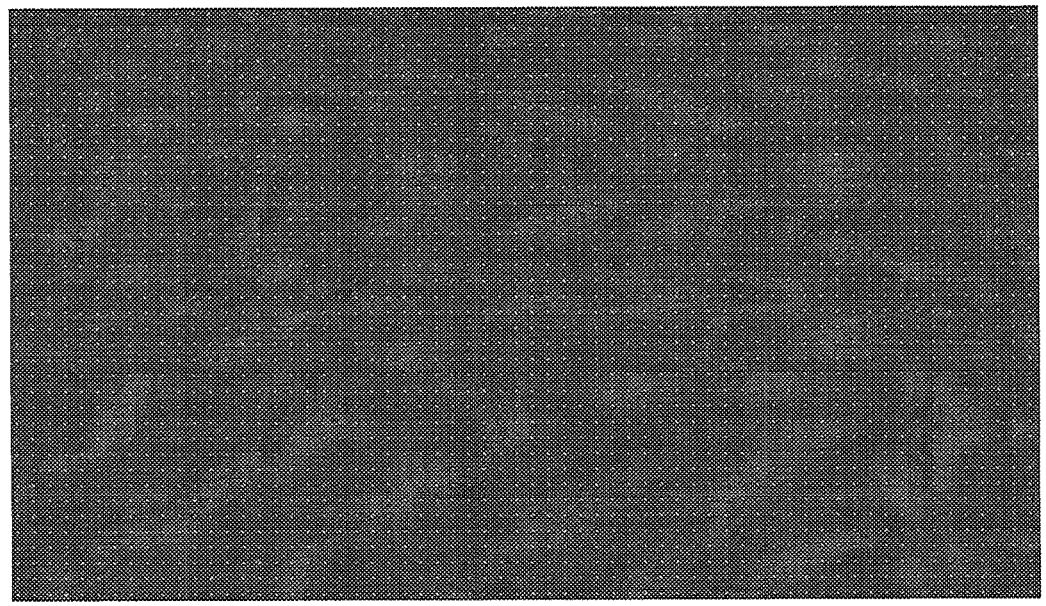

FIG. 7A illustrates an example image recovery from a randomly damaged or compressed version of the image of FIG. 6A according to an embodiment of the present invention, with a percentage of error equal to 5.3 percent and a number of picked pixels equal to 1.6 percent of the original image.

Figure 7B:
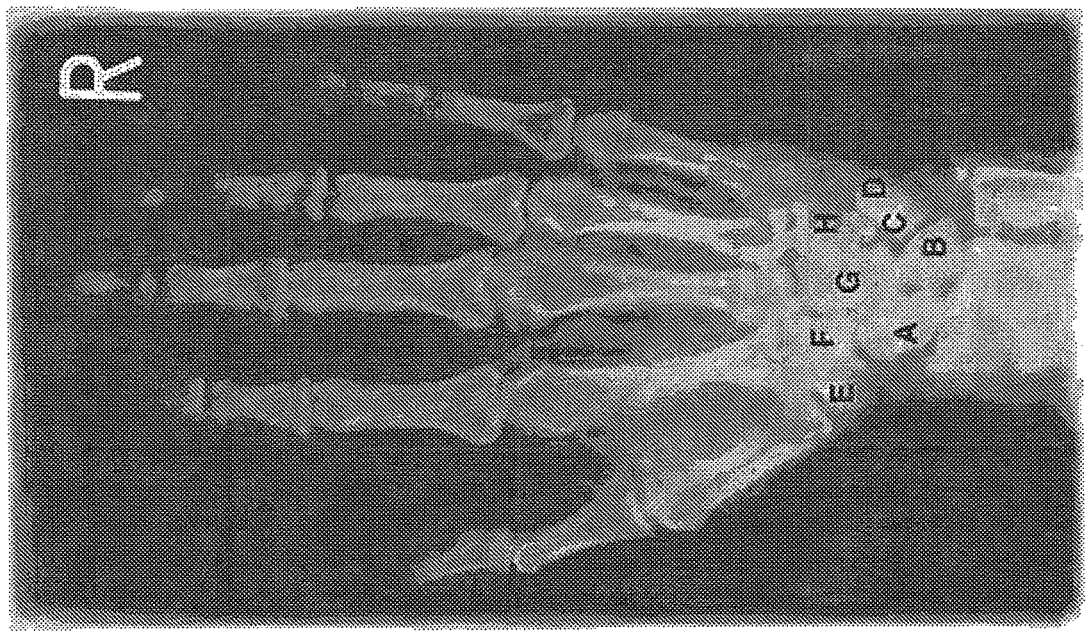
FIG. 7B illustrates an example further image recovery from a compressed version of the image of FIG. 6A after extracting the image of FIG. 7A according to an embodiment of the present invention, with a percentage of error equal to 2.1 percent and a number of picked pixels equal to 16.6 percent of the original image.
Figure 7B:
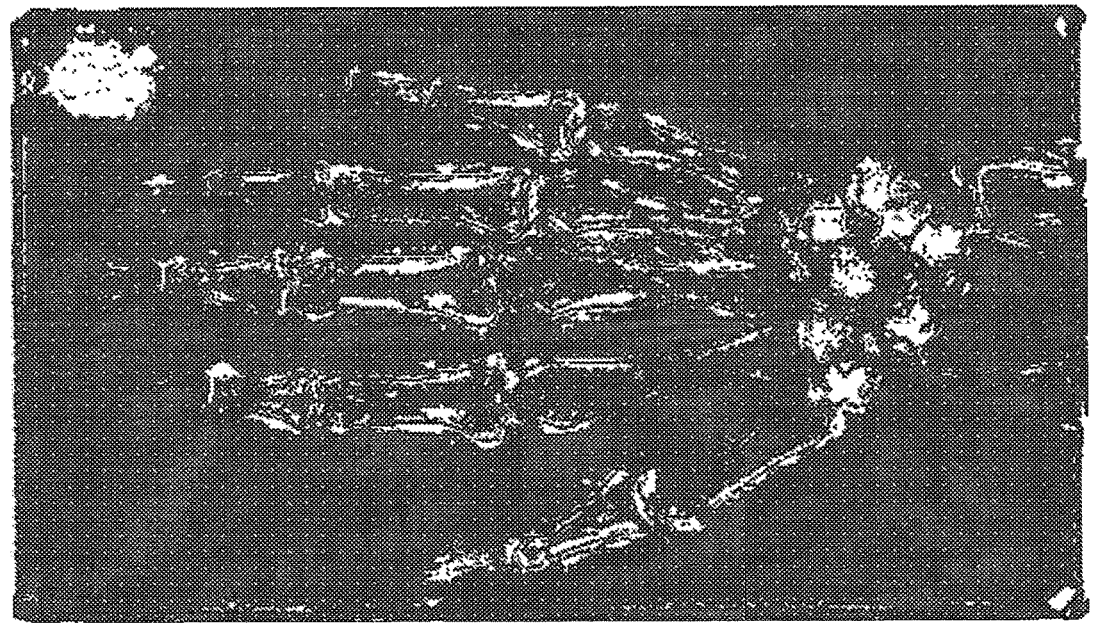

FIG. 7B illustrates an example further image recovery from a compressed version of the image of FIG. 6A after extracting the image of FIG. 7A according to an embodiment of the present invention, with a percentage of error equal to 2.1 percent and a number of picked pixels equal to 16.6 percent of the original image.

Figure 7C:
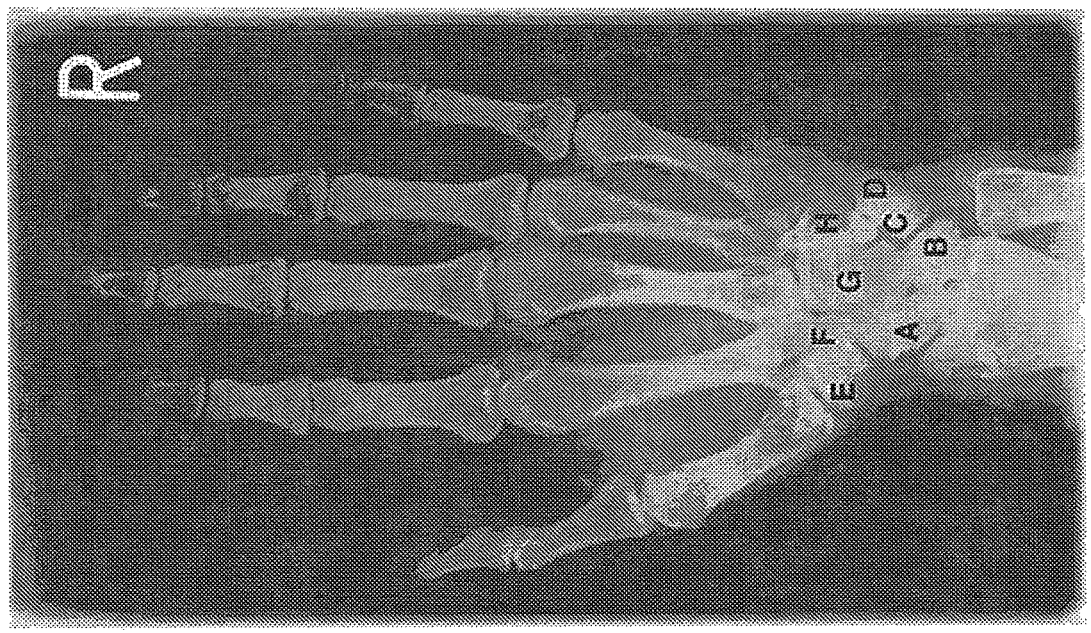
FIG. 7C illustrates an example further image recovery from a compressed version of the image of FIG. 6A after extracting the image of FIG. 7B according to an embodiment of the present invention, with a percentage of error equal to 0.8 percent and a number of picked pixels equal to 31.6 percent of the original image.
Figure 7C:
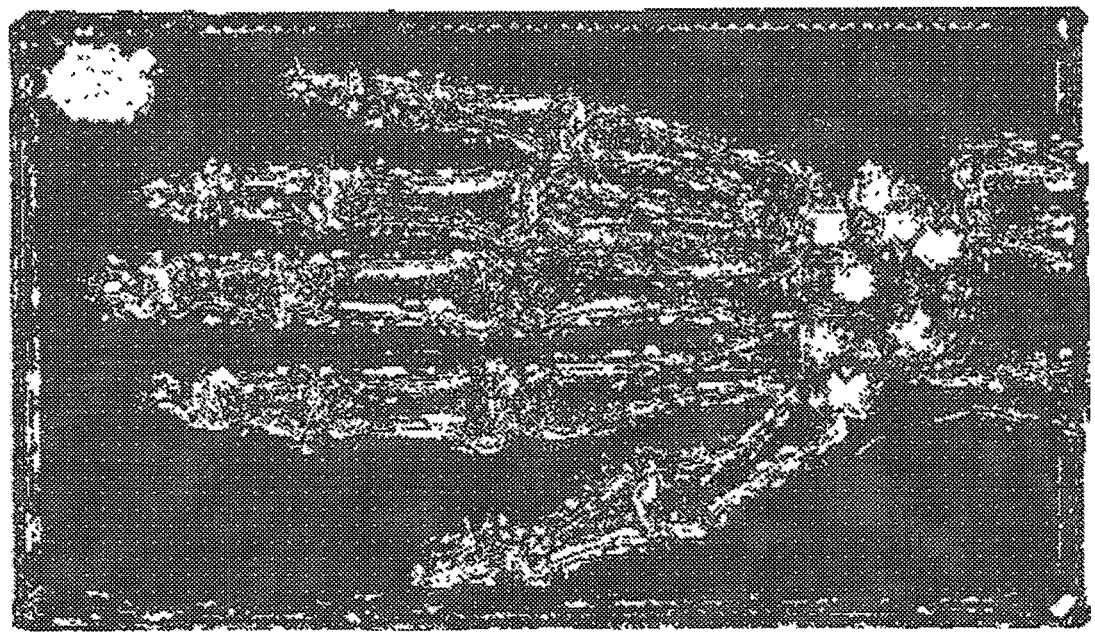

FIG. 7C illustrates an example further image recovery from a compressed version of the image of FIG. 6A after extracting the image of FIG. 7B according to an embodiment of the present invention, with a percentage of error equal to 0.8 percent and a number of picked pixels equal to 31.6 percent of the original image.

Figure 8A:
FIG. 8A illustrates an example image recovery from a randomly damaged or compressed version of the image of FIG. 6B according to an embodiment of the present invention, with a percentage of error equal to 4.7 percent and a number of picked pixels equal to 1.6 percent of the original image.
Figure 8A:
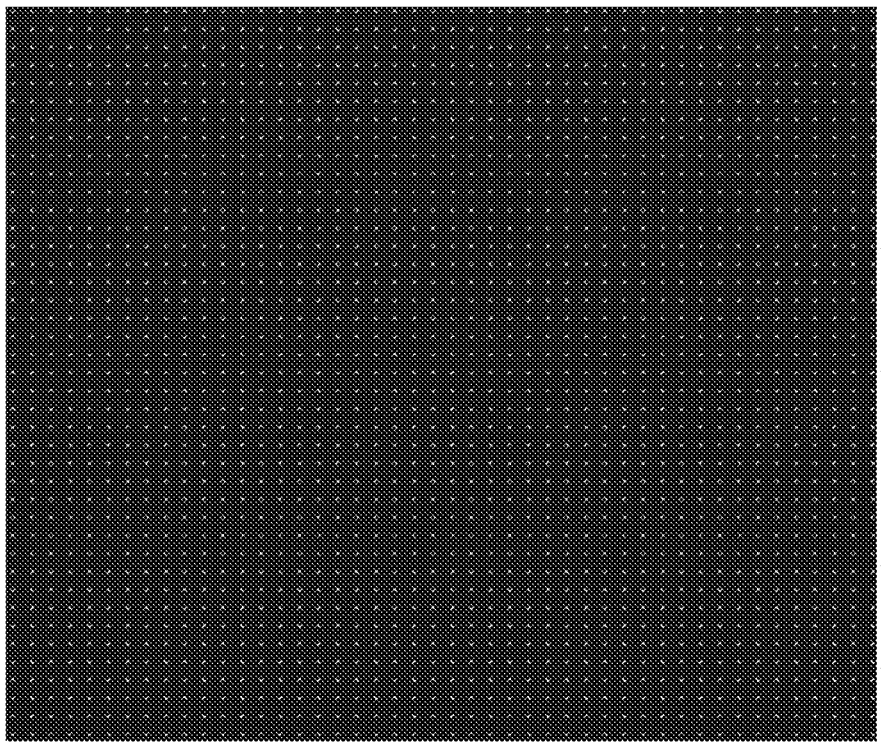

FIG. 8A illustrates an example image recovery from a randomly damaged or compressed version of the image of FIG. 6B according to an embodiment of the present invention, with a percentage of error equal to 4.7 percent and a number of picked pixels equal to 1.6 percent of the original image.

Figure 8B:
FIG. 8B illustrates an example further image recovery from a compressed version of the image of FIG. 6B after extracting the image of FIG. 8A according to an embodiment of the present invention, with a percentage of error equal to 2.5 percent and a number of picked pixels equal to 16.6 percent of the original image.
Figure 8B:
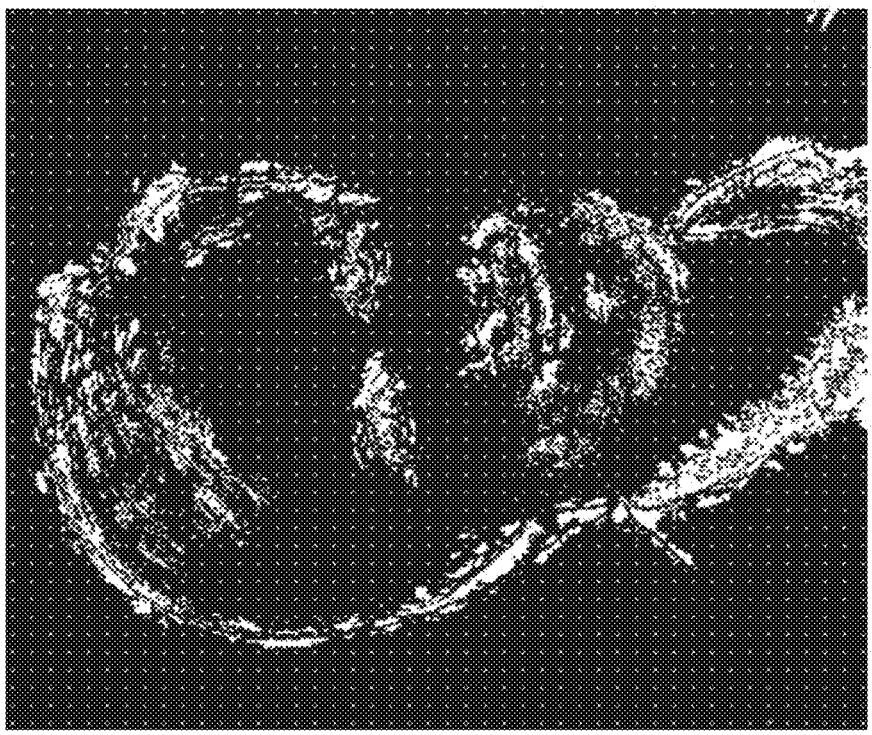

FIG. 8B illustrates an example further image recovery from a compressed version of the image of FIG. 6B after extracting the image of FIG. 8A according to an embodiment of the present invention, with a percentage of error equal to 2.5 percent and a number of picked pixels equal to 11.6 percent of the original image.

Figure 8C:
FIG. 8C illustrates an example further image recovery from a compressed version of the image of FIG. 6B after extracting the image of FIG. 8B according to an embodiment of the present invention, with a percentage of error equal to 0.9 percent and a number of picked pixels equal to 31.6 percent of the original image.
Figure 8C:
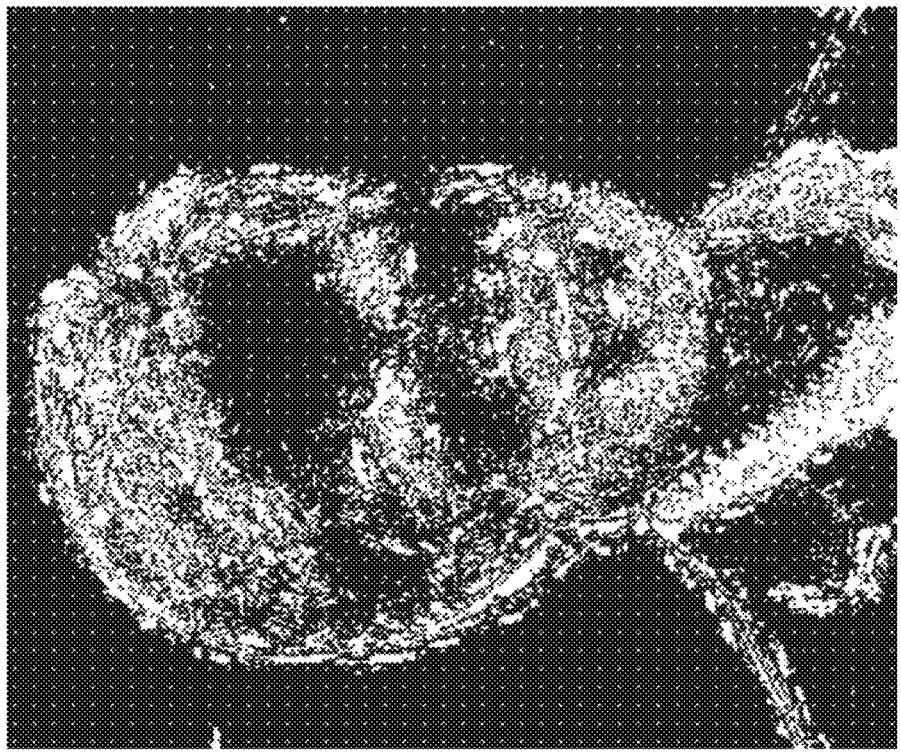

FIG. 8C illustrates an example further image recovery from a compressed version of the image of FIG. 6B after extracting the image of FIG. 8B according to an embodiment of the present invention, with a percentage of error equal to 0.9 percent and a number of picked pixels equal to 25.6 percent of the original image.

Image recovery based on compressed or damaged images are demonstrated by considering a gray-scaled image shown in FIG. 6A and a colored image shown in FIG. 6B. As shown in FIGS. 7A-8C, image recovery may be achieved with an error rate e<1%. The number of "picked" or retained pixels necessary to achieve less than 1% error does not exceed 32% of the total number of pixels in the original images.

In each of FIGS. 7A-8C, the "picked" or retained pixels are identified on the left side while the recovered image is identified on the right. Thus, the original image may still be recovered to a reasonable degree from a very low number of picked or retained pixels.

In further detail, in FIGS. 7A and 8A, a (uniformly) random sampling of the pixels (1.6 percent, roughly one in 60) is used to reconstruct at least a superficial recovered image. Once the worst errors in the reconstructed image are identified, further pixels (15 percent more in FIG. 7A and 10 percent more in FIG. 8A) are selected as identified in the left images in FIGS. 7B and 8B to produce corresponding reconstructed images in the right images. Then, the worst remaining errors in the newly reconstructed images are identified, and still further pixels (15 percent more in each case) are selected as identified in the left images in FIGS. 7C and 8C to produce corresponding reconstructed images in the right images. Both right images in FIGS. 7C and 8C exhibit error rates less than one percent from the original images, yet are reconstructed from between a quarter and a third of the original pixel data.

A computer system 1800 such as in FIG. 18 using the identified image recovery operations may obtain tangible benefits such as usage of less memory to store accurate image data and a less resource-intensive image recovery process, especially in batch image recovery processes for large numbers of images, or for large images.

The image recovery operations identified may further be used to generate three-dimensional image or image map (e.g., application of a two-dimensional image to a three-dimensional frame by, for example, stereology) using a computer system 1800. For example, additional data may be obtained about each pixel, which could correspond to a value representing a depth or an elevation. These may be stored in a same or similar manner as a color channel or alpha channel might be stored per pixel, or may be stored separately from the pixel data (e.g., based on particular three-dimensional line endpoints or polygonal vertices or spherical data).

In addition, the same operations regarding "picked" or retained pixel data (e.g., which may include three-dimensional depth or elevation data), and optionally as "picked" or retained three-dimensional data (e.g., individual polygonal vertices may be "picked" or retained) may then be used to generate a three-dimensional image by either recreating a three-dimensional image that was compressed or damaged or mapping two-dimensional image data to three-dimensional points. This may be used, for example, to reconstruct three-dimensional images of a planetoid based on two-dimensional images and a model of the planetoid and optionally measured elevation or depth data.

In other embodiments, the image recovery operations described above may also be used to recover a variety of types of data. For example, portions of damaged, compressed, or corrupted data (e.g., disk sectors or data chunks/fragments) from a mass storage system 1830, portable storage system 1840, or memory 1820 (e.g., following physical or electrical damage to such a memory or storage system) of FIG. 18 may be recovered using various remaining points of data. Alternately data recovery may be performed for damaged or compressed copies of individual files or sets of files, such as written documents, software source code, executable software applications, operating system code, multimedia data, backup data, databases or other data structures, compressed/uncompressed archive files (e.g., ZIP files, RAR files, TAR files, ISO files), or some combination thereof.

In still other embodiments, without any derivative reduction process and special treatment, direct representation of local derivatives in terms of the PD differentiation may permit the solution of any differential equation and its derivatives up to any order within the limitation of the machine accuracy or round-off error.

For example, the specific applications may reflect a particular challenge associated with their numerical solution when applying the local differentiation, and show the robustness and generality of the PD nonlocal differentiation. In some embodiments, expressing both the spatial and the time derivatives in terms of the PD differentiation may permit the construction of the solution without explicit time integration. The challenges may be due to the presence of higher order derivatives, steep variation in behavior, and/or multi-scale solution arising from characteristic parameters.

Figure 9A:
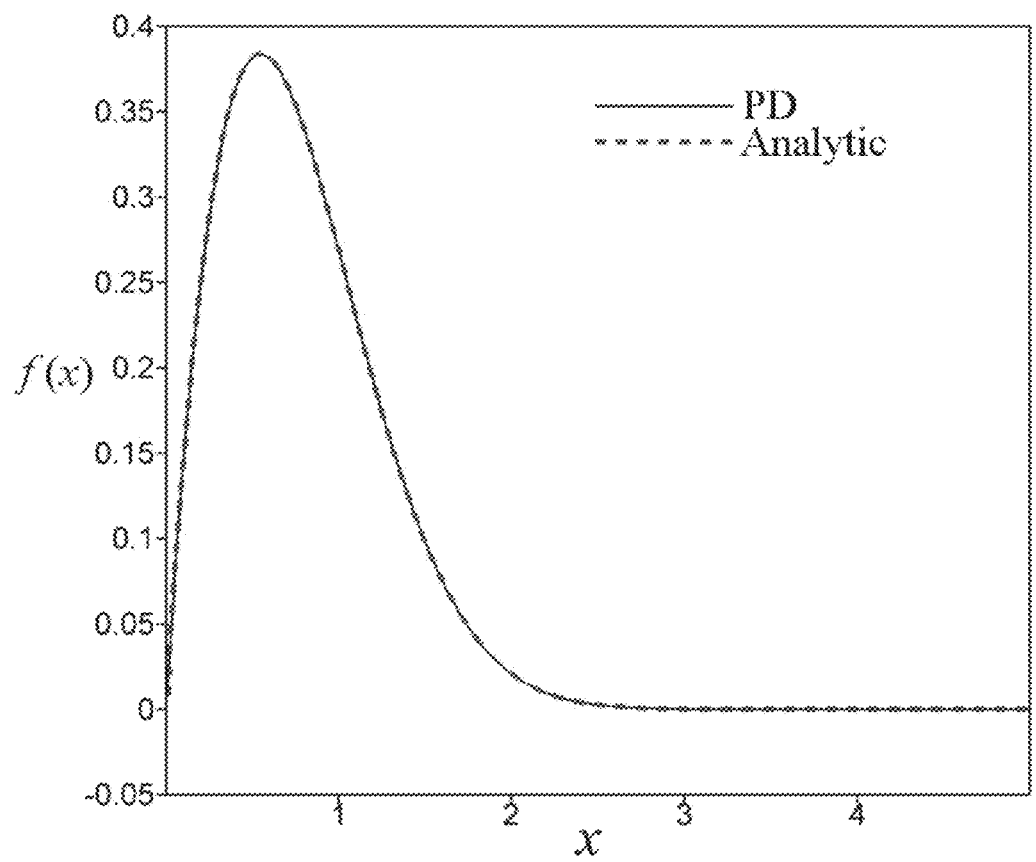
FIGS. 9A-9C illustrate comparisons between an example peridynamic solution according to an embodiment of the present invention and a comparable analytical solution for a function f(x), the first derivative of the function f(x), and the second derivative of the function f(x).
Figure 9B:
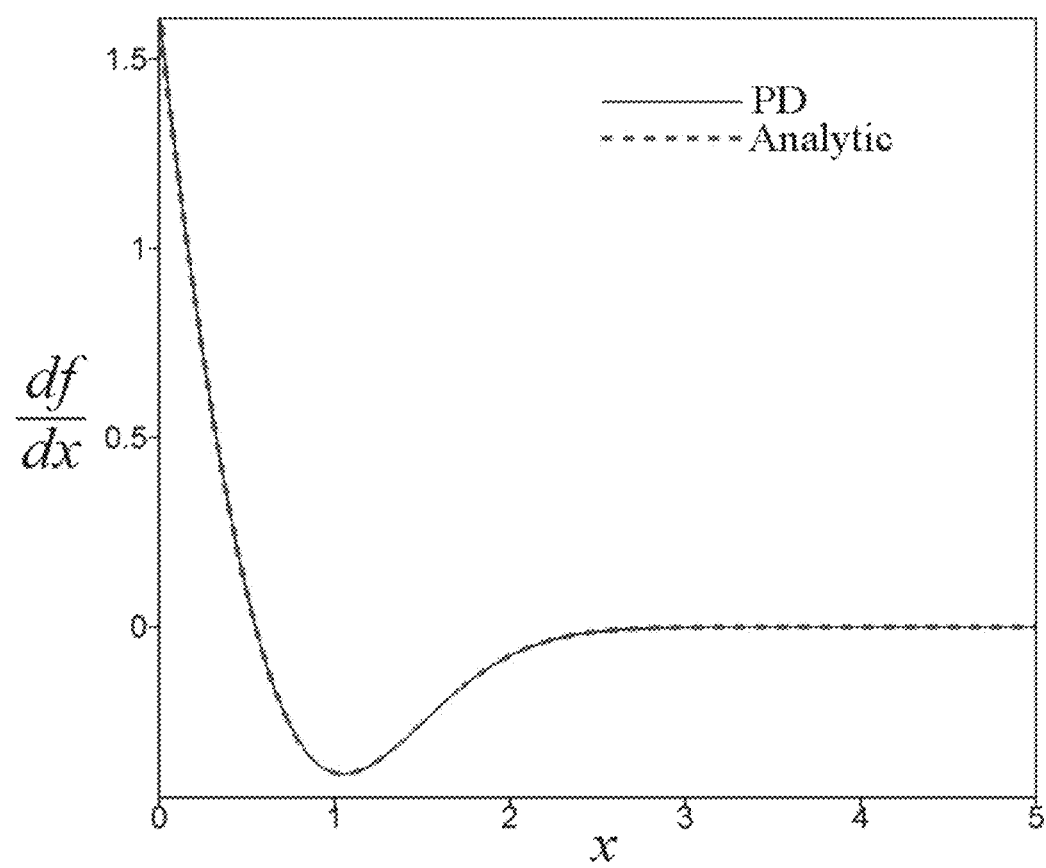
Figure 9C:
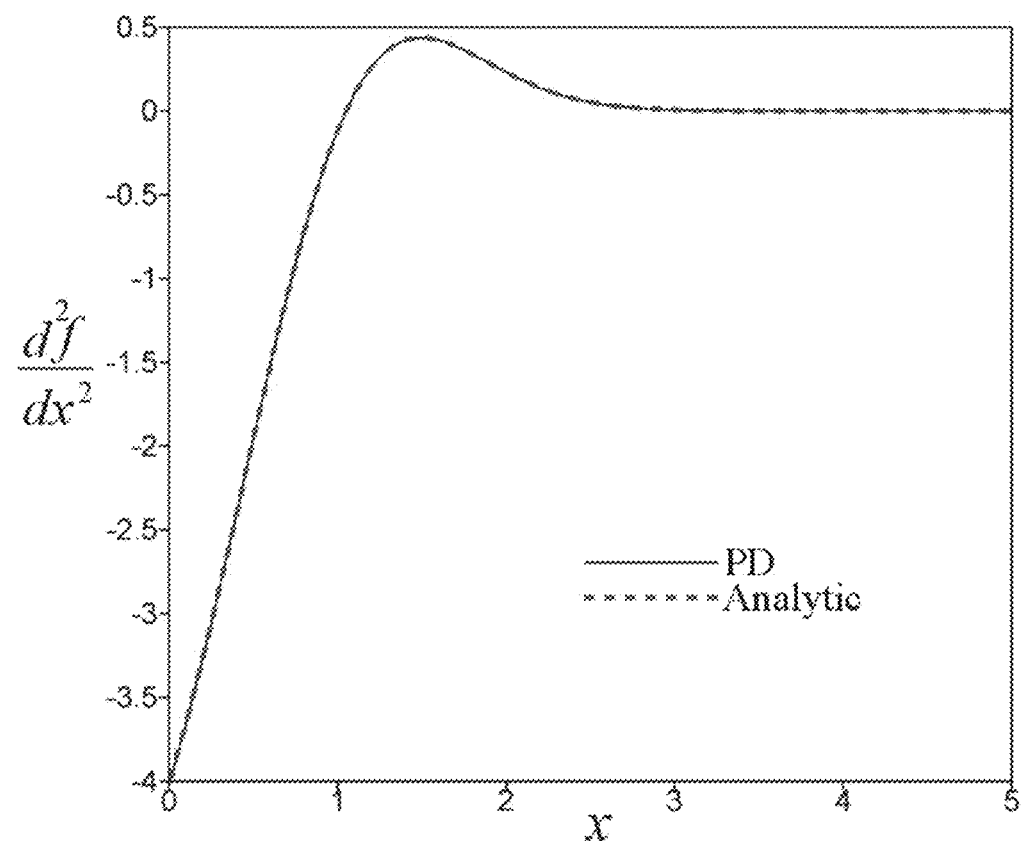

FIGS. 9A-9C illustrate comparisons between an example peridynamic solution according to an embodiment of the present invention and a comparable analytical solution for a function f(x), the first derivative of the function f(x), and the second derivative of the function f(x).

To describe FIGS. 9A-9C, consider differential equation (59), which may arise, for example, in the solution of the boundary layer flow induced by a potential vortex given by $$\frac{d^2 f(x)}{dx^2} + 2x\frac{df(x)}{dx} - 4f(x) = \qquad (59)$$

$$4\left\{\mathrm{erf}^2(x) - \frac{2}{\sqrt{\pi}}xe^{-x^2}\mathrm{erf}(x) - \frac{2}{\pi}e^{-2x^2} + \frac{2}{\pi}e^{-x^2} - 1\right\},$$

subject to the boundary conditions of $$f(0) = 0 \text{ and } \lim_{x \to \infty} f(x) = 0$$

with a condition at infinity. Its exact solution is $$f(x) = \frac{2x^2 - 1}{2}\mathrm{erf}^2(x) + \frac{3}{\sqrt{\pi}}xe^{-x^2}\mathrm{erf}(x) - \frac{4}{3\pi}e^{-x^2} + \frac{2}{\pi}e^{-2x^2} - \qquad (60)$$

$$\left(1 + \frac{2}{3\pi}\right)(2x^2 + 1) + 1 + \frac{1}{2}\left(1 + \frac{4}{3\pi}\right)\left((2x^2 + 1)\mathrm{erf}(x) + \frac{2}{\sqrt{\pi}}xe^{-x^2}\right).$$

According to an embodiment of the present invention, replacing the local derivatives with their PD counterparts in this differential equation and employing the Gaussian quadrature technique for spatial integration may lead to its discretized form as $$\sum_{j=1} f(x_{(j)})\left[\begin{array}{c} g_4^{100}(x_{(j)} - x_{(k)}) + 2x_{(k)}g_4^{100}(x_{(j)} - x_{(k)}) - \\ 4g_4^{000}(x_{(j)} - x_{(k)}) \end{array}\right]\ell_{(j)} = \qquad (61)$$

$$4\left\{\mathrm{erf}^2(x_{(k)}) - \frac{2}{\sqrt{\pi}}x_{(k)}e^{-x^2}\mathrm{erf}(x_{(k)}) - \frac{2}{\pi}e^{-2x_{(k)}^2} + \frac{2}{\pi}e^{-x_{(k)}^2} - 1\right\}.$$

Similarly, the boundary conditions may be discretized as $$\sum_j f(x_{(j)}) g_4^{000}(x_{(j)} - x_1) \ell_{(j)} = 0 \qquad (62)$$

$$\sum_j f(x_{(j)}) g_4^{000}(x_{(j)} - x_K) \ell_{(j)} = 0,$$

with $x_1 = 0 + \Delta x/2$ and $x_K = 5 - \Delta x/2$ corresponding to a point at which the function $f(x_k)$ diminishes at infinity, i.e., $f(x_k) \cong f(\infty) = 0$. Because a fourth-order Taylor series expansion (i.e., N=4) may be used for derivatives of up to second order, the number of family members may be defined by the horizon size of $\delta = 6\Delta x$ with uniform spacing of $x_k - x_{k-1} = \Delta x = 0.05$ for k=1,200. Each material point may have a length of $l_{(k)} = \Delta x$.

FIGS. 9A-9C show the comparisons of the PD numerical solutions and derivatives with the exact calculations. As evident in these figures, they are in excellent agreement.

Figure 10:
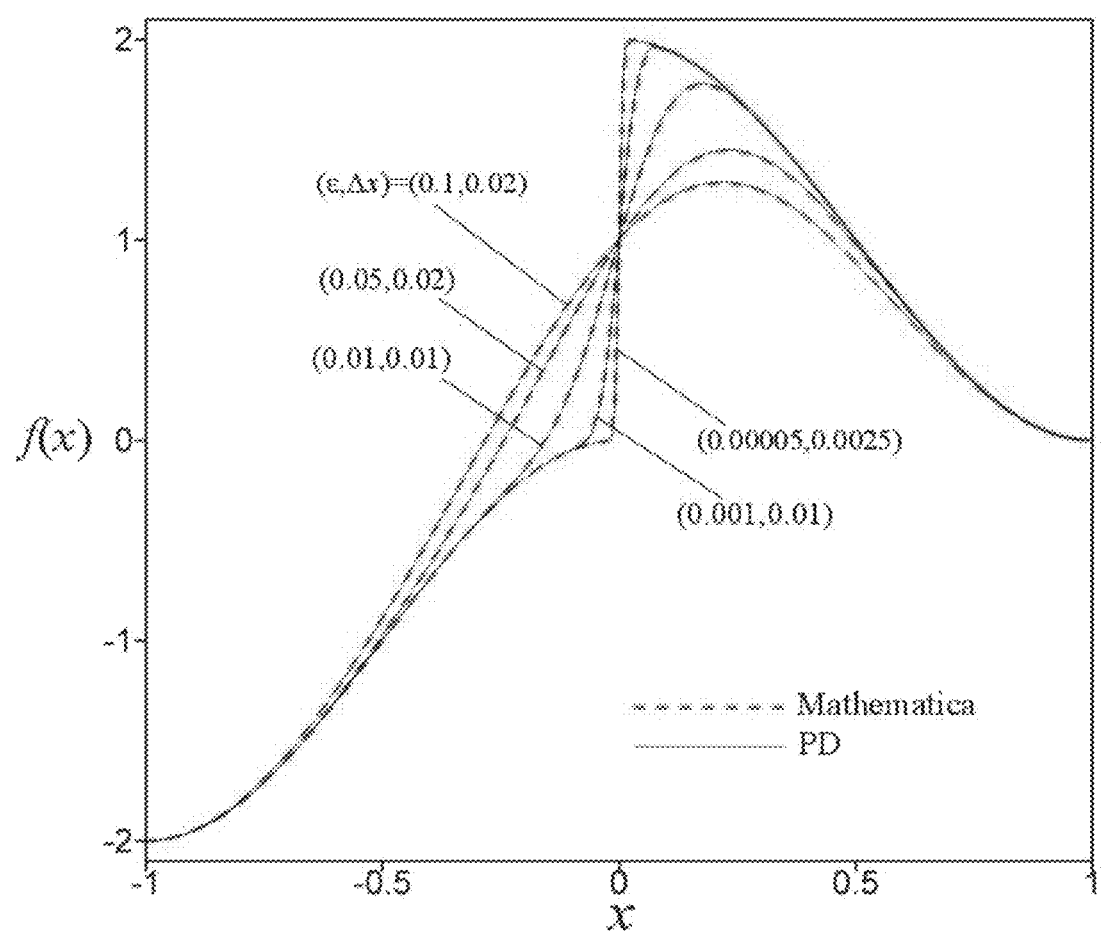
FIG. 10 illustrates a comparison between example peridynamic solutions according to embodiments of the present invention and comparable solutions generated in Mathematica for decreasing values of $\varepsilon$.

FIG. 10 illustrates a comparison between example peridynamic solutions according to embodiments of the present invention and comparable solutions generated in Mathematica for decreasing values of ε.

To describe FIG. 10, consider differential equation (63), in which the highest derivative is multiplied with a small parameter ε as given by $$\varepsilon \frac{d^2 f(x)}{dx^2} + x \frac{df(x)}{dx} = -\varepsilon \pi^2 \cos(\pi x) - \pi x \sin(\pi x), \qquad (63)$$

subject to the boundary conditions $f(-1) = -2$, $f(1) = 0$. Its numerical solution may cause issues to consider when using standard techniques. As the small parameter ε approaches zero, the nature of the solution changes. Thus, direct application of standard techniques may break down. The solution to such differential equations exhibits a multi-scale character of inner and outer solutions. Therefore, the analytical solution is a composite of inner and outer solutions. The outer solution is dominated by the reduced differential equation, behaves regularly, and varies slowly. However, the inner solution varies rapidly, and it is obtained by recasting the differential equation using a new independent variable.

Without resorting to a composite solution, in an embodiment of the present invention, expressing the derivatives in terms of the PD differential operator may permit the discretization of this differential equation as $$\sum_{j=1} f(x_{(j)}) [\varepsilon g_2^{200}(x_{(j)} - x_{(k)}) + x_{(k)} g_2^{100}(x_{(j)} - x_{(k)})] \ell_{(j)} = \qquad (64)$$

$$-\varepsilon \pi^2 \cos(\pi x_{(k)}) - \pi x \sin(\pi x_{(k)}).$$

Similarly, the boundary conditions may be discretized as $$\sum_j f(x_{(j)}) g_2^{000}(x_{(j)} - x_1) \ell_{(j)} = -2 \text{ for } k = 1 \qquad (65)$$

$$\sum_j f(x_{(j)}) g_2^{000}(x_{(j)} - x_K) \ell_{(j)} = 0 \text{ for } k = K,$$

with $x_1 = -1 + \Delta x/2$ and $x_K = 1 - \Delta x/2$. The number of family members may be defined by the horizon size of $\delta = 3\Delta x$, and uniform spacing of $x_{(k)} - x_{(k-1)} = \Delta x = 0.02, 0.01$ and $0.0025$ are considered for perturbation constants of $\varepsilon = 0.1, 0.05, 0.01, 0.001$ and $0.00005$, as shown in FIG. 10, which illustrates a comparison between peridynamic solutions according to embodiments of the present invention and solutions generated in Mathematica for decreasing values of ε. Comparisons of the PD solutions with those of Mathematica for varying values of ε, shown in FIG. 10, indicate excellent agreement. It is evident that as ε reduces, the gradient of f(x) near x=0 becomes steep, thus requiring refined small spacing of integration points.

Figure 11A:
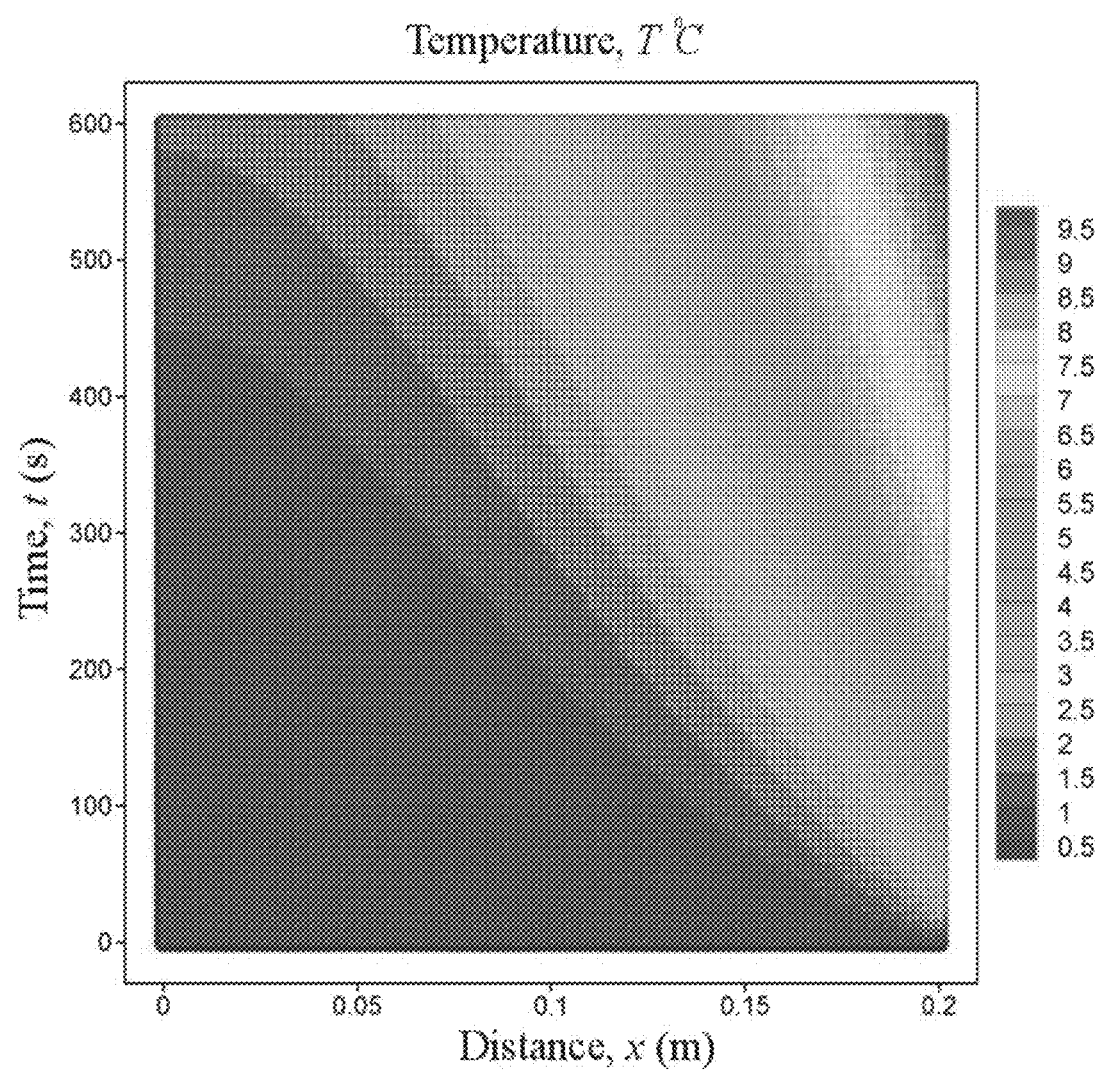
FIG. 11A illustrates an example peridynamic solution to a heat conduction equation according to an embodiment of the present invention.
Figure 11B:
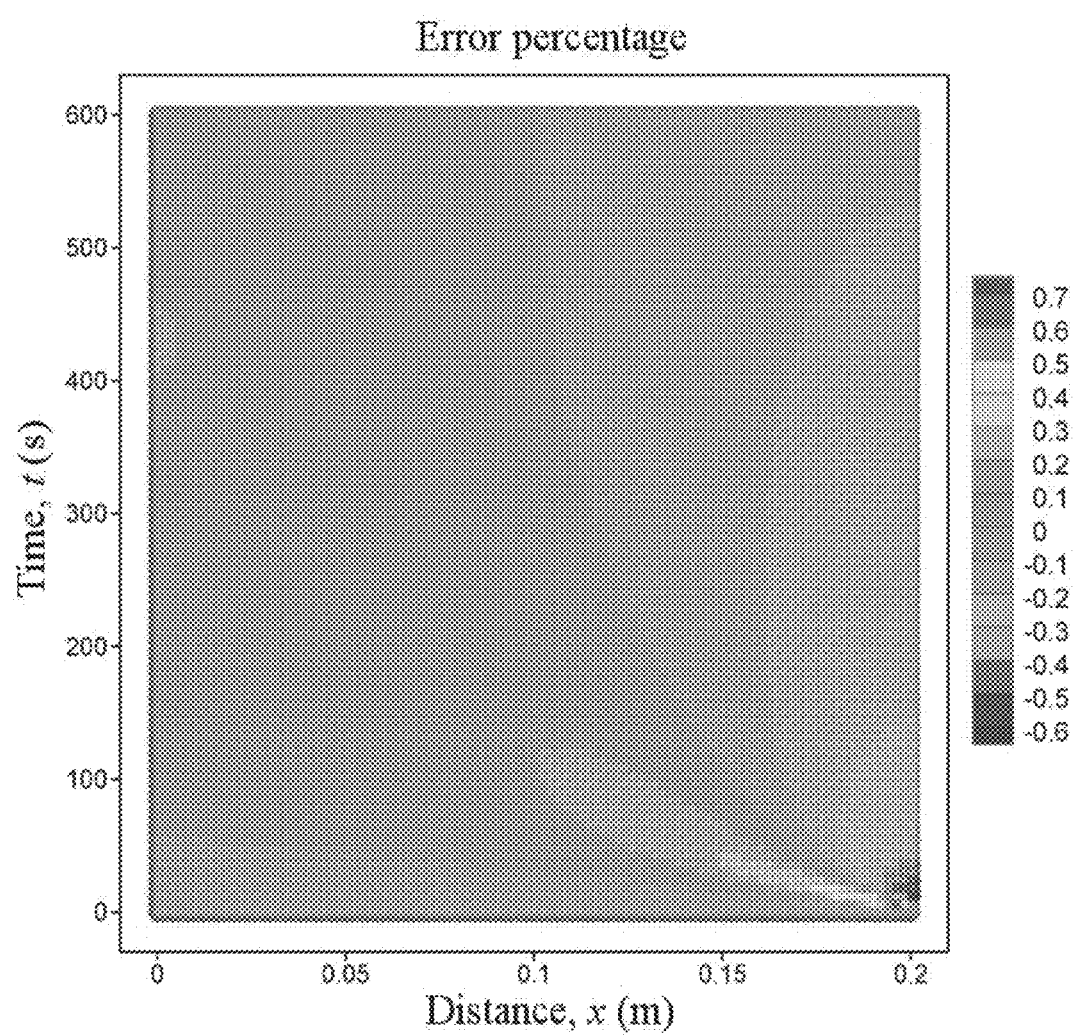
FIG. 11B illustrates an error between the peridynamic solution to the heat conduction equation of FIG. 11A and a comparable analytical solution.

FIG. 11A illustrates an example peridynamic solution to a heat conduction equation according to an embodiment of the present invention. FIG. 11B illustrates an error between the peridynamic solution to the heat conduction equation of FIG. 11A and a comparable analytical solution.

To help describe FIGS. 11A-11B, the following partial differential equation, commonly referred to the as "heat conduction" equation, is given as $$\rho c \frac{\partial T(x, t)}{\partial t} = k \frac{\partial^2 T(x, t)}{\partial x^2}. \qquad (66)$$

This equation may describe the temperature field, T(x,t), in a one-dimensional domain in terms of time and space. The extent of the domain may be defined by k, and its initial temperature may be $T(x,0) = 0°$ C. The domain may have a density of 7850 kg/m$^3$, thermal conductivity of 50 W/m-° K, and specific heat of 500 J/kg-° K. The domain may be insulated at the left and may be subjected to a heat flux at the right end. It may be subject to the boundary conditions of $\partial T(0,t)/\partial x = 0$ and $k \partial T(L,t)/\partial x = q = 5000$ W/m$^2$. The analytical solution to this equation may be constructed as $$T = \frac{qL}{k} \left[ \begin{array}{l} -\frac{1}{6} + \frac{k}{\rho c L^2} t + \frac{1}{2L^2} x^2 - \frac{2}{\pi^2} \sum_{n=1}^{\infty} \frac{(-1)^n}{n^2} \\ \exp\left(-\frac{n^2 \pi^2}{L^2} \frac{k}{\rho c} t\right) \cos\left(\frac{n\pi}{L} x\right) \end{array} \right]. \qquad (67)$$

In order to eliminate any possible numerical difficulty, both the space and time variables may be normalized so that they vary only between 0 and 1. The normalized variables are defined as $\bar{x} = x/0.2$ with $0 \le \bar{x} \le 1$ and $\bar{t} = t/600$.

With these normalized variables, Eq. (66) may be rewritten as $$\rho c \frac{\partial T(x, t)}{\partial \bar{t}} = 15000 k \frac{\partial^2 T(x, t)}{\partial \bar{x}^2}, \qquad (68)$$

with the initial and boundary conditions specified as $T(\bar{x},0) = 0$, $\partial T(0,\bar{t})/\partial \bar{x} = 0$, and $\partial T(1,\bar{t})/\partial \bar{x} = q/5k = 20$.

In an embodiment of the present invention, expressing both the normalized spatial and time derivatives in terms of the PD differentiation may lead to the discretization of the differential equation as $$\sum_j T(\bar{x}_{(j)}, \bar{t}_{(j)}) \left( \begin{array}{l} 1.5 \times 10^4 \mathrm{kg}_2^{200}(\bar{x}_{(k)} - \bar{x}_{(k)}, \bar{t}_{(j)} - \bar{t}_{(k)}) - \\ \rho c g_1^{010}(\bar{x}_{(j)} - \bar{x}_{(k)}, \bar{t}_{(j)} - \bar{t}_{(k)}) \end{array} \right) \bar{A}_{(j)} = 0, \qquad (69)$$

with $\bar{A}_{(j)} = \Delta \bar{x} \Delta \bar{t}$ and k=1, . . . ,K=100. In addition, the boundary and initial conditions may be expressed in terms of PD unknowns as $$\sum_{j=1} T(\overline{x}_{(j)}, \overline{t}_{(j)}) g_2^{100}(\overline{x}_{(j)} - \overline{x}_{(k)}, \overline{t}_{(j)} - \overline{t}_{(k)}) \overline{A}_{(j)} = 0 \quad (70)$$

for $x_{(k)} = 0 + \Delta \overline{x}/2$, $$\sum_{j=1} T(\overline{x}_{(j)}, \overline{t}_{(j)}) g_2^{100}(\overline{x}_{(j)} - \overline{x}_{(k)}, \overline{t}_{(j)} - \overline{t}_{(k)}) \overline{A}_{(j)} = \frac{q}{5k}$$

for $x_{(k)} = 1 - \Delta \overline{x}/2$, $$\sum_{j=1} T(\overline{x}_{(j)}, \overline{t}_{(j)}) g_1^{000}(\overline{x}_{(j)} - \overline{x}_{(k)}, \overline{t}_{(j)} - \overline{t}_{(k)}) \overline{A}_{(j)} = 0,$$

for $\overline{t}_{(k)} = 0$.

The horizon size concerning spatial direction may be specified as $\delta = 3\Delta \overline{x}$ and temporal direction as $\delta = 3\Delta \overline{t}$. Uniform spacing of $\overline{x}_{(k)} - \overline{x}_{(k-1)} = \Delta \overline{x} = 0.01$ and $\overline{t}_{(k)} - \overline{t}_{(k-1)} = \Delta \overline{t} = 0.01$ may be specified between the material points. FIGS. 11A-11B show the PD solution and the error from the analytical solution until $t = 10$ min or $\overline{t} = 1$. As evident in FIGS. 11A-11B, the PD and analytical solutions are in excellent agreement.

According to one or more embodiments of the present invention, a nonlocal PD differential operator is provided and enables the solution of ordinary differential equations in a unified manner regardless of their intrinsic behavior or presence of a singularity. Without any derivative reduction process and special treatment, embodiments of the present invention provide for a PD differential operator that enables the nonlocal form of local differential equations. In one or more embodiments, the robustness and capability of the PD differential operator have been demonstrated by constructing solutions to challenging differential equations. Its use in various applications, such as image recovery by computer systems, allows for superior accuracy and speed in computational analysis.

In some embodiments, such as with temporal analysis, the PD differentiation may be interpreted as differentiation with memory. The PD differentiation may serve as a natural filter in the presence of noisy data, as it may provide their derivatives. In embodiments of the present invention, the PD differentiation may restore the interactive nature of physical phenomena lost due to a local differentiation concept. As non-limiting examples of embodiments of the present invention, the PD differential operators may be readily applied to solve nonlinear differential equations of any order, and Abel's integral equations. Further embodiments may pave the way for direct and inverse solution of coupled field equations without any special treatments.

In some embodiments, the PD differential operator may be a natural filter, and it may be used to perform image compression and recovery. Furthermore, in other embodiments, it may be used to sharpen images as part of higher order diffusion equations. Moreover, in still other embodiments, it may be used to evaluate noncontact data, such as Digital Image Correlation (DIC) and Moiré data, that may require differentiation to determine the strain field.

Figure 12:
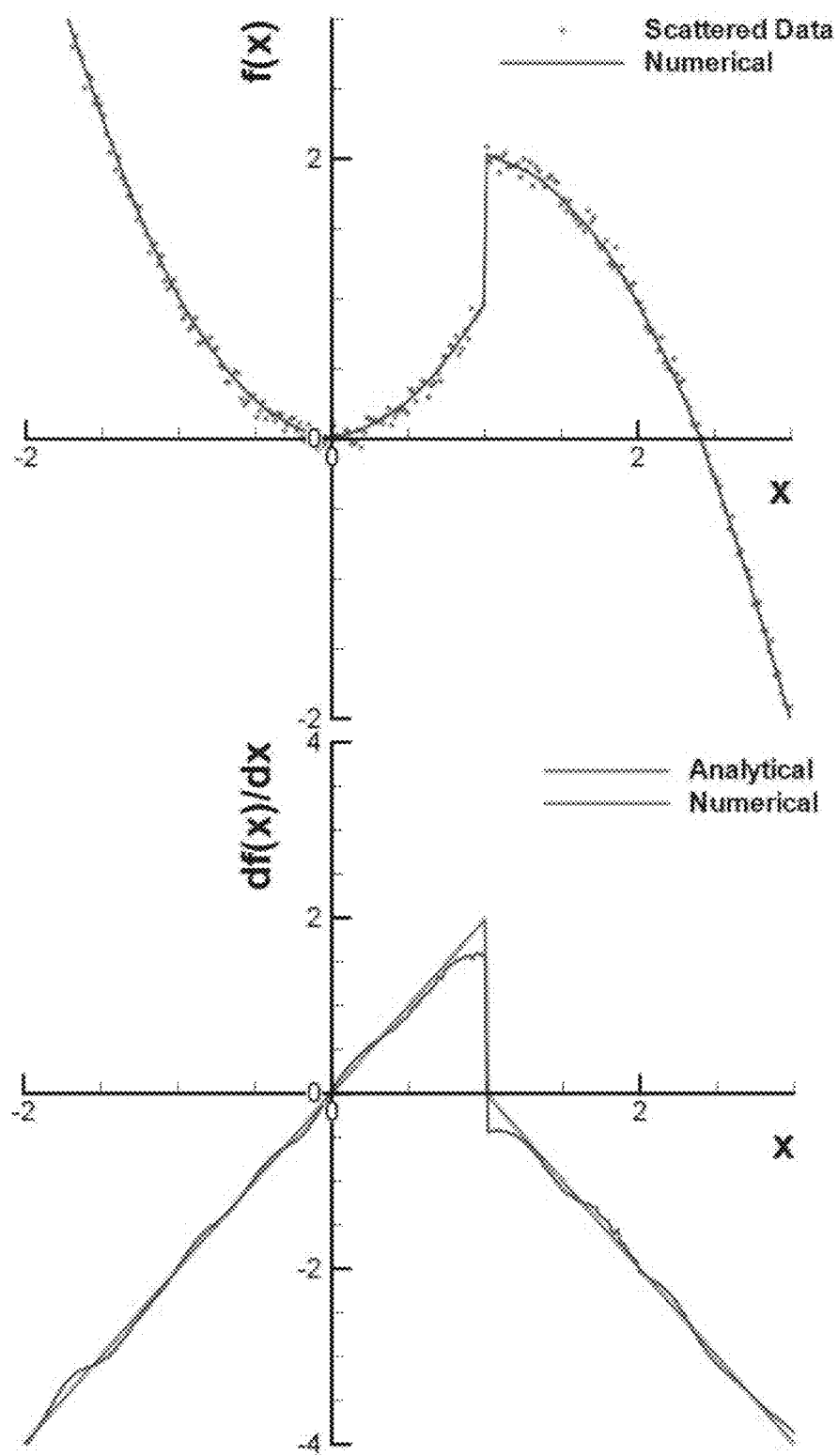
FIG. 12 illustrates an example differentiation of discontinuous data contaminated by noise using an embodiment of the present invention.

FIG. 12 illustrates an example differentiation of discontinuous data contaminated by noise using an embodiment of the present invention.

Referring to FIG. 12, the concept of interactions presented herein may also serve as a tool for modeling system evolution to critical conditions. In many applications, the physics of the entire system may be refined into physics of individual interactions between data points. This refined physics may be pair-wise (between two points) or family-wise (between a subset of points). During transition to a critical phase (e.g., large velocity, large deformation, etc.), each individual interaction may go toward annihilation, while the entire system may exhibit a complicated pattern of growing irregularities. The traditional local derivatives cease at this step; the proposed derivative operator according to one or more embodiments invokes an inherent and consistent way of relaxing interactions toward final failure of the entire system.

This approach has already shown its fidelity and robustness in the field of materials engineering through gradual decay of interactions between material points contributing to the governing equilibrium equations. In one or more embodiments, the proposed derivative operator may provide for a way to extend this approach to any partial differential equation in any scientific field for which a gradual removal of interactions toward failure happens, as would be apparent to one of ordinary skill in the art. This procedure is not limited to engineering applications. For example, in recovering 3D objects from 2D images in tomography, the interactions may be set to be broken after a threshold larger than the amount of noise. A simple example of the derivative of discontinuous data is shown in FIG. 12.

Figure 13:
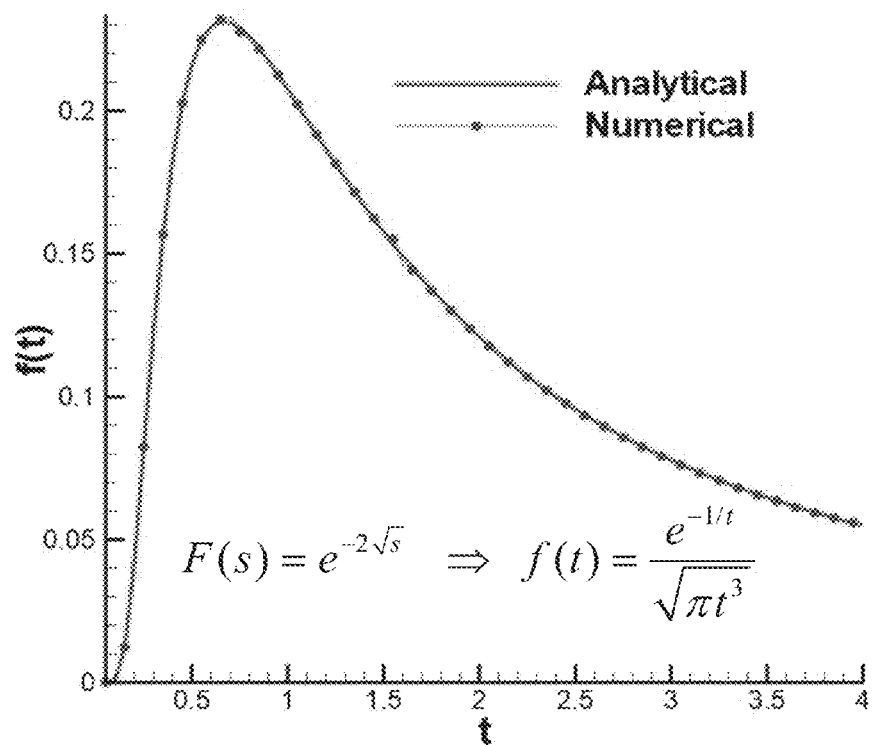
FIG. 13 illustrates examples of Laplace inversion using higher order derivatives according to embodiments of the present invention.
Figure 13:
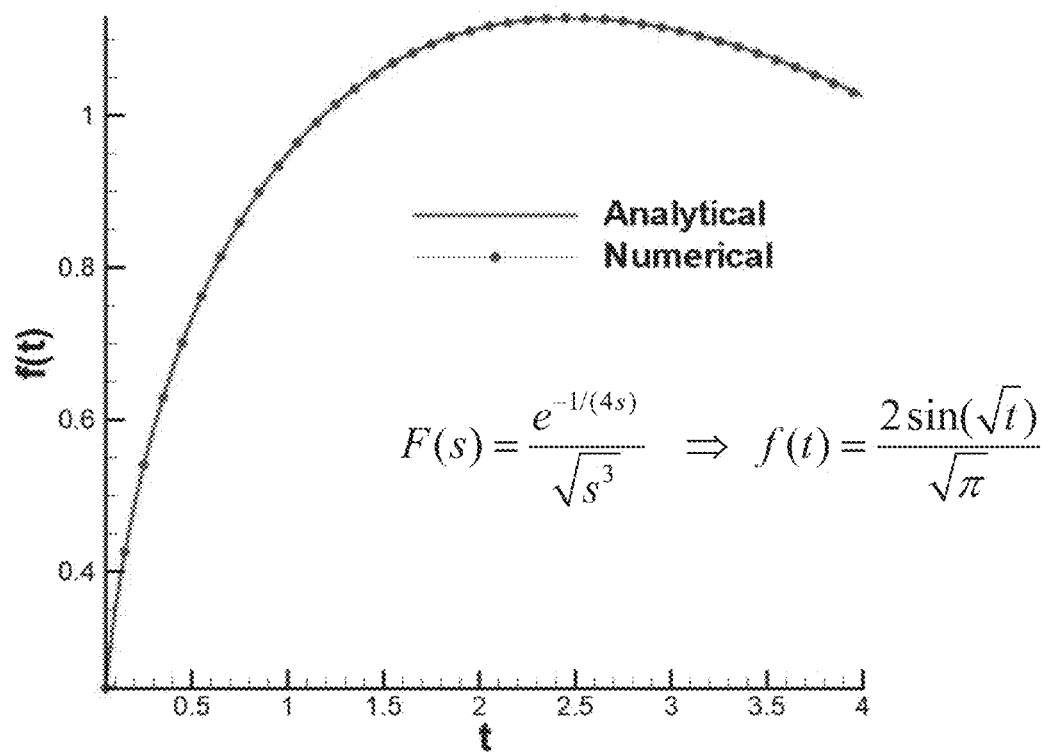

FIG. 13 illustrates examples of Laplace inversion using higher order derivatives according to embodiments of the present invention.

With reference to FIG. 13, in one or more embodiments, the proposed derivative operator may be able to handle singularities without any special treatment and in a natural manner. Singularities may be deficits that may not happen in reality. They may be a mathematical art effect due to the local nature of derivatives. In some embodiments, by using the proposed nonlocal derivative operator, these abnormalities may be smoothed out based on the degree of interaction between data points. In this way, a numerical or physical length scale may be incorporated into the model.

In some embodiments, the proposed operator may be capable of producing higher order derivatives with excellent accuracy up to the limit of machine precision order. While the derivatives of more than four may rarely happen in differential field equations, there may be other applications where computing derivatives of order 8-12 may prove useful. In some embodiments, an application of the proposed nonlocal derivative operator may concern numerical inversion of Laplace transform by Post formula, which may require accurate evaluation of very higher order derivatives.

The development of accurate numerical Laplace inversion is a long-standing problem, and it is an active area of research. The exponential term may lead to a large increase in the total error from even small numerical and finite precision errors. Effective Laplace inversion may provide a multitude of avenues for further research with diverse practical applications such as electromagnetics with biomedical applications and optical pulse propagation in a fixed dielectric medium with a nontrivial material dispersion relation. According to embodiments of the present invention, examples of Laplace inversion using the proposed operator are shown in FIG. 13.

Figure 14:
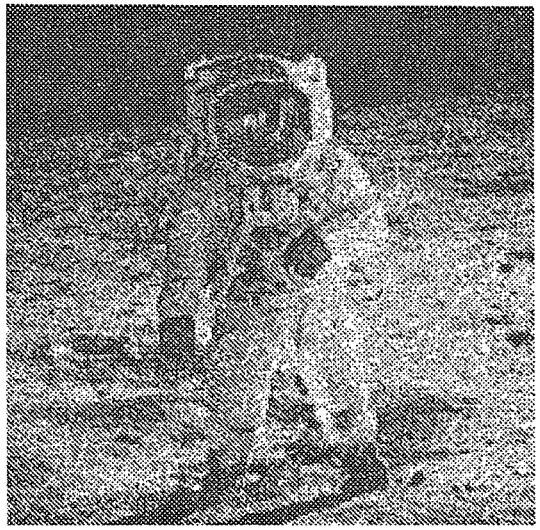
FIG. 14 illustrates results of an example image de-noising process according to an embodiment of the present invention.
Figure 14:
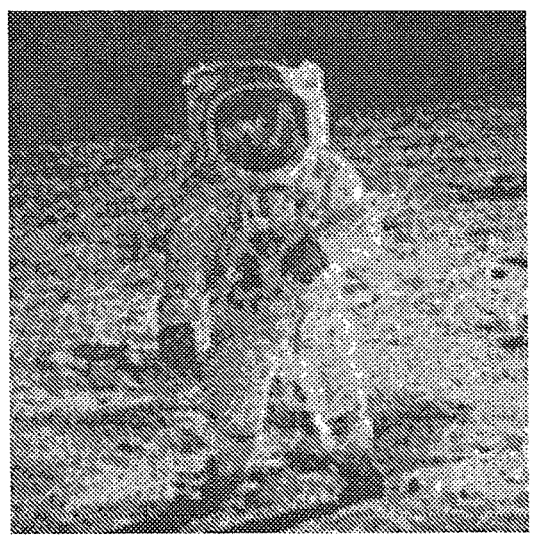
Figure 14:
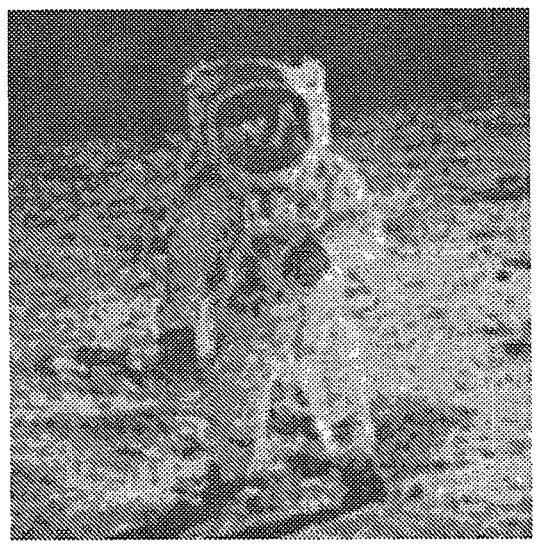

FIG. 14 illustrates results of an example image de-noising process according to an embodiment of the present invention.

Referring to FIG. 14, in embodiments of the present invention, the nonlocal derivative operator may be used to analyze images from medical Magnetic Resonance Elastography (MRE), Moire interferometry, airborne infrared cameras, etc. In some embodiments, the horizon size H and the function $g^{P_1 P_2 - PM}(x - x_0)$ may be tailored to each particular application. One application may be noise removal. In one or more embodiments, the proposed operator may be applied as a filter, in an iterative manner, to remove noise up to a desired level. A basic example of noise removal using the proposed operator according to an embodiment of the present invention is shown in FIG. 14.

Figure 15:
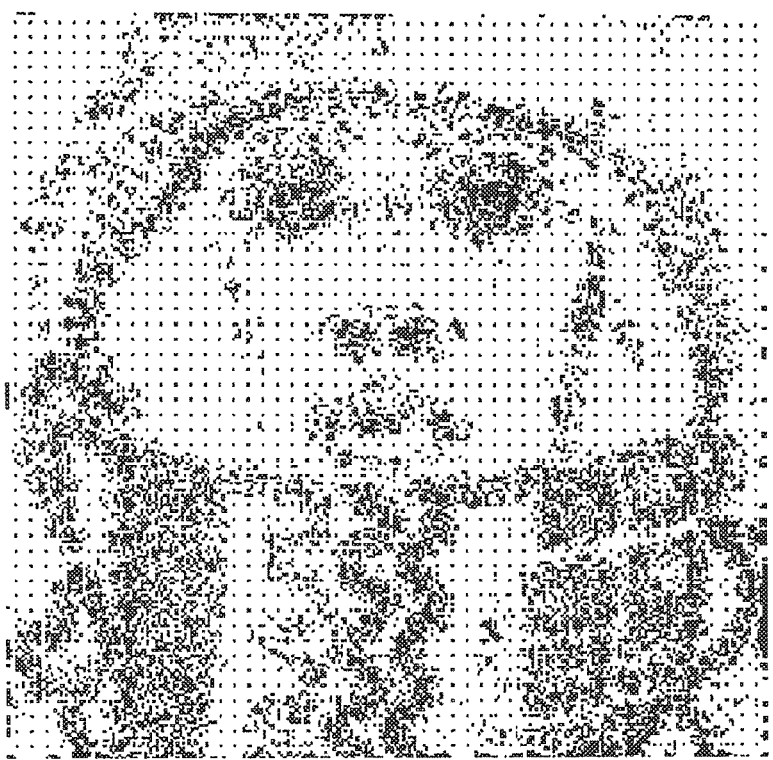
FIG. 15 illustrates an additional example of image compression and recovery according to an embodiment of the present invention.
Figure 15:

FIG. 15 illustrates an additional example of image compression and recovery according to an embodiment of the present invention.

Referring to FIG. 15, in embodiments of the present invention, the proposed operator may also be used by a computer, as described above in relation to FIGS. 6A-8C, for image compression, or recovery from incomplete or compressed data. Another example of image compression is shown in FIG. 15. In this figure, the proposed operator according to an embodiment is used to compress the data to 20 percent of the original image as illustrated in the top image, which illustrates the selected pixels in an embodiment of the present invention (here, a black pixel indicates a selected pixel), while the bottom image shows the recovered image. This is an illustrative example, and in other embodiments, much higher compression rates may be achieved by elaborating on the proposed operator (for example, having more rounds of pixel selection, but selecting fewer total pixels in the rounds).

Figure 16:
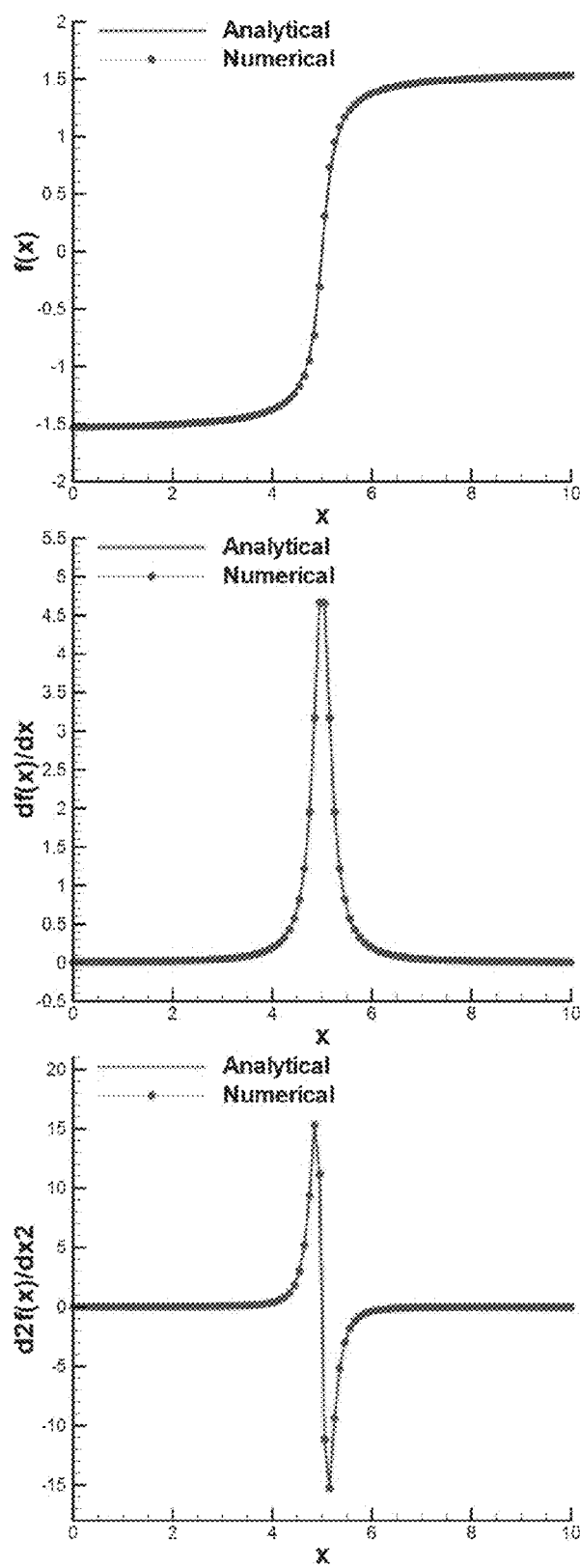
FIG. 16 illustrates an additional example of a differential equation with an abrupt change as solved analytically and using the derivative operator according to an embodiment of the present invention.

FIG. 16 illustrates an additional example of a differential equation with an abrupt change as solved analytically and using the derivative operator according to an embodiment of the present invention.

Referring to FIG. 16, in embodiments of the present invention, the proposed derivative operator is not limited to 1-dimensional space, and may be used for partial derivatives of any order in an M-dimensional space. In some embodiments, the operator may be defined in terms of integrals, and may be very suitable for numerical discretization, as would be apparent to one of ordinary skill in the art. This may serve as a generic tool for solving linear and nonlinear, ordinary and partial differential equations. In embodiments of the present invention, without any derivative reduction process or special treatment, direct expression of local derivatives in terms of the nonlocal differential operator may permit the solution of any differential equation and its derivatives up to any order within the limitation of the machine accuracy or round-off error.

As an example, a differential equation may be solved in an embodiment of the present invention by employing the proposed derivative operator as shown in FIG. 16. The differential equation may be given by $$\frac{d^2 f(x)}{dx^2} + \frac{250(x-5)}{(25(x-5)^2 + 1)^2} = 0 \quad (71)$$

and subject to the boundary conditions of f(0)=arctan(-25) and f(10)=arctan(25). It has the exact solution of f(x)=arctan (5(x-5)). As evident in FIG. 16, it exhibits a rapid variation near a particular point; thus, it has steep gradients.

Figure 17:
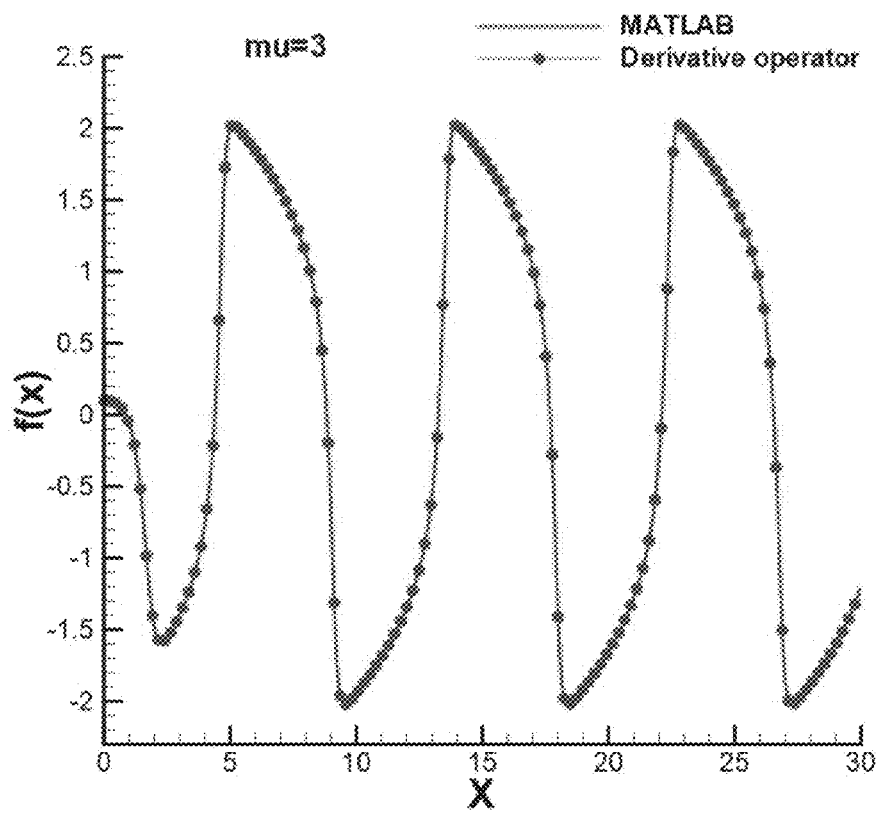
FIG. 17 illustrates a solution to a Van der Pol differential equation as solved using MATLAB and using an example derivative operator according to an embodiment of the present invention.
Figure 17:
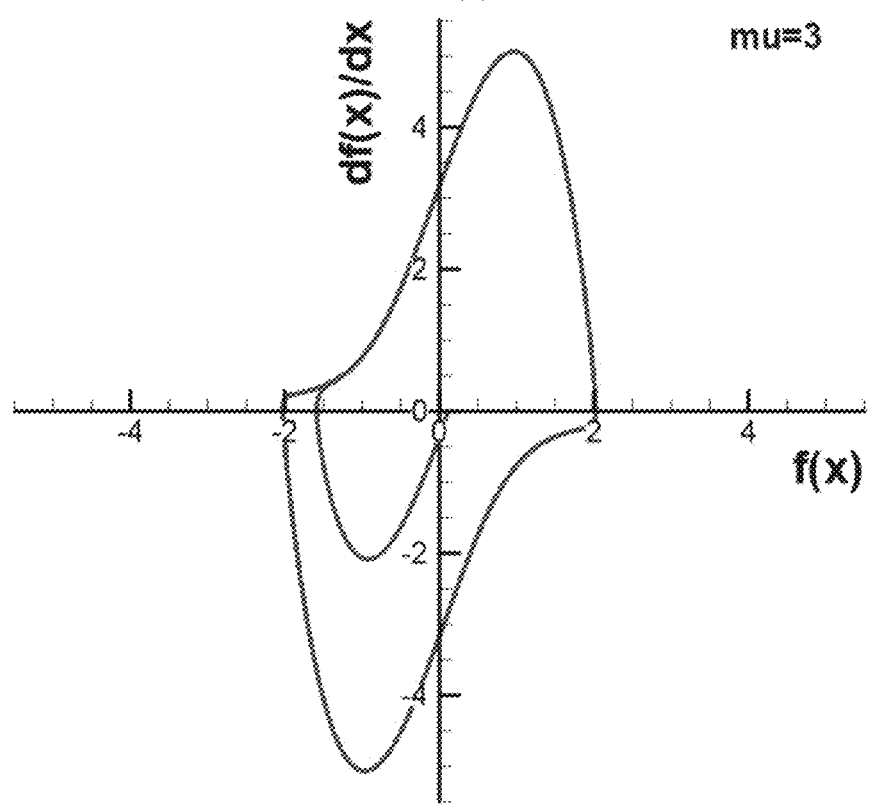

FIG. 17 illustrates a solution to a Van der Pol differential equation as solved using MATLAB and using an example derivative operator according to an embodiment of the present invention.

Referring to FIG. 17, another example embodiment concerns the solution of the Van der Pol equation. The differential equation may be given by $$\frac{d^2 f(x)}{dx^2} - \mu(1 - f(x)^2) + f(x) = 0 \quad (72)$$

and subject to the initial conditions of f(0)=1/10, f'(0)=0. This equation describes the oscillatory processes in not only physics, but also biology, sociology, and even economics. Its solution has a "limit cycle" with a scalar parameter controlling the strength of the nonlinear damping. As this parameter becomes large, the equation becomes "stiff," and the state towards which the oscillations converge is the "limit cycle." The solution to the Van der Pol equation with the proposed operator according to an embodiment is shown in FIG. 17.

FIG. 18 is a block diagram of an example computing device 1800 that may be used to implement embodiments of the present invention.

The computing system 1800 of FIG. 18 may include one or more processors 1810 and memory 1820. Main memory 1820 may store, in part, instructions and data for execution by processor 1810. Main memory 1820 may store the executable code when in operation. The system 1800 of FIG. 18 may further include a mass storage device 1830, portable storage medium drive(s) 1840, output devices 1850, user input devices 1860, a graphics display 1870, and peripheral devices 1880.

The components shown in FIG. 18 are depicted as being connected via a single bus 1890. However, in other embodiments, the components may be connected through one or more data transport means. For example, in some embodiments, processor unit 1810 and main memory 1820 may be connected via a local microprocessor bus, and the mass storage device 1830, peripheral device(s) 1880, portable storage device 1840, and display system 1870 may be connected via one or more input/output (I/O) buses.

Mass storage device 1830, which may be implemented, for example, with a magnetic disk drive or an optical disk drive, may be a non-volatile storage device for storing data and instructions for use by processor unit 1810. Mass storage device 1830 may store the system software for implementing embodiments of the present invention for purposes of loading that software into main memory 1820.

Portable storage device 1840 may operate in conjunction with a portable non-volatile storage medium, such as a floppy disk, compact disk, or Digital videodisc, to input and output data and code to and from the computer system 1800 of FIG. 18. The system software for implementing embodiments of the present invention may be stored on such a portable medium and input to the computer system 1800 via the portable storage device 1840.

Input devices 1860 may provide a portion of a user interface. Input devices 1860 may include an alphanumeric keypad, such as a keyboard, for inputting alphanumeric and other information, or a pointing device, such as a mouse, a trackball, stylus, or cursor direction keys. Additionally, the system 1800 as shown in FIG. 18 may include output devices 1850. Examples of suitable output devices may include speakers, printers, network interfaces, and monitors.

Display system 1870 may include, for example, a liquid crystal display (LCD), a plasma display, an organic light-emitting diode (OLED) display, an electronic ink display, or another suitable display device. Display system 1870 may receive textual and graphical information, and may process the information for output to the display device. The display system 1870 may include touchscreen input capabilities, such as capacitive touch detection.

Peripherals 1880 may include any type of computer support device to add additional functionality to the computer system. For example, peripheral device(s) 1880 may include a modem or a router.

The components contained in the computer system 1800 of FIG. 18 are those found in many computer systems that may be suitable for use with embodiments of the present invention and are intended to represent a broad category of such computer components that are well known in the art. Thus, the computer system 1800 of FIG. 18 may be a personal computer, hand held computing device, telephone, smartphone, tablet, personal digital assistant, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, Android, iOS, and other suitable operating systems.

FIG. 19 is a flow diagram illustrating an example method of data recovery on a computer system (such as computer system 1800) according to an embodiment of the present invention.

This and other methods disclosed herein may be implemented, for example, as a series of computer instructions to be executed by a processor (or other computing device), such as a microprocessor, or two or more processors. The processor(s) may execute computer program instructions and interact with other system components for performing the various functionalities described herein. The computer program instructions may be stored in a memory implemented using a standard memory device, such as, for example, a random access memory (RAM). The computer program instructions may also be stored in other non-transitory computer readable media such as, for example, a CD-ROM, flash drive, or the like. The methods may also be implemented using hardware circuits (e.g., transistors, capacitors, logic gates, field programmable gate arrays (FPGAs), etc.), or combinations of hardware circuits, software, and firmware, as would be apparent to one of ordinary skill in the art.

In the method of FIG. 19, a remaining set of original data is recovered from a partial set of the original data. The partial set may be stored, for example, on a nonvolatile storage device (e.g., disk storage 1830) of the computer system 1800. The original data may be organized by a geometry having a locality function. Each original datum of the original data may occupy a point of the geometry and have a corresponding distance to each other point of the geometry as defined by the locality function. The original datum may further have a corresponding one or more values (such as data values).

Processing begins, and in step 1910, the partial set of the original data is identified from which to recover the remaining set of the original data. Steps 1920-1950 are then performed for each remaining datum of the remaining set. More specifically, in step 1920, a family of points of the geometry corresponding to members of the partial set local to the remaining datum is identified by a processor 1810 of the computer system 1800 using the locality function.

Then, in step 1930, the processor 1810 estimates the corresponding one or more values of the remaining datum by using a peridynamic differential operator (for example, as described above) on the corresponding one or more values of each of the members of the partial set in the family of points. In step 1940, the processor 1810 stores the estimated values of the remaining datum on the nonvolatile storage device 1830. In step 1950, the processor 1810 checks to see if more remaining data remain to be recovered, and if so, processing resumes with step 1920 on the next remaining datum. Otherwise, processing ends with all of the remaining data recovered.

FIG. 20 is a flow diagram illustrating an example method of data compression on a computer system 1800 according to an embodiment of the present invention.

In the method of FIG. 20, a set of original data is compressed on a nonvolatile storage device (e.g., disk storage 1830) of the computer system 1800. The original data may be organized by a geometry having a locality function. Each original datum of the original data may occupy a point of the geometry and have a corresponding distance to each other point of the geometry as defined by the locality function. The original datum may further having a corresponding one or more values.

Processing begins, and in step 2010, a processor 1810 of the computer system 1800 selects a first partial set of the original data, leaving a remaining set of the original data. In step 2020, for each remaining datum of the remaining set, the processor 1810 identifies a family of points of the geometry corresponding to members of the first partial set local to the remaining datum by using the locality function, estimates the corresponding one or more values of the remaining datum by using a peridynamic differential operator (for example, as described above) on the corresponding one or more values of each of the members of the first partial set in the family of points, and compares the estimated values of the remaining datum with corresponding ones of the one or more values of the original data using a comparison function to generate an error value corresponding to a proximity of the estimated values to the original values of the remaining datum.

Then, in step 2030, the processor 1810 selects a second partial set of the remaining set by selecting members of the remaining set having corresponding highest said error values. In step 2040, the processor 1810 stores the first and second partial sets of the original data as first compressed set of the original data on the nonvolatile storage device 1830. The first and second partial sets may be combined into one partial set, and then later recovered (e.g., using the method of FIG. 19) or further compressed (e.g., by doing another pass of the method of FIG. 20). By way of example, the size of the second partial set as well as the number of passes of the method of FIG. 20 may be adjusted to produce a sufficiently compressed set of the original data and that recovers to a close approximation of the original data (e.g., data values within 1% of their original values).

In summary, embodiments of the present invention provide for applications of a nonlocal peridynamic differential operator in areas such as image compression, image recovery, image enhancement, three-dimensional modeling, stress testing, and modeling of cracks and fractures. However, the present invention is not limited to any particular embodiment or embodiments described herein.

While certain embodiments of the present invention have been illustrated and described, it is understood by those of ordinary skill in the art that certain modifications and changes may be made to the described embodiments without departing from the spirit and scope of the present invention as defined by the following claims, and equivalents thereof.

What is claimed is:

1. A method of data recovery on a computer system of a remaining set of original data from a partial set of the original data, the partial set being stored on a nonvolatile storage device of the computer system, the original data being organized by a geometry having a locality function, each original datum of the original data occupying a point of the geometry and having a corresponding distance to each other point of the geometry as defined by the locality function, the original datum further having a corresponding one or more values, the method comprising, for each remaining datum of the remaining set:
    identifying, by a processor of the computer system, a family of points of the geometry corresponding to members of the partial set local to the remaining datum by using the locality function;
    estimating, by the processor, the corresponding one or more values of the remaining datum by using a peridynamic differential operator on the corresponding one or more values of each of the members of the partial set in the family of points; and
    storing, by the processor, the estimated values of the remaining datum on the nonvolatile storage device.

2. The method of claim 1, wherein the original data is an image, the geometry is a set of pixels, and the locality function is Euclidean distance.

3. The method of claim 2, wherein the image is a two-dimensional image and the corresponding one or more values comprise one or more shade values.

4. The method of claim 3, wherein the one or more shade values comprise three shade values corresponding to three primary colors.

5. The method of claim 2, wherein the computer system further comprises a display device and the method further comprises displaying, by the processor on the display device, the image using the partial set of the original data and the estimated values of the remaining set of the original data.

6. A method of data compression on a computer system of a set of original data stored on a nonvolatile storage device of the computer system, the original data being organized by a geometry having a locality function, each original datum of the original data occupying a point of the geometry and having a corresponding distance to each other point of the geometry as defined by the locality function, the original datum further having a corresponding one or more values, the method comprising:
    selecting, by a processor of the computer system, a first partial set of the original data, leaving a first remaining set of the original data;
    for each first remaining datum of the first remaining set:
        identifying, by the processor, a first family of points of the geometry corresponding to members of the first partial set local to the first remaining datum by using the locality function;
        estimating, by the processor, the corresponding one or more values of the first remaining datum by using a peridynamic differential operator on the corresponding one or more values of each of the members of the first partial set in the first family of points; and
        comparing, by the processor, the estimated values of the first remaining datum with corresponding ones of the one or more values of the original data using a comparison function to generate a first error value corresponding to a proximity of the estimated values to the original values of the first remaining datum;
    selecting, by the processor, a second partial set of the first remaining set by selecting members of the first remaining set having corresponding highest said first error values; and
    storing, by the processor on the nonvolatile storage device, the first and second partial sets of the original data as a first compressed set of the original data.

7. The method of claim 6, further comprising:
    adding, by the processor, the first partial set to the second partial set, leaving a second remaining set of the original data;
    for each second remaining datum of the second remaining set:
        identifying, by the processor, a second family of points of the geometry corresponding to members of the second partial set local to the second remaining datum set by using the locality function;
        estimating, by the processor, the corresponding one or more values of the second remaining datum by using the peridynamic differential operator on the corresponding one or more values of each of the members of the second partial set in the second family of points; and
        comparing, by the processor, the estimated values of the first remaining datum with corresponding ones of the one or more values of the original data using the comparison function to generate a second error value corresponding to a proximity of the estimated values to the original values of the second remaining datum;
    selecting, by the processor, a third partial set of the second remaining set by selecting members of the second remaining set having corresponding highest said second error values; and
    storing, by the processor on the nonvolatile storage device, the second and third partial sets of the original data as a second compressed set of the original data.

8. The method of claim 6, wherein the original data is an image, the geometry is a set of pixels, and the locality function is Euclidean distance.

9. The method of claim 8, wherein the image is a two-dimensional image and the corresponding one or more values comprise one or more shade values.

10. The method of claim 9, wherein the one or more shade values comprise three shade values corresponding to three primary colors.

11. A system for data recovery of a remaining set of original data from a partial set of the original data, the original data being organized by a geometry having a locality function, each original datum of the original data occupying a point of the geometry and having a corresponding distance to each other point of the geometry as defined by the locality function, the original datum further having a corresponding one or more values, the system comprising:
    a processor; and
    a non-transitory physical medium, wherein the medium has instructions stored thereon that, when executed by the processor, causes the processor to:
        identify a family of points of the geometry corresponding to members of the partial set local to the remaining datum by using the locality function;
        estimate the corresponding one or more values of the remaining datum by using a peridynamic differential operator on the corresponding one or more values of each of the members of the partial set in the family of points; and
        store the estimated values of the remaining datum on the non-transitory physical medium.

12. The system of claim 11, wherein the original data is an image, the geometry is a set of pixels, and the locality function is Euclidean distance.

13. The system of claim 12, wherein the image is a two-dimensional image and the corresponding one or more values comprise one or more shade values.

14. The system of claim 13, wherein the one or more shade values comprise three shade values corresponding to three primary colors.

15. The system of claim 12, wherein the system further comprises a display device and the instructions, when executed by the processor, further cause the processor to display the image on the display device using the partial set of the original data and the estimated values of the remaining set of the original data.

16. A system for data compression of a set of original data, the original data being organized by a geometry having a locality function, each original datum of the original data occupying a point of the geometry and having a corresponding distance to each other point of the geometry as defined by the locality function, the original datum further having a corresponding one or more values, the system comprising:
  a processor; and
  a non-transitory physical medium, wherein the medium has instructions stored thereon that, when executed by the processor, causes the processor to:
    select a first partial set of the original data, leaving a first remaining set of the original data;
    for each first remaining datum of the first remaining set:
      identify a first family of points of the geometry corresponding to members of the first partial set local to the first remaining datum by using the locality function;
      estimate the corresponding one or more values of the first remaining datum by using a peridynamic differential operator on the corresponding one or more values of each of the members of the first partial set in the first family of points; and
      compare the estimated values of the first remaining datum with corresponding ones of the one or more values of the original data using a comparison function to generate a first error value corresponding to a proximity of the estimated values to the original values of the first remaining datum;
    select a second partial set of the first remaining set by selecting members of the first remaining set having corresponding highest said first error values; and
    store the first and second partial sets of the original data on the non-transitory physical medium as a first compressed set of the original data.

17. The system of claim 16, wherein the instructions, when executed by the processor, further cause the processor to:
  add the first partial set to the second partial set, leaving a second remaining set of the original data;
  for each second remaining datum of the second remaining set:
    identify a second family of points of the geometry corresponding to members of the second partial set local to the second remaining datum set by using the locality function;
    estimate the corresponding one or more values of the second remaining datum by using the peridynamic differential operator on the corresponding one or more values of each of the members of the second partial set in the second family of points; and
    compare the estimated values of the first remaining datum with corresponding ones of the one or more values of the original data using the comparison function to generate a second error value corresponding to a proximity of the estimated values to the original values of the second remaining datum;
  select a third partial set of the second remaining set by selecting members of the second remaining set having corresponding highest said second error values; and
  store the second and third partial sets of the original data on the non-transitory physical medium as a second compressed set of the original data.

18. The system of claim 16, wherein the original data is an image, the geometry is a set of pixels, and the locality function is Euclidean distance.

19. The system of claim 18, wherein the image is a two-dimensional image and the corresponding one or more values comprise one or more shade values.

20. The system of claim 19, wherein the one or more shade values comprise three shade values corresponding to three primary colors.

* * * * *